United States Patent [19]
Lips

[11] Patent Number: 6,044,219
[45] Date of Patent: Mar. 28, 2000

[54] DATE LOGIC GENERATOR

[75] Inventor: Michael D. Lips, San Francisco, Calif.

[73] Assignee: Platinum Technology, Inc., Oakbrook Terrace, Ill.

[21] Appl. No.: 08/825,937

[22] Filed: Apr. 1, 1997

[51] Int. Cl.$^7$ ........................................................ G06F 9/44
[52] U.S. Cl. ................................................ 395/704; 395/701
[58] Field of Search ........................................ 395/704, 701, 395/702; 707/104

[56] References Cited

U.S. PATENT DOCUMENTS

| | | | |
|---|---|---|---|
| 5,390,330 | 2/1995 | Talati ........................................ | 395/703 |
| 5,740,442 | 4/1998 | Cox et al. ................................. | 395/704 |

OTHER PUBLICATIONS

R.V. Dragan, "QuickPak Professional for Windows," PC Magazine, vol. 13(14), p. 366(2), Aug. 1994.
S.W. Plain, "QuickPak Professional," PC Magazine, vol. 15(2), p. 204, Jan. 1996.
N. Petreley, "OpenDoc: Component Integration Labs Inc.," InfoWorld, vol. 18(5), p. 66, Jan. 1996.
A.A. Aquino, "Reusable PowerBuilder components," Data Based Advisor, vol. 14(2), p. 18(3), Feb. 1996.
"VB Tools," Software Magazine, vol. 16(4), p. 1, Apr. 1996
J. Surveyer, "The Components of Change: Components Turn to Pre–Written Software Rather Than Code form Scratch," InformationWeek, No. 578, p. 1A(4), May 1996.
T. Campbell, "Shorten the VB 4.0 Learning Curve," Data Based Advisor, vol. 14(5), p. 32(3), May 1996.
P. Bonner, "Adapt OLE Controls to any Tool," Data Based Advisor, vol. 14(5), p. 90(4), May 1996.
T. Spitzer, "Solving Component Dilemmas," DBMS, vol. 9(8), p. 77(3), Jul. 1996.
N. Nicolaisen, "Visual C++ Dramitacally Reduces the Learning Curve for Writing Internet Apps.," Microsoft Systems Journal, vol. 11(9), p. 69(7), Sep. 1996.
S.Gaudin, "Microsoft in Visual Basic Bundling Deal with 40 Vendors," Computerworld, vol. 30(47), p. 10, Nov. 1996.

*Primary Examiner*—Robert W. Downs
*Attorney, Agent, or Firm*—Trial and Technology Law Group

[57] ABSTRACT

A utility with which a programmer can generate or alter computer code for a calendaring function, and test the code prior to compilation. Entering the program in edit mode, the programmer locates a portion of the program where code for a calendaring function is to be generated or altered, and invokes the date logic generator. The date logic generator provides an initial window with a choice of calendaring functions, and upon selecting a calendaring function, a parameters window displaying a number of first-level parameters for that function is provided. Depending on the specification of the values of the first-level parameters, sub-windows with second-level parameters may be provided. And, in general, depending on the specification of the values of the n-level parameters, (n+1)-level parameters may be provided in sub-windows. The parameters provided at any instant are only those which have already been specified or those that require specification. When the programmer believes the calendaring function is correctly chosen and its parameter values correctly specified, the operation of the function may be tested by a testing utility without requiring compilation of the computer code. Data for the calendaring function is entered in a testing utility sub-window, and the programmer can compare the testing utility output with an expected output. If the testing utility output and the expected output differ the programmer can modify the function or the function parameter values as appropriate. Further runs of the testing utility and modifications of the parameters of the calendaring function can be performed as needed.

3 Claims, 64 Drawing Sheets

```
                    TRC-CONVR-CONVERSATIONAL AREA   115
TRC-CONVR-BUSINESS-PARAMETERS.
    TRC-CONVR-HOLIDAY-TBL           PIC X(02) VALUE "01".
    TRC-CONVR-FISCYR-START          PIC X(02) VALUE "01".
    TRC-CONVR-FISCMO-START          PIC X(02) VALUE "01".
    TRC-CONVR-END-PNTS-DEF          PIC X(01) VALUE "T".
    TRC-CONVR-DOW-STRING            PIC X(07) VALUE "1234567".
    TRC-CONVR-PROC-DAY-DEF          PIC X(07) VALUE "NEEEEEN".
    TRC-CONVR-CENTURY-BREAK         PIC X(08) VALUE "19/20;50".
    TRC-CONVR-FROM-DATE-MASK        PIC X(08) VALUE "YYMMDD--".
    TRC-CONVR-TO-DATE-MASK          PIC X(08) VALUE "--YYMMDD".
    TRC-CONVR-OUT1-DATE-MASK        PIC X(08) VALUE "YYMMDD--".
    TRC-CONVR-OUT2-DATE-MASK        PIC X(08) VALUE "--YYMMDD".
    TRC-CONVR-OUT3-DATE-MASK        PIC X(08) VALUE "-CCYYDDD".
    FILLER                          PIC X(20) VALUE SPACE.

TRC-CONVR-INPUT-PARAMETERS.
    TRC-CONVR-FUNCTION-CODE.
        15  TRC-CONVR-FUNCTION-TYPE    PIC X.
        15  TRC-CONVR-FUNCTION-NUMBER  PIC X(3).
    TRC-CONVR-FROM-DATE-X           PIC X(8).
    TRC-CONVR-FROM-DATE-9 REDEFINES
        TRC-CONVR-FROM-DATE-X       PIC 9(8).
    TRC-CONVR-TO-DATE-X             PIC X(8).
    TRC-CONVR-TO-DATE-9 REDEFINES
        TRC-CONVR-TO-DATE-X         PIC 9(8).
    TRC-CONVR-IN-NUMERIC-PARM       PIC S9(8) SIGN IS LEADING SEPARATE.
    TRC-CONVR-IN-ALPHA-PARM         PIC X(7).
    FILLER                          PIC X(20) VALUE SPACE.

TRC-CONVR-OUTPUT-PARAMETERS.
    TRC-CONVR-RETURN-CODE.
        15  TRC-CONVR-RETURN-NUM       PIC 9(3).
            88  TRC-CONVR-RETURN-GOOD  VALUE 000.
            88  TRC-CONVR-RETURN-BAD   VALUE 001 THRU 999.
        15  TRC-CONVR-RETURN-TEXT      PIC X(80).
    TRC-CONVR-STDOUT-DATE-X         PIC X(8).
    TRC-CONVR-STDOUT-DATE-9 REDEFINES
        TRC-CONVR-STDOUT-DATE-X     PIC 9(8).
    TRC-CONVR-OUT1-DATE-X           PIC X(8).
    TRC-CONVR-OUT1-DATE-9-REDEFINES
        TRC-CONVR-OUT1-DATE-X       PIC 9(8).
    TRC-CONVR-OUT2-DATE-X           PIC X(8).
    TRC-CONVR-OUT2-DATE-9 REDEFINES
        TRC-CONVR-OUT2-DATE-X       PIC 9(8).
    TRC-CONVR-OUT3-DATE-X           PIC X(8).
    TRC-CONVR-OUT3-DATE-9 REDEFINES
        TRC-CONVR-OUT3-DATE-X       PIC 9(8).
    TRC-CONVR-OUT-NUMERIC-PARM      PIC S9(8) SIGN IS LEADING SEPARATE.
    FILLER                          PIC X(20) VALUE SPACE.

FILLER                              PIC X(111) VALUE SPACE.
```

FIG. 3

|  |  | HOLIDAY FILE | | |
|---|---|---|---|---|
|  |  | No Input | Input is Provided | |
|  |  |  | Good Input | Bad Input |
| PRINT FILE 625 | Error Report 630 | No | No | Yes |
|  | Control Report 631 | Yes | Yes | Yes |
|  | Calendar Listings 632 | No | Yes | No |
| COPYBOOK 620 | | Yes | Yes | No |

FIG. 5B

| Applicable Parameters | 1. OUT1-DATE-MASK |
|---|---|
| Business: | 2. FUNCTION-CODE |
| Input: | |
| Output: | 1. OUT1-DATE |

| Example 1 | |
|---|---|
| Before Call | After Call |
| CCYYMMDD | |
| U001 | |
| | 19930517 |

| Example 2 | |
|---|---|
| Before Call | After Call |
| CCYYDDMM | |
| U001 | |
| | 19931705 |

FIG. 6

| | Applicable Parameters |
|---|---|
| Business: | 1. FROM-DATE-MASK |
| Input: | 1. FUNCTION-CODE<br>2. FROM-DATE |
| Output: | 1. RETURN-NUM<br>2. OUT-NUMERIC-PARM |

| Example 1 | |
|---|---|
| Before Call | After Call |
| CCYYMMDD | |
| U002<br>19930217 | |
| | 000<br>1 |

| Example 2 | |
|---|---|
| Before Call | After Call |
| CCYYMMDD | |
| U002<br>199302W9 | |
| | 014<br>0 |

FIG. 7

| | |
|---|---|
| Applicable Parameters | |
| Business: | 1. FROM-DATE-MASK |
| Input: | 1. FUNCTION-CODE<br>2. FROM-DATE |
| Output: | 1. OUT-NUMERIC-PARM |

| Example 1 | |
|---|---|
| Before Call | After Call |
| CCYYMMDD | |
| U003<br>20001225 | |
| | 1 |

| Example 2 | |
|---|---|
| Before Call | After Call |
| MMCCYYDD | |
| U003<br>12199525 | |
| | 0 |

FIG. 8

| Applicable Parameters | |
|---|---|
| Business: | 1. HOLIDAY-TBL<br>2. FROM-DATE-MASK |
| Input: | 1. FUNCTION-CODE<br>2. FROM-DATE |
| Output: | 1. OUT-NUMERIC-PARM |

| Example 1 | |
|---|---|
| Before Call | After Call |
| 04<br>CCYYMMDD | |
| U004<br>19960704 | |
| | 1 |

| Example 2 | |
|---|---|
| Before Call | After Call |
| 04<br>CCYYMMDD | |
| U004<br>19940203 | |
| | 0 |

FIG. 9

| | |
|---|---|
| Applicable Parameters | |
| Business: | 1. HOLIDAY-TBL<br>2. FROM-DATE-MASK<br>3. PROC-DAY-DEF |
| Input: | 1. FUNCTION-CODE<br>2. FROM-DATE |
| Output: | 1. OUT-NUMERIC-PARM |

| Example 1 | |
|---|---|
| Before Call | After Call |
| 05<br>CCYYMMDD<br>'AAAAAA' | |
| U005<br>19920217 | |
| | 1 |

| Example 2 | |
|---|---|
| Before Call | After Call |
| 05<br>CCYYMMDD<br>'NEEEEEN' | |
| U005<br>19920217 | |
| | 0 |

FIG. 10

| | Applicable Parameters |
|---|---|
| Business: | 1. FROM-DATE-MASK<br>2. DOW-STRING |
| Input: | 1. FUNCTION-CODE<br>2. FROM-DATE |
| Output: | 1. OUT-NUMERIC-PARM |

| Example 1 | |
|---|---|
| Before Call | After Call |
| CCYYMMDD<br>1234567 | |
| U006<br>19920217 | |
| | 2 |

| Example 2 | |
|---|---|
| Before Call | After Call |
| CCYYMMDD<br>0123456 | |
| U006<br>19930519 | |
| | 3 |

FIG. 11

| Applicable Parameters | |
|---|---|
| Business: | 1. FROM-DATE-MASK |
| Input: | 1. FUNCTION-CODE<br>2. FROM-DATE |
| Output: | 1. OUT-NUMERIC-PARM |

| Example 1 | |
|---|---|
| Before Call | After Call |
| CCYYMMDD | |
| U007<br>00010101 | 1 |

| Example 2 | |
|---|---|
| Before Call | After Call |
| CCYYMMDD | |
| U007<br>20050101 | 731947 |

FIG. 12

| Applicable Parameters | |
|---|---|
| Business: | 1. OUT1-DATE-MASK |
| Input: | 1. FUNCTION-CODE<br>2. IN-NUMERIC-PARM |
| Output: | 1. OUT1-DATE |

| Example 1 | |
|---|---|
| Before Call | After Call |
| CCYYMMDD | |
| U008<br>1 | 00010101 |

| Example 2 | |
|---|---|
| Before Call | After Call |
| CCYYMMDD | |
| U008<br>731947 | 20050101 |

FIG. 13

| Applicable Parameters | |
|---|---|
| Business: | 1. FROM-DATE-MASK<br>2. OUT1-DATE-MASK<br>3. OUT2-DATE-MASK<br>4. OUT3-DATE-MASK |
| Input: | 1. FUNCTION-CODE<br>2. FROM-DATE |
| Output: | 1. STDOUT-DATE<br>2. OUT1-DATE<br>3. OUT2-DATE<br>4. OUT3-DATE |

| Example 1 | |
|---|---|
| Before Call | After Call |
| CCYYMMDD<br>CCYYDDMM<br>YYMMDD--<br>-CCYYDDD | |
| U009<br>19920301 | |
| | 19920301<br>19920103<br>920301<br>01992061 |

| Example 2 | |
|---|---|
| Before Call | After Call |
| CCYYMMDD<br>CCYYDDMM<br>YYMMDD--<br>-CCYYDDD | |
| U009<br>19930301 | |
| | 19930301<br>19930103<br>930301<br>01993060 |

FIG. 14

| Applicable Parameters | |
|---|---|
| Business: | 1. HOLIDAY-TBL<br>2. FROM-DATE-MASK<br>3. TO-DATE-MASK<br>4. PROC-DAY-DEF<br>5. END-PNTS-DEF |
| Input: | 1. FUNCTION-CODE<br>2. FROM-DATE<br>3. TO-DATE |
| Output: | 1. OUT-NUMERIC-PARM |

| Example 1 | |
|---|---|
| Before Call | After Call |
| 06<br>CCYYMMDD<br>CCYYMMDD<br>'NEEEEEN'<br>'T' | |
| C101<br>19930903<br>19930907 | |
| | +4 |

| Example 2 | |
|---|---|
| Before Call | After Call |
| 06<br>CCYYMMDD<br>CCYYMMDD<br>'NEEEEEN'<br>'T' | |
| P101<br>19930903<br>19930907 | |
| | +1 |

FIG. 15A

| Applicable Parameters | |
|---|---|
| Business: | 1. HOLIDAY-TBL<br>2. FROM-DATE-MASK<br>3. TO-DATE-MASK<br>4. PROC-DAY-DEF<br>5. END-PNTS-DEF |
| Input: | 1. FUNCTION-CODE<br>2. FROM-DATE<br>3. TO-DATE |
| Output: | 1. OUT-NUMERIC-PARM |

| Example 3 | |
|---|---|
| Before Call | After Call |
| 06<br>CCYYMMDD<br>CCYYMMDD<br>'NEEEEEN'<br>'T' | |
| C101<br>19930907<br>19930903 | −4 |

| Example 4 | |
|---|---|
| Before Call | After Call |
| 06<br>CCYYMMDD<br>CCYYMMDD<br>'NEEEEEN'<br>'T' | |
| P101<br>19930907<br>19930903 | −1 |

FIG. 15B

| | Applicable Parameters |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM |
| Output: | 1. OUT1-DATE |

| Example 1 | |
|---|---|
| Before Call | After Call |
| 06<br>CCYYMMDD<br>CCYYMMDD<br>'NEEEEEN'<br>'T' | |
| C102<br>19930903<br>+4 | |
| | 19930907 |

| Example 2 | |
|---|---|
| Before Call | After Call |
| 06<br>CCYYMMDD<br>CCYYMMDD<br>'NEEEEEN'<br>'T' | |
| P102<br>19930903<br>+4 | |
| | 19930910 |

FIG. 16A

| Applicable Parameters | 1. HOLIDAY-TBL<br>2. FROM-DATE-MASK<br>3. OUT1-DATE-MASK<br>4. PROC-DAY-DEF<br>5. END-PNTS-DEF |
|---|---|
| Business: | |
| Input: | 1. FUNCTION-CODE<br>2. FROM-DATE<br>3. IN-NUMERIC-PARM |
| Output: | 1. OUT1-DATE |

| Example 3 | |
|---|---|
| Before Call | After Call |
| 06<br>CCYYMMDD<br>CCYYMMDD<br>'NEEEEEN'<br>'T' | |
| C102<br>19930907<br>-4 | 19930903 |

| Example 4 | |
|---|---|
| Before Call | After Call |
| 06<br>CCYYMMDD<br>CCYYMMDD<br>'NEEEEEN'<br>'T' | |
| P102<br>19930910<br>-4 | 19930903 |

FIG. 16B

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE |
| Output: | 1. OUT1-DATE |

| Example 1 | |
|---|---|
| Before Call | After Call |
| 07<br>CCYYMMDD<br>CCYYMMDD<br>'NEEEEEN'<br>'T' | |
| C201<br>19930212 | 19930213 |

| Example 2 | |
|---|---|
| Before Call | After Call |
| 07<br>CCYYMMDD<br>CCYYMMDD<br>'NEEEEEN'<br>'T' | |
| P201<br>19930212 | 19930216 |

FIG. 17

| | | |
|---|---|---|
| Business: | Applicable Parameters | 1. HOLIDAY-TBL<br>2. FROM-DATE-MASK<br>3. OUT1-DATE-MASK<br>4. PROC-DAY-DEF<br>5. END-PNTS-DEF |
| Input: | | 1. FUNCTION-CODE<br>2. FROM-DATE |
| Output: | | 1. OUT1-DATE |

Example 1

| Before Call | After Call |
|---|---|
| 07<br>CCYYMMDD<br>CCYYMMDD<br>'NEEEEEN'<br>'T' | |
| C202<br>19930216 | 19930215 |

Example 2

| Before Call | After Call |
|---|---|
| 07<br>CCYYMMDD<br>CCYYMMDD<br>'NEEEEEN'<br>'T' | |
| P202<br>19930216 | 19930212 |

FIG. 18

| | Applicable Parameters |
|---|---|
| Business: | 1. HOLIDAY-TBL<br>2. FROM-DATE-MASK<br>3. PROC-DAY-DEF<br>4. END-PNTS-DEF |
| Input: | 1. FUNCTION-CODE<br>2. FROM-DATE |
| Output: | 1. OUT-NUMERIC-PARM |

| Example 1 | |
|---|---|
| Before Call | After Call |
| 05<br>CCYYMMDD<br>'NEEEEEN'<br>'T' | |
| C203<br>19940706 | −5 |

| Example 2 | |
|---|---|
| Before Call | After Call |
| 05<br>CCYYMMDD<br>'NEEEEEN'<br>'T' | |
| P203<br>19940706 | −2 |

FIG. 19

| Applicable Parameters | |
|---|---|
| Business: | 1. HOLIDAY-TBL<br>2. FROM-DATE-MASK<br>3. PROC-DAY-DEF<br>4. END-PNTS-DEF |
| Input: | 1. FUNCTION-CODE<br>2. FROM-DATE |
| Output: | 1. OUT-NUMERIC-PARM |

| Example 1 | |
|---|---|
| Before Call | After Call |
| 08<br>CCYYMMDD<br>'NEEEEEN'<br>'T' | |
| C204<br>19921223 | +8 |

| Example 2 | |
|---|---|
| Before Call | After Call |
| 08<br>CCYYMMDD<br>'NEEEEEN'<br>'T' | |
| P204<br>19921223 | +5 |

FIG. 20

| Applicable Parameters | |
|---|---|
| Business: | 1. HOLIDAY-TBL<br>2. FROM-DATE-MASK<br>3. OUT1-DATE-MASK<br>3. PROC-DAY-DEF<br>4. END-PNTS-DEF |
| Input: | 1. FUNCTION-CODE<br>2. FROM-DATE<br>3. IN-NUMERIC-PARM |
| Output: | 1. OUT1-DATE |

| Example 1 | |
|---|---|
| Before Call | After Call |
| 05<br>CCYYMMDD<br>CCYYMMDD<br>'NEEEEEN'<br>'T' | |
| C205<br>19940723<br>+5 | |
| | 19940706 |

| Example 2 | |
|---|---|
| Before Call | After Call |
| 05<br>CCYYMMDD<br>CCYYMMDD<br>'NEEEEEN'<br>'T' | |
| P205<br>19940723<br>+5 | |
| | 19940711 |

FIG. 21

| | Applicable Parameters |
|---|---|
| Business: | 1. HOLIDAY-TBL<br>2. FROM-DATE-MASK<br>3. OUT1-DATE-MASK<br>3. PROC-DAY-DEF<br>4. END-PNTS-DEF |
| Input: | 1. FUNCTION-CODE<br>2. FROM-DATE<br>3. IN-NUMERIC-PARM |
| Output: | 1. OUT1-DATE |

Example 1

| Before Call | After Call |
|---|---|
| 08<br>CCYYMMDD<br>CCYYMMDD<br>'NEEEEEN'<br>'T' | |
| C206<br>19921205<br>-4 | |
| | 19921227 |

Example 2

| Before Call | After Call |
|---|---|
| 08<br>CCYYMMDD<br>CCYYMMDD<br>'NEEEEEN'<br>'T' | |
| P206<br>19921218<br>-4 | |
| | 19921224 |

FIG. 22

| Applicable Parameters | 1. HOLIDAY-TBL<br>2. FROM-DATE-MASK<br>3. OUT1-DATE-MASK<br>4. PROC-DAY-DEF |
|---|---|
| Business: | |
| Input: | 1. FUNCTION-CODE<br>2. FROM-DATE<br>3. IN-NUMERIC-PARM<br>4. IN-ALPHA-PARM |
| Output: | 1. OUT1-DATE |

| Example 1 | |
|---|---|
| Before Call | After Call |
| 08<br>CCYYMMDD<br>CCYYMMDD<br>'NEEEEN' | |
| C207<br>19921228<br>-2<br>'NNNNNYN' | |
| | 19921218 |

| Example 2 | |
|---|---|
| Before Call | After Call |
| 08<br>CCYYMMDD<br>CCYYMMDD<br>'NEEEEN' | |
| P207<br>19921228<br>-2<br>'NNNNNYN' | |
| | 19921211 |

FIG. 23

5xx = DATE IDENTIFICATION

6xx = DAYS SINCE/UNTIL

7xx = DATE RELATIVE TO

8xx = Nth DOW Within A Period

| Applicable Parameters | |
|---|---|
| Business: | 1. HOLIDAY-TBL<br>2. FROM-DATE-MASK<br>3. OUT1-DATE-MASK<br>4. FISCYR-START<br>5. PROC-DAY-DEF<br>6. END-PNTS-DEF |
| Input: | 1. FUNCTION-CODE<br>2. FROM-DATE |
| Output: | 1. OUT1-DATE |

| Example C51 | |
|---|---|
| Before Call | After Call |
| 08<br>CCYYMMDD<br>CCYYMMDD<br>04<br>'NEEEEEN'<br>'T' | |
| C519<br>CURRDATE | 19930101 |

| Example P51 | |
|---|---|
| Before Call | After Call |
| 08<br>CCYYMMDD<br>CCYYMMDD<br>04<br>'NEEEEEN'<br>'T' | |
| P519<br>CURRDATE | 19930104 |

FIG. 25A

| | Example C52 | |
|---|---|---|
| | Before Call | After Call |
| | 08<br>CCYYMMDD<br>CCYYMMDD<br>'NEEEEEN'<br>'T' | |
| | C504<br>19931129 | 19931231 |

| | Example P52 | |
|---|---|---|
| | Before Call | After Call |
| | 08<br>CCYYMMDD<br>CCYYMMDD<br>'NEEEEEN'<br>'T' | |
| | P504<br>19931129 | 19931230 |

| | Applicable Parameters |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE |
| Output: | 1. OUT1-DATE |

FIG. 25B

| | Example P61 | |
|---|---|---|
| | Before Call | After Call |
| | 08 CCYYMMDD<br>04 'NEEEEEN'<br>'T' | |
| | P619 CURRDATE | -95 |

| | Example C61 | |
|---|---|---|
| | Before Call | After Call |
| | 08 CCYYMMDD<br>04 'NEEEEEN'<br>'T' | |
| | C619 CURRDATE | -136 |

| Applicable Parameters | |
|---|---|
| Business: | 1. HOLIDAY-TBL<br>2. FROM-DATE-MASK<br>3. FISCYR-START<br>4. PROC-DAY-DEF<br>5. END-PNTS-DEF |
| Input: | 1. FUNCTION-CODE<br>2. FROM-DATE |
| Output: | 1. OUT-NUMERIC-PARM |

FIG. 26A

| Example C62 | | | Example P62 | |
|---|---|---|---|---|
| Before Call | After Call | | Before Call | After Call |
| 08 CCYYMMDD 'NEEEEEN' 'T' | | | 08 CCYYMMDD 'NEEEEEN' 'T' | |
| C604 19931129 | | | P604 19931129 | |
| | +32 | | | +22 |

| Applicable Parameters | |
|---|---|
| Business: | 1. HOLIDAY-TBL<br>2. FROM-DATE-MASK<br>3. PROC-DAY-DEF<br>4. END-PNTS-DEF |
| Input: | 1. FUNCTION-CODE<br>2. FROM-DATE |
| Output: | 1. OUT-NUMERIC-PARM |

FIG. 26B

| Applicable Parameters | |
|---|---|
| Business: | 1. HOLIDAY-TBL<br>2. FROM-DATE-MASK<br>3. OUT1-DATE-MASK<br>4. FISCYR-START<br>5. PROC-DAY-DEF<br>6. END-PNTS-DEF |
| Input: | 1. FUNCTION-CODE<br>2. FROM-DATE<br>3. IN-NUMERIC-PARM |
| Output: | 1. OUT1-DATE |

| Example C71 | |
|---|---|
| Before Call | After Call |
| 08<br>CCYYMMDD<br>CCYYMMDD<br>04<br>'NEEEEEN'<br>'T' | |
| C719<br>CURRDATE<br>+5 | 19930106 |

| Example P71 | |
|---|---|
| Before Call | After Call |
| 08<br>CCYYMMDD<br>CCYYMMDD<br>04<br>'NEEEEEN'<br>'T' | |
| P719<br>CURRDATE<br>+5 | 19930111 |

FIG. 27A

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM |
| Output: | 1. OUT1-DATE |

| Example C72 | |
|---|---|
| Before Call | After Call |
| 08<br>CCYYMMDD<br>CCYYMMDD<br>'NEEEEEN'<br>'T' | |
| C704<br>19931129<br>-6 | 19931225 |

| Example P72 | |
|---|---|
| Before Call | After Call |
| 08<br>CCYYMMDD<br>CCYYMMDD<br>'NEEEEEN'<br>'T' | |
| P704<br>19931129<br>-6 | 19931221 |

FIG. 27B

| | Applicable Parameters |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM<br>4. IN-ALPHA-PARM |
| Output: | 1. RETURN-NUM<br>2. OUT1-DATE |

| Example C81 | |
|---|---|
| Before Call | After Call |
| 08<br>CCYYMMDD<br>CCYYMMDD<br>'NEEEEEN'<br>'T' | |
| C827<br>19921215<br>+4<br>'NNNNNYN' | 000<br>19921225 |

| Example P81 | |
|---|---|
| Before Call | After Call |
| 08<br>CCYYMMDD<br>CCYYMMDD<br>'NEEEEEN'<br>'T' | |
| P827<br>19921215<br>+4<br>'NNNNNYN' | 054 |

FIG. 28A

```
01  TRC-CAL-TO-KAL-TA
  05  TRC-CAL-TO-KAL-TABLE-1-DEF.
    10  FILLER  PIC  X(17)  VALUE  "01/01;01/01;  001".
    10  FILLER  PIC  X(17)  VALUE  "01/02;01/02;  002".
    10  FILLER  PIC  X(17)  VALUE  "01/03;01/03;  003".
    10  FILLER  PIC  X(17)  VALUE  "01/04;01/04;  004".
    10  FILLER  PIC  X(17)  VALUE  "01/05;01/05;  005".
    10  FILLER  PIC  X(17)  VALUE  "01/06;01/06;  006".
    10  FILLER  PIC  X(17)  VALUE  "01/07;01/07;  007".
    10  FILLER  PIC  X(17)  VALUE  "01/08;01/08;  008".
    10  FILLER  PIC  X(17)  VALUE  "01/09;01/09;  009".
    10  FILLER  PIC  X(17)  VALUE  "01/10;01/10;  010".
    10  FILLER  PIC  X(17)  VALUE  "01/11;01/11;  011".
    10  FILLER  PIC  X(17)  VALUE  "01/12;01/12;  012".
    10  FILLER  PIC  X(17)  VALUE  "01/13;01/13;  013".
    10  FILLER  PIC  X(17)  VALUE  "01/14;01/14;  014".
    10  FILLER  PIC  X(17)  VALUE  "01/15;01/15;  015".
    10  FILLER  PIC  X(17)  VALUE  "01/16;01/16;  016".
    10  FILLER  PIC  X(17)  VALUE  "01/17;01/17;  017".
    10  FILLER  PIC  X(17)  VALUE  "01/18;01/18;  018".
    10  FILLER  PIC  X(17)  VALUE  "01/19;01/19;  019".
    10  FILLER  PIC  X(17)  VALUE  "01/20;01/20;  020".
    10  FILLER  PIC  X(17)  VALUE  "01/21;01/21;  021".
    10  FILLER  PIC  X(17)  VALUE  "01/22;01/22;  022".
    10  FILLER  PIC  X(17)  VALUE  "01/23;01/23;  023".
    10  FILLER  PIC  X(17)  VALUE  "01/24;01/24;  024".
    10  FILLER  PIC  X(17)  VALUE  "01/25;01/25;  025".
    10  FILLER  PIC  X(17)  VALUE  "01/26;01/26;  026".
    10  FILLER  PIC  X(17)  VALUE  "01/27;01/27;  027".
    10  FILLER  PIC  X(17)  VALUE  "01/28;01/28;  028".
    10  FILLER  PIC  X(17)  VALUE  "01/29;01/29;  029".
    10  FILLER  PIC  X(17)  VALUE  "01/30;01/30;  030".
    10  FILLER  PIC  X(17)  VALUE  "01/31;01/31;  030".
    10  FILLER  PIC  X(17)  VALUE  "02/01;02/01;  031".
    10  FILLER  PIC  X(17)  VALUE  "02/02;02/02;  032".
    10  FILLER  PIC  X(17)  VALUE  "02/03;02/03;  033".
    10  FILLER  PIC  X(17)  VALUE  "02/04;02/04;  034".
    10  FILLER  PIC  X(17)  VALUE  "02/05;02/05;  035".
    10  FILLER  PIC  X(17)  VALUE  "02/06;02/06;  036".
    10  FILLER  PIC  X(17)  VALUE  "02/07;02/07;  037".
    10  FILLER  PIC  X(17)  VALUE  "02/08;02/08;  038".
    10  FILLER  PIC  X(17)  VALUE  "02/09;02/09;  039".
    10  FILLER  PIC  X(17)  VALUE  "02/10;02/10;  040".
    10  FILLER  PIC  X(17)  VALUE  "02/11;02/11;  041".
    10  FILLER  PIC  X(17)  VALUE  "02/12;02/12;  042".
    10  FILLER  PIC  X(17)  VALUE  "02/13;02/13;  043".
    10  FILLER  PIC  X(17)  VALUE  "02/14;02/14;  044".
    10  FILLER  PIC  X(17)  VALUE  "02/15;02/15;  045".
```

FIG. 30A

```
10  FILLER PIC X(17) VALUE "02/16;02/16; 046".
10  FILLER PIC X(17) VALUE "02/17;02/17; 047".
10  FILLER PIC X(17) VALUE "02/18;02/18; 048".
10  FILLER PIC X(17) VALUE "02/19;02/19; 049".
10  FILLER PIC X(17) VALUE "02/20;02/20; 050".
10  FILLER PIC X(17) VALUE "02/21;02/21; 051".
10  FILLER PIC X(17) VALUE "02/22;02/22; 052".
10  FILLER PIC X(17) VALUE "02/23;02/23; 053".
10  FILLER PIC X(17) VALUE "02/24;02/24; 054".
10  FILLER PIC X(17) VALUE "02/25;02/25; 055".
10  FILLER PIC X(17) VALUE "02/26;02/26; 056".
10  FILLER PIC X(17) VALUE "02/27;02/27; 057".
10  FILLER PIC X(17) VALUE "02/28;02/28; 058".
10  FILLER PIC X(17) VALUE "02/29;03/01; 059".
10  FILLER PIC X(17) VALUE "02/29;03/01; 060".
10  FILLER PIC X(17) VALUE "03/01;03/01; 061".
10  FILLER PIC X(17) VALUE "03/02;03/02; 062".
10  FILLER PIC X(17) VALUE "03/03;03/03; 063".
10  FILLER PIC X(17) VALUE "03/04;03/04; 064".
10  FILLER PIC X(17) VALUE "03/05;03/05; 065".
10  FILLER PIC X(17) VALUE "03/06;03/06; 066".
10  FILLER PIC X(17) VALUE "03/07;03/07; 067".
10  FILLER PIC X(17) VALUE "03/08;03/08; 068".
10  FILLER PIC X(17) VALUE "03/09;03/09; 069".
10  FILLER PIC X(17) VALUE "03/10;03/10; 070".
10  FILLER PIC X(17) VALUE "03/11;03/11; 071".
10  FILLER PIC X(17) VALUE "03/12;03/12; 072".
10  FILLER PIC X(17) VALUE "03/13;03/13; 073".
10  FILLER PIC X(17) VALUE "03/14;03/14; 074".
10  FILLER PIC X(17) VALUE "03/15;03/15; 075".
10  FILLER PIC X(17) VALUE "03/16;03/16; 076".
10  FILLER PIC X(17) VALUE "03/17;03/17; 077".
10  FILLER PIC X(17) VALUE "03/18;03/18; 078".
10  FILLER PIC X(17) VALUE "03/19;03/19; 079".
10  FILLER PIC X(17) VALUE "03/20;03/20; 080".
10  FILLER PIC X(17) VALUE "03/21;03/21; 081".
10  FILLER PIC X(17) VALUE "03/22;03/22; 082".
10  FILLER PIC X(17) VALUE "03/23;03/23; 083".
10  FILLER PIC X(17) VALUE "03/24;03/24; 084".
10  FILLER PIC X(17) VALUE "03/25;03/25; 085".
10  FILLER PIC X(17) VALUE "03/26;03/26; 086".
10  FILLER PIC X(17) VALUE "03/27;03/27; 087".
10  FILLER PIC X(17) VALUE "03/28;03/28; 088".
10  FILLER PIC X(17) VALUE "03/29;03/29; 089".
10  FILLER PIC X(17) VALUE "03/30;03/30; 090".
10  FILLER PIC X(17) VALUE "03/31;03/31; 090".
10  FILLER PIC X(17) VALUE "04/01;04/01; 091".
10  FILLER PIC X(17) VALUE "04/02;04/02; 092".
```

FIG. 30B

```
10  FILLER PIC  X(17)  VALUE "04/03;04/03;  093".
10  FILLER PIC  X(17)  VALUE "04/04;04/04;  094".
10  FILLER PIC  X(17)  VALUE "04/05;04/05;  095".
10  FILLER PIC  X(17)  VALUE "04/06;04/06;  096".
10  FILLER PIC  X(17)  VALUE "04/07;04/07;  097".
10  FILLER PIC  X(17)  VALUE "04/08;04/08;  098".
10  FILLER PIC  X(17)  VALUE "04/09;04/09;  099".
10  FILLER PIC  X(17)  VALUE "04/10;04/10;  100".
10  FILLER PIC  X(17)  VALUE "04/11;04/11;  101".
10  FILLER PIC  X(17)  VALUE "04/12;04/12;  102".
10  FILLER PIC  X(17)  VALUE "04/13;04/13;  103".
10  FILLER PIC  X(17)  VALUE "04/14;04/14;  104".
10  FILLER PIC  X(17)  VALUE "04/15;04/15;  105".
10  FILLER PIC  X(17)  VALUE "04/16;04/16;  106".
10  FILLER PIC  X(17)  VALUE "04/17;04/17;  107".
10  FILLER PIC  X(17)  VALUE "04/18;04/18;  108".
10  FILLER PIC  X(17)  VALUE "04/19;04/19;  109".
10  FILLER PIC  X(17)  VALUE "04/20;04/20;  110".
10  FILLER PIC  X(17)  VALUE "04/21;04/21;  111".
10  FILLER PIC  X(17)  VALUE "04/22;04/22;  112".
10  FILLER PIC  X(17)  VALUE "04/23;04/23;  113".
10  FILLER PIC  X(17)  VALUE "04/24;04/24;  114".
10  FILLER PIC  X(17)  VALUE "04/25;04/25;  115".
10  FILLER PIC  X(17)  VALUE "04/26;04/26;  116".
10  FILLER PIC  X(17)  VALUE "04/27;04/27;  117".
10  FILLER PIC  X(17)  VALUE "04/28;04/28;  118".
10  FILLER PIC  X(17)  VALUE "04/29;04/29;  119".
10  FILLER PIC  X(17)  VALUE "04/30;04/30;  120".
10  FILLER PIC  X(17)  VALUE "05/01;05/01;  121".
10  FILLER PIC  X(17)  VALUE "05/02;05/02;  122".
10  FILLER PIC  X(17)  VALUE "05/03;05/03;  123".
10  FILLER PIC  X(17)  VALUE "05/04;05/04;  124".
10  FILLER PIC  X(17)  VALUE "05/05;05/05;  125".
10  FILLER PIC  X(17)  VALUE "05/06;05/06;  126".
10  FILLER PIC  X(17)  VALUE "05/07;05/07;  127".
10  FILLER PIC  X(17)  VALUE "05/08;05/08;  128".
10  FILLER PIC  X(17)  VALUE "05/09;05/09;  129".
10  FILLER PIC  X(17)  VALUE "05/10;05/10;  130".
10  FILLER PIC  X(17)  VALUE "05/11;05/11;  131".
10  FILLER PIC  X(17)  VALUE "05/12;05/12;  132".
10  FILLER PIC  X(17)  VALUE "05/13;05/13;  133".
10  FILLER PIC  X(17)  VALUE "05/14;05/14;  134".
10  FILLER PIC  X(17)  VALUE "05/15;05/15;  135".
10  FILLER PIC  X(17)  VALUE "05/16;05/16;  136".
10  FILLER PIC  X(17)  VALUE "05/17;05/17;  137".
10  FILLER PIC  X(17)  VALUE "05/18;05/18;  138".
10  FILLER PIC  X(17)  VALUE "05/19;05/19;  139".
10  FILLER PIC  X(17)  VALUE "05/20;05/20;  140".
```

FIG. 30C

```
10  FILLER  PIC  X(17)  VALUE  "05/21;05/21;  141".
10  FILLER  PIC  X(17)  VALUE  "05/22;05/22;  142".
10  FILLER  PIC  X(17)  VALUE  "05/23;05/23;  143".
10  FILLER  PIC  X(17)  VALUE  "05/24;05/24;  144".
10  FILLER  PIC  X(17)  VALUE  "05/25;05/25;  145".
10  FILLER  PIC  X(17)  VALUE  "05/26;05/26;  146".
10  FILLER  PIC  X(17)  VALUE  "05/27;05/27;  147".
10  FILLER  PIC  X(17)  VALUE  "05/28;05/28;  148".
10  FILLER  PIC  X(17)  VALUE  "05/29;05/29;  149".
10  FILLER  PIC  X(17)  VALUE  "05/30;05/30;  150".
10  FILLER  PIC  X(17)  VALUE  "05/31;05/31;  150".
10  FILLER  PIC  X(17)  VALUE  "06/01;06/01;  151".
10  FILLER  PIC  X(17)  VALUE  "06/02;06/02;  152".
10  FILLER  PIC  X(17)  VALUE  "06/03;06/03;  153".
10  FILLER  PIC  X(17)  VALUE  "06/04;06/04;  154".
10  FILLER  PIC  X(17)  VALUE  "06/05;06/05;  155".
10  FILLER  PIC  X(17)  VALUE  "06/06;06/06;  156".
10  FILLER  PIC  X(17)  VALUE  "06/07;06/07;  157".
10  FILLER  PIC  X(17)  VALUE  "06/08;06/08;  158".
10  FILLER  PIC  X(17)  VALUE  "06/09;06/09;  159".
10  FILLER  PIC  X(17)  VALUE  "06/10;06/10;  160".
10  FILLER  PIC  X(17)  VALUE  "06/11;06/11;  161".
10  FILLER  PIC  X(17)  VALUE  "06/12;06/12;  162".
10  FILLER  PIC  X(17)  VALUE  "06/13;06/13;  163".
10  FILLER  PIC  X(17)  VALUE  "06/14;06/14;  164".
10  FILLER  PIC  X(17)  VALUE  "06/15;06/15;  165".
10  FILLER  PIC  X(17)  VALUE  "06/16;06/16;  166".
10  FILLER  PIC  X(17)  VALUE  "06/17;06/17;  167".
10  FILLER  PIC  X(17)  VALUE  "06/18;06/18;  168".
10  FILLER  PIC  X(17)  VALUE  "06/19;06/19;  169".
10  FILLER  PIC  X(17)  VALUE  "06/20;06/20;  170".
10  FILLER  PIC  X(17)  VALUE  "06/21;06/21;  171".
10  FILLER  PIC  X(17)  VALUE  "06/22;06/22;  172".
10  FILLER  PIC  X(17)  VALUE  "06/23;06/23;  173".
10  FILLER  PIC  X(17)  VALUE  "06/24;06/24;  174".
10  FILLER  PIC  X(17)  VALUE  "06/25;06/25;  175".
10  FILLER  PIC  X(17)  VALUE  "06/26;06/26;  176".
10  FILLER  PIC  X(17)  VALUE  "06/27;06/27;  177".
10  FILLER  PIC  X(17)  VALUE  "06/28;06/28;  178".
10  FILLER  PIC  X(17)  VALUE  "06/29;06/29;  179".
10  FILLER  PIC  X(17)  VALUE  "06/30;06/30;  180".
10  FILLER  PIC  X(17)  VALUE  "07/01;07/01;  181".
10  FILLER  PIC  X(17)  VALUE  "07/02;07/02;  182".
10  FILLER  PIC  X(17)  VALUE  "07/03;07/03;  183".
10  FILLER  PIC  X(17)  VALUE  "07/04;07/04;  184".
10  FILLER  PIC  X(17)  VALUE  "07/05;07/05;  185".
10  FILLER  PIC  X(17)  VALUE  "07/06;07/06;  186".
10  FILLER  PIC  X(17)  VALUE  "07/07;07/07;  187".
```

FIG. 30D

```
10  FILLER PIC  X(17)  VALUE "07/08;07/08;  188".
10  FILLER PIC  X(17)  VALUE "07/09;07/09;  189".
10  FILLER PIC  X(17)  VALUE "07/10;07/10;  190".
10  FILLER PIC  X(17)  VALUE "07/11;07/11;  191".
10  FILLER PIC  X(17)  VALUE "07/12;07/12;  192".
10  FILLER PIC  X(17)  VALUE "07/13;07/13;  193".
10  FILLER PIC  X(17)  VALUE "07/14;07/14;  194".
10  FILLER PIC  X(17)  VALUE "07/15;07/15;  195".
10  FILLER PIC  X(17)  VALUE "07/16;07/16;  196".
10  FILLER PIC  X(17)  VALUE "07/17;07/17;  197".
10  FILLER PIC  X(17)  VALUE "07/18;07/18;  198".
10  FILLER PIC  X(17)  VALUE "07/19;07/19;  199".
10  FILLER PIC  X(17)  VALUE "07/20;07/20;  200".
10  FILLER PIC  X(17)  VALUE "07/21;07/21;  201".
10  FILLER PIC  X(17)  VALUE "07/22;07/22;  202".
10  FILLER PIC  X(17)  VALUE "07/23;07/23;  203".
10  FILLER PIC  X(17)  VALUE "07/24;07/24;  204".
10  FILLER PIC  X(17)  VALUE "07/25;07/25;  205".
10  FILLER PIC  X(17)  VALUE "07/26;07/26;  206".
10  FILLER PIC  X(17)  VALUE "07/27;07/27;  207".
10  FILLER PIC  X(17)  VALUE "07/28;07/28;  208".
10  FILLER PIC  X(17)  VALUE "07/29;07/29;  209".
10  FILLER PIC  X(17)  VALUE "07/30;07/30;  210".
10  FILLER PIC  X(17)  VALUE "07/31;07/31;  210".
10  FILLER PIC  X(17)  VALUE "08/01;08/01;  211".
10  FILLER PIC  X(17)  VALUE "08/02;08/02;  212".
10  FILLER PIC  X(17)  VALUE "08/03;08/03;  213".
10  FILLER PIC  X(17)  VALUE "08/04;08/04;  214".
10  FILLER PIC  X(17)  VALUE "08/05;08/05;  215".
10  FILLER PIC  X(17)  VALUE "08/06;08/06;  216".
10  FILLER PIC  X(17)  VALUE "08/07;08/07;  217".
10  FILLER PIC  X(17)  VALUE "08/08;08/08;  218".
10  FILLER PIC  X(17)  VALUE "08/09;08/09;  219".
10  FILLER PIC  X(17)  VALUE "08/10;08/10;  220".
10  FILLER PIC  X(17)  VALUE "08/11;08/11;  221".
10  FILLER PIC  X(17)  VALUE "08/12;08/12;  222".
10  FILLER PIC  X(17)  VALUE "08/13;08/13;  223".
10  FILLER PIC  X(17)  VALUE "08/14;08/14;  224".
10  FILLER PIC  X(17)  VALUE "08/15;08/15;  225".
10  FILLER PIC  X(17)  VALUE "08/16;08/16;  226".
10  FILLER PIC  X(17)  VALUE "08/17;08/17;  227".
10  FILLER PIC  X(17)  VALUE "08/18;08/18;  228".
10  FILLER PIC  X(17)  VALUE "08/19;08/19;  229".
10  FILLER PIC  X(17)  VALUE "08/20;08/20;  230".
10  FILLER PIC  X(17)  VALUE "08/21;08/21;  231".
10  FILLER PIC  X(17)  VALUE "08/22;08/22;  232".
10  FILLER PIC  X(17)  VALUE "08/23;08/23;  233".
10  FILLER PIC  X(17)  VALUE "08/24;08/24;  234".
```

FIG. 30E

```
10  FILLER PIC  X(17)  VALUE "08/25;08/25;  235".
10  FILLER PIC  X(17)  VALUE "08/26;08/26;  236".
10  FILLER PIC  X(17)  VALUE "08/27;08/27;  237".
10  FILLER PIC  X(17)  VALUE "08/28;08/28;  238".
10  FILLER PIC  X(17)  VALUE "08/29;08/29;  239".
10  FILLER PIC  X(17)  VALUE "08/30;08/30;  240".
10  FILLER PIC  X(17)  VALUE "08/31;08/31;  240".
10  FILLER PIC  X(17)  VALUE "09/01;09/01;  241".
10  FILLER PIC  X(17)  VALUE "09/02;09/02;  242".
10  FILLER PIC  X(17)  VALUE "09/03;09/03;  243".
10  FILLER PIC  X(17)  VALUE "09/04;09/04;  244".
10  FILLER PIC  X(17)  VALUE "09/05;09/05;  245".
10  FILLER PIC  X(17)  VALUE "09/06;09/06;  246".
10  FILLER PIC  X(17)  VALUE "09/07;09/07;  247".
10  FILLER PIC  X(17)  VALUE "09/08;09/08;  248".
10  FILLER PIC  X(17)  VALUE "09/09;09/09;  249".
10  FILLER PIC  X(17)  VALUE "09/10;09/10;  250".
10  FILLER PIC  X(17)  VALUE "09/11;09/11;  251".
10  FILLER PIC  X(17)  VALUE "09/12;09/12;  252".
10  FILLER PIC  X(17)  VALUE "09/13;09/13;  253".
10  FILLER PIC  X(17)  VALUE "09/14;09/14;  254".
10  FILLER PIC  X(17)  VALUE "09/15;09/15;  255".
10  FILLER PIC  X(17)  VALUE "09/16;09/16;  256".
10  FILLER PIC  X(17)  VALUE "09/17;09/17;  257".
10  FILLER PIC  X(17)  VALUE "09/18;09/18;  258".
10  FILLER PIC  X(17)  VALUE "09/19;09/19;  259".
10  FILLER PIC  X(17)  VALUE "09/20;09/20;  260".
10  FILLER PIC  X(17)  VALUE "09/21;09/21;  261".
10  FILLER PIC  X(17)  VALUE "09/22;09/22;  262".
10  FILLER PIC  X(17)  VALUE "09/23;09/23;  263".
10  FILLER PIC  X(17)  VALUE "09/24;09/24;  264".
10  FILLER PIC  X(17)  VALUE "09/25;09/25;  265".
10  FILLER PIC  X(17)  VALUE "09/26;09/26;  266".
10  FILLER PIC  X(17)  VALUE "09/27;09/27;  267".
10  FILLER PIC  X(17)  VALUE "09/28;09/28;  268".
10  FILLER PIC  X(17)  VALUE "09/29;09/29;  269".
10  FILLER PIC  X(17)  VALUE "09/30;09/30;  270".
10  FILLER PIC  X(17)  VALUE "10/01;10/01;  271".
10  FILLER PIC  X(17)  VALUE "10/02;10/02;  272".
10  FILLER PIC  X(17)  VALUE "10/03;10/03;  273".
10  FILLER PIC  X(17)  VALUE "10/04;10/04;  274".
10  FILLER PIC  X(17)  VALUE "10/05;10/05;  275".
10  FILLER PIC  X(17)  VALUE "10/06;10/06;  276".
10  FILLER PIC  X(17)  VALUE "10/07;10/07;  277".
10  FILLER PIC  X(17)  VALUE "10/08;10/08;  278".
10  FILLER PIC  X(17)  VALUE "10/09;10/09;  279".
10  FILLER PIC  X(17)  VALUE "10/10;10/10;  280".
10  FILLER PIC  X(17)  VALUE "10/11;10/11;  281".
```

FIG. 30F

```
10  FILLER  PIC  X(17)  VALUE "10/12;10/12;  282".
10  FILLER  PIC  X(17)  VALUE "10/13;10/13;  283".
10  FILLER  PIC  X(17)  VALUE "10/14;10/14;  284".
10  FILLER  PIC  X(17)  VALUE "10/15;10/15;  285".
10  FILLER  PIC  X(17)  VALUE "10/16;10/16;  286".
10  FILLER  PIC  X(17)  VALUE "10/17;10/17;  287".
10  FILLER  PIC  X(17)  VALUE "10/18;10/18;  288".
10  FILLER  PIC  X(17)  VALUE "10/19;10/19;  289".
10  FILLER  PIC  X(17)  VALUE "10/20;10/20;  290".
10  FILLER  PIC  X(17)  VALUE "10/21;10/21;  291".
10  FILLER  PIC  X(17)  VALUE "10/22;10/22;  292".
10  FILLER  PIC  X(17)  VALUE "10/23;10/23;  293".
10  FILLER  PIC  X(17)  VALUE "10/24;10/24;  294".
10  FILLER  PIC  X(17)  VALUE "10/25;10/25;  295".
10  FILLER  PIC  X(17)  VALUE "10/26;10/26;  296".
10  FILLER  PIC  X(17)  VALUE "10/27;10/27;  297".
10  FILLER  PIC  X(17)  VALUE "10/28;10/28;  298".
10  FILLER  PIC  X(17)  VALUE "10/29;10/29;  299".
10  FILLER  PIC  X(17)  VALUE "10/30;10/30;  300".
10  FILLER  PIC  X(17)  VALUE "10/31;10/31;  300".
10  FILLER  PIC  X(17)  VALUE "11/01;11/01;  301".
10  FILLER  PIC  X(17)  VALUE "11/02;11/02;  302".
10  FILLER  PIC  X(17)  VALUE "11/03;11/03;  303".
10  FILLER  PIC  X(17)  VALUE "11/04;11/04;  304".
10  FILLER  PIC  X(17)  VALUE "11/05;11/05;  305".
10  FILLER  PIC  X(17)  VALUE "11/06;11/06;  306".
10  FILLER  PIC  X(17)  VALUE "11/07;11/07;  307".
10  FILLER  PIC  X(17)  VALUE "11/08;11/08;  308".
10  FILLER  PIC  X(17)  VALUE "11/09;11/09;  309".
10  FILLER  PIC  X(17)  VALUE "11/10;11/10;  310".
10  FILLER  PIC  X(17)  VALUE "11/11;11/11;  311".
10  FILLER  PIC  X(17)  VALUE "11/12;11/12;  312".
10  FILLER  PIC  X(17)  VALUE "11/13;11/13;  313".
10  FILLER  PIC  X(17)  VALUE "11/14;11/14;  314".
10  FILLER  PIC  X(17)  VALUE "11/15;11/15;  315".
10  FILLER  PIC  X(17)  VALUE "11/16;11/16;  316".
10  FILLER  PIC  X(17)  VALUE "11/17;11/17;  317".
10  FILLER  PIC  X(17)  VALUE "11/18;11/18;  318".
10  FILLER  PIC  X(17)  VALUE "11/19;11/19;  319".
10  FILLER  PIC  X(17)  VALUE "11/20;11/20;  320".
10  FILLER  PIC  X(17)  VALUE "11/21;11/21;  321".
10  FILLER  PIC  X(17)  VALUE "11/22;11/22;  322".
10  FILLER  PIC  X(17)  VALUE "11/23;11/23;  323".
10  FILLER  PIC  X(17)  VALUE "11/24;11/24;  324".
10  FILLER  PIC  X(17)  VALUE "11/25;11/25;  325".
10  FILLER  PIC  X(17)  VALUE "11/26;11/26;  326".
10  FILLER  PIC  X(17)  VALUE "11/27;11/27;  327".
10  FILLER  PIC  X(17)  VALUE "11/28;11/28;  328".
```

FIG. 30G

```
       10   FILLER PIC X(17) VALUE "11/29;11/29; 329".
       10   FILLER PIC X(17) VALUE "11/30;11/30; 330".
       10   FILLER PIC X(17) VALUE "12/01;12/01; 331".
       10   FILLER PIC X(17) VALUE "12/02;12/02; 332".
       10   FILLER PIC X(17) VALUE "12/03;12/03; 333".
       10   FILLER PIC X(17) VALUE "12/04;12/04; 334".
       10   FILLER PIC X(17) VALUE "12/05;12/05; 335".
       10   FILLER PIC X(17) VALUE "12/06;12/06; 336".
       10   FILLER PIC X(17) VALUE "12/07;12/07; 337".
       10   FILLER PIC X(17) VALUE "12/08;12/08; 338".
       10   FILLER PIC X(17) VALUE "12/09;12/09; 339".
       10   FILLER PIC X(17) VALUE "12/10;12/10; 340".
       10   FILLER PIC X(17) VALUE "12/11;12/11; 341".
       10   FILLER PIC X(17) VALUE "12/12;12/12; 342".
       10   FILLER PIC X(17) VALUE "12/13;12/13; 343".
       10   FILLER PIC X(17) VALUE "12/14;12/14; 344".
       10   FILLER PIC X(17) VALUE "12/15;12/15; 345".
       10   FILLER PIC X(17) VALUE "12/16;12/16; 346".
       10   FILLER PIC X(17) VALUE "12/17;12/17; 347".
       10   FILLER PIC X(17) VALUE "12/18;12/18; 348".
       10   FILLER PIC X(17) VALUE "12/19;12/19; 349".
       10   FILLER PIC X(17) VALUE "12/20;12/20; 350".
       10   FILLER PIC X(17) VALUE "12/21;12/21; 351".
       10   FILLER PIC X(17) VALUE "12/22;12/22; 352".
       10   FILLER PIC X(17) VALUE "12/23;12/23; 353".
       10   FILLER PIC X(17) VALUE "12/24;12/24; 354".
       10   FILLER PIC X(17) VALUE "12/25;12/25; 355".
       10   FILLER PIC X(17) VALUE "12/26;12/26; 356".
       10   FILLER PIC X(17) VALUE "12/27;12/27; 357".
       10   FILLER PIC X(17) VALUE "12/28;12/28; 358".
       10   FILLER PIC X(17) VALUE "12/29;12/29; 359".
       10   FILLER PIC X(17) VALUE "12/30;12/30; 360".
       10   FILLER PIC X(17) VALUE "12/31;12/31; 360".
  05 TRC-CAL-TO-KAL-TABLE-2-DEF REDEFINES
     TRC-CAL-TO-KAL-TABLE-1-DEF.
       10   FILLER OCCURS 367 TIMES
                  INDEXED BY TRC-CAL-TO KAL-IDX.
            15   TRC-CAL-TO-KAL-TBL-G-MO-LEAP      PIC 9(02).
            15   FILLER                             PIC X(01).
            15   TRC-CAL-TO-KAL-TBL-G-DA-LEAP      PIC 9(02).
            15   FILLER                             PIC X(01).
            15   TRC-CAL-TO-KAL-TBL-G-MO-N-LEAP    PIC 9(02).
            15   FILLER                             PIC X(01).
            15   TRC-CAL-TO-KAL-TBL-G-DA-N-LEAP    PIC 9(02).
            15   FILLER                             PIC X(03).
            15   TRC-CAL-TO-KAL-TBL-K360-DAY       PIC 9(03).
```

FIG. 30H

```
008520  **********  C619 * *  *DAYS SINCE/UNTIL  FISCAL  QTR  PREV BEGI
008530              MOVE 'C619'                   TO TRC-CONVR-FUNCTION-CODE
008540              MOVE '01'                     TO TRC-CONVR-FISCYR-START
008550              MOVE '01'                     TO TRC-CONVR-FISCMO-START
008560              MOVE 'T'                      TO TRC-CONVR-END-PNTS-DEF
008570              MOVE 'CCYYMMDD'               TO TRC-CONVR-FROM-DATE-MASK
008580              MOVE ?-USER-FROM-DATE
008590                                            TO TRC-CONVR-FROM-DATE-X
008591              EXEC CICS LINK PROGRAM ('TCDSENG')
008592              COMMAREA (TRC-CONVERSATIONAL) LENGTH (1000)
008593              END-EXEC
008594              IF  TRC-CONVR-RETURN-GOOD
008595                  MOVE TRC-CONVR-OUT-NUMERIC-PARM
008596                    TO ?-USER-OUT-NUMERIC
008597              ELSE
008598                  PERFORM ?-USER-ERROR-ROUTINE
008599
```

FIG. 41

DATE LOGIC GENERATOR

BACKGROUND OF THE INVENTION

The present invention is directed to a system for assisting a date logic programmer in the generation of date logic, and also to such a system where the generated date logic can be subjected to a series of tests so that the date logic programmer can confirm that correct and appropriate date logic has been generated.

Traditionally, date logic code for a calendaring program is written by a programmer "by hand," and therefore must be thoroughly tested to insure that the date logic code functions as intended. In some cases, the programmer will have written similar or equivalent code, or will have access to similar or equivalent code, which can be copied to the appropriate location in the calendaring program. Even if the copied code is at first inspection equivalent to the code required, the input and output parameters must be altered so as to interface correctly given the new location of the code. Although this somewhat reduces the likelihood of programming errors, it by no means eliminates the chance that the date logic code will not function correctly, since the date logic may not be equivalent or as similar as thought, or may not interface as thought with the environment provided by the surrounding program. Therefore, the code must still be tested thoroughly to insure that it functions as intended.

To test the calendaring function the programmer must first compile the new code, then run the code, and then compare the output from the code with the output expected in view of data values supplied by the data files or internally generated by the program. This is time consuming and inconvenient for a number of reasons: the program must be recompiled after every alteration of the code; the values in the data files may produce output values from the calendaring function which will not be easy to verify as correct; or internally-generated data values may produce output values from the calendaring function which will not be easy to verify as correct. Alteration of the internally-generated data values is therefore generally extremely inconvenient.

The date logic generator of the present invention provides a calendaring utility which generates calendaring functions, and allows the programmer to test the calendaring functions in a straightforward manner without recompilation of the code. To use the date logic generator, a programmer enters a program in edit mode, locates a portion of the program where the computer code for a calendaring function is to be altered or new code is to be generated, and calls the date logic generator. The date logic generator provides an initial window with a choice of calendaring functions. Upon selecting a calendaring function, a parameters window for that function is provided. A number of first-level parameters titles are initially displayed in the parameters window, and if those parameters have default values, the default are also displayed. Depending on the specification by the programmer of the values of the first-level parameters, sub-windows with second-level parameters titles may be provided for specification, and if parameters have default values, then the default are also displayed. In general, depending on the specification by the programmer of the values of the n-level parameters, (n+1)-level parameters titles may be provided in sub-windows for specification. The displayed parameters titles provided at any time are only those whose values have been specified or whose values require specification, thereby making the utility simple to use.

When the programmer believes the calendaring function has been correctly specified, the operation of the function may be tested by the date logic generator of the present invention, without requiring recompilation of the computer code. To test the calendaring function the programmer invokes the testing utility, provides data for the calendaring function in a testing sub-window providing by the testing utility, and runs the testing utility. The programmer can then compare the output of the testing utility with an expected output and, if the output does not correspond to the output expected from the desired calendaring function, modify the values of the parameters of the calendaring function as appropriate. Further runs of the testing utility and modifications of the parameters of the calendaring function can be performed as needed.

By providing parameter windows where all but the required parameter titles are hidden, by allowing the testing of the calendaring functions with data provided by the programmer while in the utility, and by generating the computer code based on the specified parameters values, the date logic generator of the present invention is extremely advantageous. With the date logic generator of the present invention, calendaring code is generated more quickly, efficiently and accurately than previously possible.

The calendaring utility of the present invention includes a variety of calendaring functions, features and options which have been selected to provide a calendaring system which should perform most any required purpose. The many functions, features and options of the present invention are useful per se, and in combination provide a synergistic advantage by virtue of their completeness, so a programmer will not need to augment the calendaring functions provided.

The calendaring utility of the present invention allows the programmer to choose among at least ten different holiday tables. This can be useful if the programmer conducts business with outside areas of commerce, such as foreign commerce, or if various areas of the programmer's shop observe different holiday schedules.

The calendaring utility also allows the programmer to specify dates at least fifty-two different date formats. The utility also permits the programmer to define each day of the week as a processing day or a nonprocessing day. When processing and nonprocessing days are defined, holidays may be taken into consideration. The utility also allows the programmer to select any of the twelve months as the start of the fiscal year, and permits the programmer to specify day 01 through 28 as the start of the fiscal month. Additionally, the utility allows the programmer to specify whether the "from-date" and/or the "to-date" should be counted in calendaring calculations. The utility also provides implicit and explicit access to the current date.

The utility offers the programmer over three hundred functions. These functions fall into three basic groups: utility functions, calendar day functions, and processing day functions. Calendar day functions perform date calculations based on calendar days, and processing day functions perform date calculations based on processing days. Utility functions perform date calculations which are independent of calendar day and/or processing day considerations. Functions provided by the system allow for date calculations based on calendar or fiscal time units (i.e., years, months or quarters).

It should be noted that the year 2000 is rapidly approaching and there are a number of reasons why the upcoming century transition, from 1999 to 2000, poses problems to many currently existing calendaring systems. First, data processing systems that examine only the last two digits of the year may conclude, for instance, that the year 2000 is earlier than the year 1999, simply because 00 is less than 99. This is known as "inversion of years." Second, although the year 2000 is a leap year, data processing systems that have incomplete leap-year logic may not be aware that (although the years 1900 and 2100 are not leap years) the year 2000 is a leap year. Third, since the year 2000 ends in the digits '00', data processing systems that divide by the two-digit representation of the year run the risk of terminating abnormally. The calendaring functions of the present invention address these, and other calendar-related problems. The utility of the present invention can handle any four digit year, i.e., any year from 0001 through 9999. The system uses a set of rules which distinguishes all leap years from nonleap years in this range.

Among the functions provided by the utility of the present invention are conversions between a 360-day-year calendar and the Gregorian and Julian calendars. Gregorian dates are based on the Gregorian calendar where, according to the old rhyme, "Thirty days hast September, April, June and November; All the rest have thirty-one; Except for February which has 28 days clear; And 29 in each leap year." A Julian date has a year and a day-of-the-year between 1 and 365. For example, since January has 31 days, the Gregorian date of Feb. 5, 1995 is written in Julian form as 036/1995. Method and apparatus for conversion between Julian and Gregorian calendars are well-known in the art, and any efficient system can be used in conjunction with the calendar conversions of the utility of the present invention.

The 360-day-year calendar was developed for financial calculations because of the simplicity of a year where each month has 30 days. For instance, the day-of-the-year which is 46% of a year past March 1 is easily determined by noting that 169.2 is 46% of 360, and since it is easily determined that 169 equals 5×30 plus 19, an increment of 169 days in a 360-day-year is an increment of five months and nineteen days. Therefore, August 20 is 46% of a year past March 1 according to a 360-day-year calculation. Another advantage of the use of a 360-day year calendar is that many fractional year increments are equal to an integer number of months: one twelfth of a year is one month, one sixth of a year is two months, one fourth of a year is three months, one third of a year is four months, and one half of a year is sixth months. Although this type of simplification is not of as much use in the current age of microelectronics, many financial institutions still use 360-day-year methods for ongoing calculations which were started using a 360-day-year method. Also, 360-day-year methods are implemented in business or legal situations where such methods remain a standard.

Typically, conversion of Gregorian or Julian dates to 360-day-year dates and conversion of 360-day-year dates to Julian or Gregorian dates is accomplished using algebraic methods. However, such algebraic methods generate dates which do not actually exist, or generates gaps between existing dates. In contrast, the utility of present invention converts Gregorian calendar dates to dates of a 360-day-year calendar, and 360-day-year calendar dates to Gregorian calendar dates, using a single three-column 367-entry conversion table. A search table unit searches the conversion table from the bottom upwards, i.e., a table search index is initialized to a value of 367, and decremented by unity each time a comparison is made and a match is not found, thereby insuring that all Gregorian and Julian dates generated do exist An object of the present invention is therefore to provide a utility for assisting a date logic programmer in the generation of date logic.

Another object of the present invention is to provide a utility which reduces the likelihood of errors in the generation of date logic.

Another object of the present invention is to provide a utility for increasing the reliability of date logic code.

Another object of the present invention is to provide a straightforward and nontechnical utility for the generation of date logic.

Another object of the present invention it to provide a utility for the generation of date logic which displays only those parameter sub-windows which are relevant in view of the parameter values which have already been specified.

Another object of the present invention is provide a utility where date logic can be subjected to one or more real-time tests so that the programmer can confirm that correct and appropriate date logic has been generated.

Another object of the present invention is provide a utility with which a programmer can generate and test date logic source code without requiring the compilation of the code.

Another object of the present invention is provide a utility where a selected calendaring function or its parameters can be easily altered, particularly if tests indicate that an incorrect calendaring function or function parameters were previously specified.

Further objects and advantages of the present invention will become apparent from a consideration of the drawings and the ensuing detailed description.

The present invention is directed to a utility which generates computer code for a calendaring function at a selected location in a computer program. The utility includes a means for presenting a choice of calendaring functions on the computer display screen, a means for selecting the calendaring function from amongst the choice of calendaring functions, a means for presenting a choice of parameters associated with the calendaring function, a means for specifying values for the parameters, and a means for generating the computer code for the calendaring function with the specified parameter values at the selected location in the computer program.

BRIEF DESCRIPTION OF DRAWINGS

The accompanying drawings, which are incorporated in and constitute a part of the specification, schematically illustrate a preferred embodiment of the invention and, together with the general description of the preferred embodiment given below, serve to explain the principles of the invention.

FIG. 3 is a list of input and output parameters for the calendaring system of the present invention.

FIG. 5*b* is a table showing which reports and listings are generated when the input is good, bad, or nonexistent.

FIGS. 6–14, 15a-b, 16a-b, 17–23, 24a–d, 25a-b, 26a-b, 27a-b and 28a-b show examples of function calls according to the methods of the present invention.

FIGS. 30A–30H provide COBOL computer code for the calendar conversion table of the present invention.

FIG. 41 shows the code generated by the date logic generator for the DAYS SINCE/UNTIL function with parameter values as shown in FIG. 40.

DETAILED DESCRIPTION OF THE PREFERRED EMBODIMENT

Figure 1A:
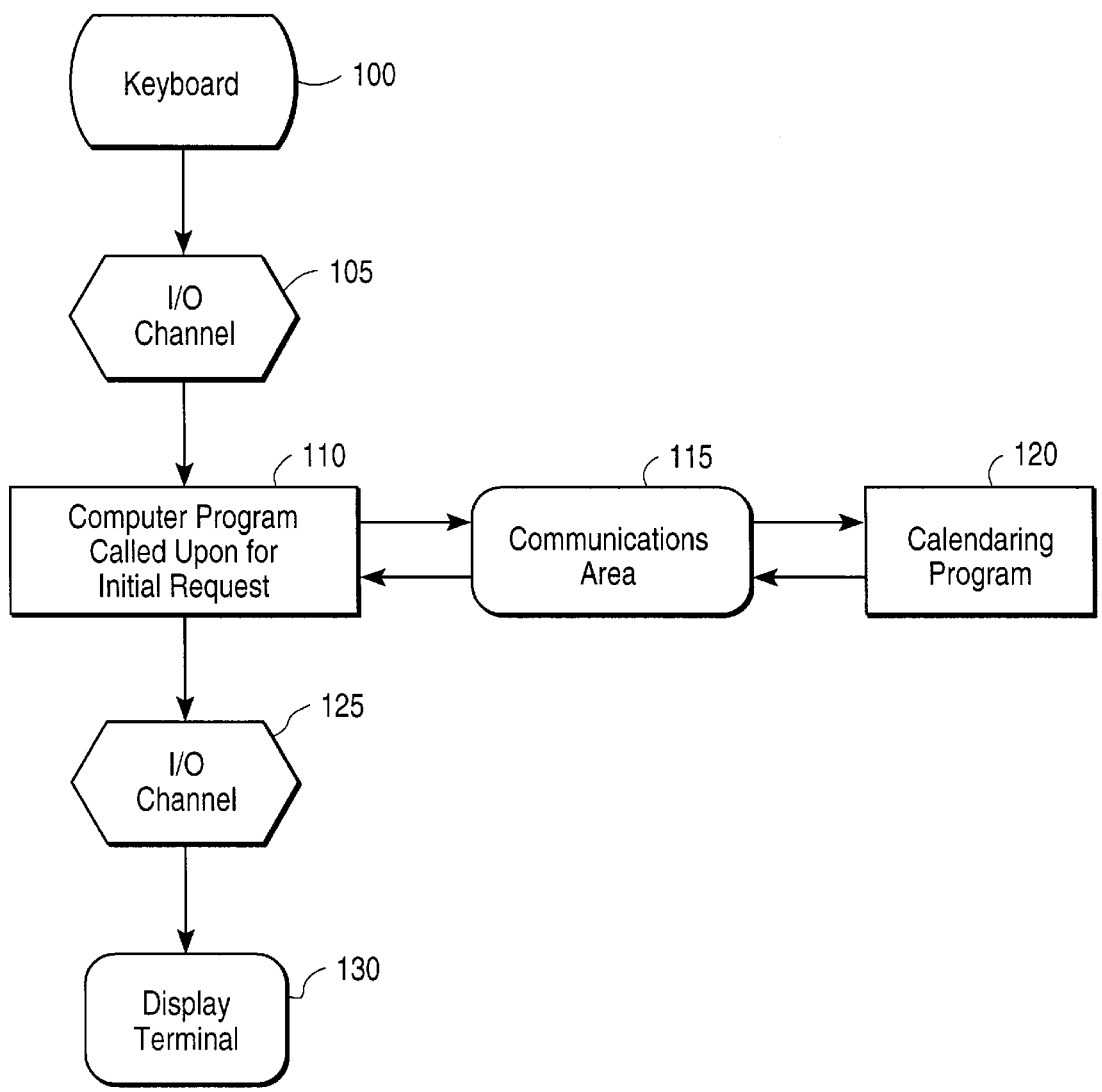
FIG. 1*a* is a schematic representation of a computer system utilizing the calendaring system of the present invention.

The present invention will be described in terms of a preferred embodiment. The preferred embodiment is a date logic generator with which a programmer can specify a calendaring function and the values of its parameters, test the calendaring function to insure it operates as expected, and generate the computer code for the calendaring function with the specified parameter values. The present specification includes a first section where the 365-day-year calendaring functions of the present invention are described, a second section where the 360-day-year calendaring functions of the present invention are described, and a third section where the date logic generator of the present invention is described.

365-Day-Year Calendaring Functions

The year 2000 is rapidly approaching and there are a number of reasons why the upcoming century transition, 1999 to 2000, poses problems to data processing calendaring systems. First, data processing systems that examine only the last two digits of the year may conclude, for instance, that the year 2000 is earlier than the year 1999, simply because 00 is less than 99. This is known as "inversion of years." Second, although the year 2000 is a leap year, data processing systems that have incomplete leap-year sensitive logic may not be aware that the year 2000 is a leap year, though the years 1900 and 2100 are not. Third, since the year 2000 ends in the digits '00', data processing systems that divide by the two-digit representation of the year run the risk of terminating abnormally.

The calendaring system of the present invention addresses these, and other calendar-related problems. The system can handle any four digit year, i.e., any year from 0001 through 9999. The system uses a set of rules which distinguishes all leap years from nonleap years in this range.

Leap-year rules were initiated in 46 B.C. by Julius Caesar, and modified in 1582 by Pope Gregory XIII. In the Julian calendar a leap year of 366 days occurs once every four years. Over the course of sixteen centuries this approach produced eleven days of error. In the leap year rules instituted by Pope Gregory XIII, a calendar year that is a multiple of 100 is not a leap year unless it is also a multiple of 400. The resulting Gregorian calendar represents a significant improvement over the Julian calendar and yields only about three days of error every 10,000 years.

The calendaring system of the present invention spans 10,000 years and so it is necessary to enhance the leap year rules further still. The leap-year rule of the present invention generates only one day of error every fifty thousand years. The result is a set of conversion processes that accurately handles dates ranging from Jan. 01, 0001 through Dec. 31, 9999. Dates prior to 1582 are handled as backward projections of the rules defined in 1582.

There are a variety of additional features and options available within the system of the present invention. These features and options have been selected to provide a calendaring system which should perform most any required calendaring function. The many features and options of the present invention are useful per se, and in combination provide a synergistic advantage by virtue of their completeness in that the user will not need to augment the calendaring functions provided.

The system allows the user to choose among ten different holiday tables. This can be useful if the user conducts business with outside areas of commerce, such as foreign commerce, or if various areas of the user's shop observe different holiday schedules.

The system also allows the user to specify dates in any of fifty-two different date formats. The system permits the user to define each day of the week as a processing day or a nonprocessing day. When processing and nonprocessing days are defined, holidays may be taken into consideration. The system also allows the user to select any of the twelve months as the start of the fiscal year, and permits the user to specify day 01 through 28 as the start of the fiscal month. Additionally, the system allows the user to specify whether the FROM-DATE and/or the TO-DATE should be counted in calendaring calculations. The system also provides implicit and explicit access to the current date.

The system offers the user over three hundred functions. These functions fall into three basic groups: utility functions, calendar day functions, and processing day functions. Calendar day functions perform date calculations based on calendar days, and processing day functions perform date calculations based on processing days. Utility functions perform date calculations which are independent of calendar day and/or processing day considerations. Functions provided by the system allow for date calculations based on calendar or fiscal time units, i.e. years, months or quarters.

The preferred embodiment is an apparatus and method for versatile and accurate calendaring. FIG. 1 is a schematic of a computer system utilizing the calendaring system of the present invention. A processing request is initiated at a human interface unit such as a keyboard 100 and is passed via an I/O channel 105 to a computer program 110. Such a request may, for instance, be a request to a database to determine units of a particular type shipped from a particular factory during a particular period. The aforementioned period may be specified as an initial date and a time period from that date. However, the database may only be equipped to handle requests which specify an initial date and a final date. Therefore, communications area 115 provides an interface for transferring the date request to the calendaring program of the present invention 120 which handles date computations. The date computation is performed by the calendaring program 120 and transferred back to the calling program 110 via the communications area 115. The calling program 110 then completes the computation of the request and forwards the answer via an I/O channel 125 to an output device such as a display terminal 130.

Figure 1B:
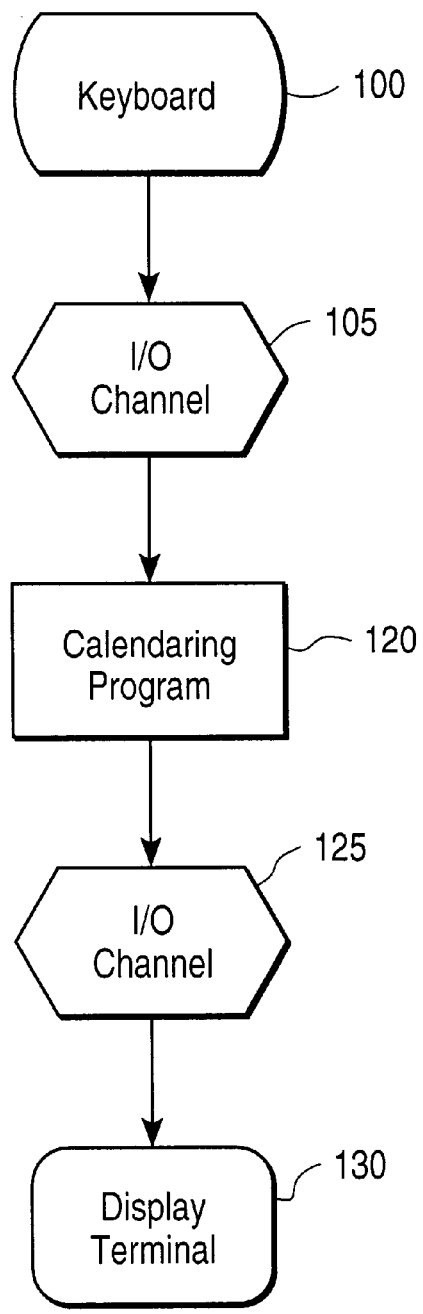
FIG. 1*b* is a schematic representation of an alternate computer system utilizing the calendaring system of the present invention.

FIG. 1b shows an alternate computer system utilizing the calendaring system of the present invention. In this system the calendaring program is accessed directly by the user. A processing request is initiated at a human interface unit such as a keyboard 100 and is passed via an I/O channel 105 to a computer program 110. Such a request may, for instance, be a request for the number of processing days between an initial date and a final date. A communications area (not shown in FIG. 1b) receives the request for the calendaring program of the present invention 120 which handles date computations. The date computation is performed by the calendaring program 120 and transferred to the display terminal 130 via the communications area and the I/O channel 125.

Figure 2:
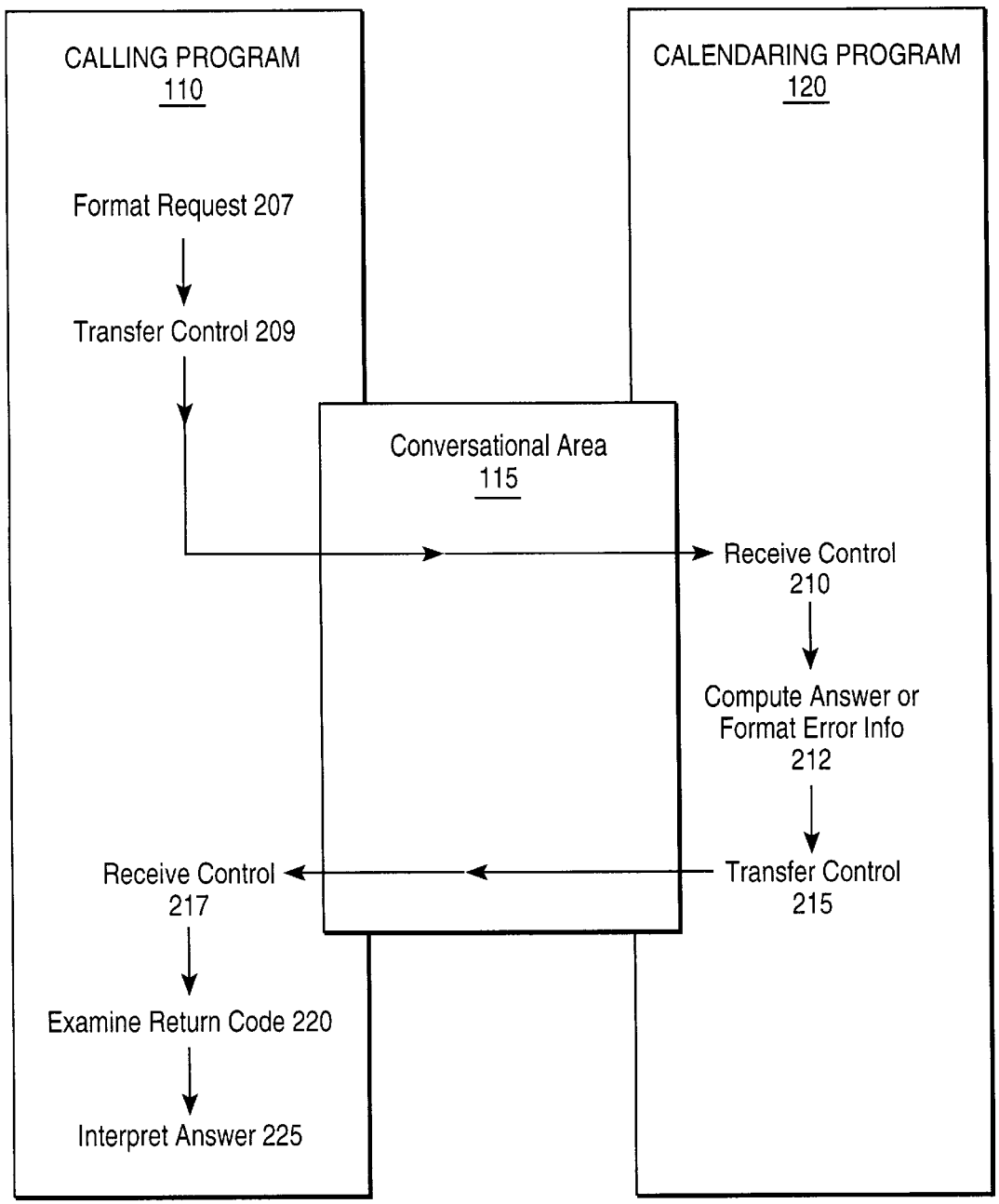
FIG. 2 is a diagram of interactions between the calling program and the calendaring program of the present invention.

FIG. 2 is view of the interface between the calling program 110 and the calendaring program 120 of FIG. 1a. The calling program 110 formats a request 207 and then transfers control 209 via the conversational area 115 to calendaring program 120 of the present invention. The method of invocation can vary. For instance, in COBOL programming language a "CALL" statement or a "LINK" statement may be used. The calendaring program 120 then receives control of the request 210 and examines the request. If the request is valid, an answer will be formatted 212 and transferred 215 via the conversational area 115 to the calling program 110. If the request is not valid, an error number and text will be formatted instead. When the calling program 110 receives control of execution 217 it examines the return 220 for an error condition before any other operation since if the return code is bad, the other output areas have no meaning. However, if the return code is good, the calling program 110 interprets the answer 225.

There are a number of standards and conventions used within the system of the present invention which are described below:

1. The system treats Sunday as the first day of the week, and Saturday as the seventh day of the week. This corresponds to the arrangement of the days of the week on the calendar. Though the user is able to assign arbitrary numerical values to the days of the week, the first position in fields of seven characters representing days of the week will always represent Sunday, and so on.

2. The number of days that have elapsed since Jan. 01, 0001 is termed the "absolute days". The integer absolute days value 00000001 is defined equal to the date of Jan. 01, 0001, and according to the leap-year rules discussed above the absolute days value 03652056 is then equal to the date of Dec. 31, 9999.

3. The system distinguishes between a calendar day and a processing day. A calendar day is any day of the calendar year and a processing day is a business day or a work day. Processing days are defined for each day of the week, and may take holidays into account.

4. The literal "CURRDATE" may be entered into either the FROM-DATE field or the TO-DATE field (see below), and generates the current date.

5. The system maintains consistency between two basic types of functions. The first basic type of function computes the number of days between two dates. For example there are 3 days between Mar. 15, 1994 and Mar. 18, 1994. The second basic type of function calculates a date based on a starting date and a numerical increment. For example, Mar. 15, 1994 plus 3 days results in Mar. 18, 1994. "FROM-DATE" specifies the starting point; "TO-DATE" specifies the ending point; "DIRECTION" specifies the bearing from the FROM-DATE to the TO-DATE; and "DISPLACEMENT" specifies the actual number of days that lie between the two dates. The principles of FROM-DATE, TO-DATE, DIRECTION and DISPLACEMENT are exemplified in the examples below:

| DAYS BETWEEN | | DATE +/− N Days | |
| --- | --- | --- | --- |
| FROM-DATE | Mar 15, 1994 | FROM-DATE | Mar 15, 1994 |
| TO-DATE | Mar 18, 1994 | DIREC/DISPL | +3 |
| DIREC/DISPL | +3 | TO-DATE | Mar 18, 1994 |
| FROM-DATE | Mar 18, 1994 | FROM-DATE | Mar 18, 1994 |
| TO-DATE | Mar 15, 1994 | DIREC/DISPL | −3 |
| DIREC/DISPL | −3 | TO-DATE | Mar 15, 1994 |

FIG. 3 is a reference list of the parameters which may be routed through the conversational area 115. The parameters include business parameters, input parameters, and output parameters. Although all parameters include the prefix "TRC-CONVR-" in the preferred embodiment, this prefix is omitted in the following discussion for ease of presentation. Each row of the business, input and output parameters sections of FIG. 3 contains a parameter name, and may also contain the term "PIC" followed by the character type and length for the parameter; the term "VALUE", followed by a preset default value for the parameter; and/or a comment. Alphanumeric characters (including standard special characters such as hyphens, commas, etc.) are represented by an "X", and numeric characters (the numerals 0 through 9) are represented by a "9". The length of the character string for the parameter is the number in parentheses following the character type. For instance, "X(02)" represents an alphanumeric character string of length two, and "9(3)" indicates a numeric character string of length three.

The business parameters are global settings that are in effect for every invocation of the system. The system administrator will assign initial values to these parameters to serve the needs of most of the company. Therefore, the user can probably leave these parameters untouched. However, if a user has any special requirements, he or she may change the value of any business parameter at any time.

The business parameter HOLIDAY-TBL specifies the holiday table that the user would like to reference. The preferred embodiment of the present invention provides ten holiday tables, though a program with more holiday tables is within the scope of the invention. The system administrator can inform users which tables contain which holidays.

The parameter FISCYR-START specifies the first month of the fiscal year, and its permitted values range from 01 through 12. The system uses this parameter when it performs a function related to the endpoints of a fiscal year or quarter. For example, FISCYR-START is used in the determination of answers to the questions "What is the beginning of the next fiscal quarter?" or "What was the end of the previous fiscal year?". If the company's fiscal year coincides with the calendar year, then this parameter is left at the default value of 01.

The parameter FISCMO-START specifies the first day of the fiscal month, and its value can range from 01 through 28. The system uses this value when it performs a function related to the endpoints of the fiscal year, quarter or month. For example, FISCMO-START is used in the determination of answers to the queries "What is the beginning of the current fiscal month?" or "What was the end of the previous fiscal quarter?". If the company's fiscal month coincides with the calendar month, then this parameter is left at the default value of 01.

The parameter END-PNTS-DEF specifies which of the date end-points the system will consider when it performs date calculations. There are four possible values for this parameter:

B=Both FROM-DATE and TO-DATE
N=Neither FROM-DATE or TO-DATE
F=FROM-DATE only
T=TO-DATE only The use of "T" to yield "common sense" answers is highly recommended. It should be noted that this parameter is used explicitly in the series 100, series 200 (except 207), series 600, and series 700 functions. This parameter is set implicitly to "T" for the function 207, and is set implicitly to "B" for the 800 series. These series of functions are described below.

If the user uses the values "B" or "N", and specifies dates that are equal, or a direction/displacement of zero, then the user may receive an error message. This error message will say that the user has attempted a restricted operation. Consider a request to calculate the number of days between Jan. 14, 1995 and Jan. 14, 1995 with neither end point to be included. The solution to such a problem is undefined so the system restricts such operations, rather than assigning an arbitrary answer such as zero.

It is important to understand the manner in which the processing day definition and END-PNTS-DEF work together. Let us suppose that the user wants to know the number of processing days from Sep. 06, 1993 to Sep. 09, 1993. Let us further suppose that Monday, Sep. 06, 1993 is a holiday, and that the user does not want to consider it a processing day. Under these circumstances the importance of specifying whether the end points are to be included or excluded is highlighted. If the end points parameter is set to "T" then the answer is 3 since the range of dates includes 07, 08, and 09, and all of these days qualify. However, if the end points parameter is set to "F" then the answer is 2, since the range of dates includes 06, 07, and 08, but 06 does not qualify because it is not a processing day.

The parameter DOW-STRING allows the user to define the numerical values that correspond to each day of the week. In the preferred embodiment, position 1 corresponds to Sunday and position 7 corresponds to Saturday. For each day of the week any numerical value is accepted, although repeat values are not allowed. Three common standards are shown below:

The preferred embodiment 1,2,3,4,5,6,7
IBM CICS 0,1,2,3,4,5,6
ANSI (and IBM COBOL II) 7,1,2,3,4,5,6

The parameter PROC-DAY-DEF is composed of 7 fields—one for each day of the week. In the preferred embodiment, position number 1 corresponds to Sunday, and position number 7 corresponds to Saturday. For each day, the user specifies one of the values "A", "N", "E", or "I". Each value specifies a different rule regarding the inclusion or exclusion of holidays. Their meanings are as follows:

| | |
|---|---|
| A = Always | (Always a processing day) |
| N = Never | (Never a processing day) |
| E = Exclude | (A processing day only if not a Holiday) |
| I = Include | (A processing day, only if a Holiday) |

As an example, the value 'NEEEEEN' means the weekends and weekday holidays are not processing days.

The parameter CENTURY-BREAK allows the user to tell the system how to assign a value to the century when the supplied date does not explicitly contain the century. The parameter has the following syntax: "AA/BB; CC". The variable CC specifies a breakpoint, and the values AA and BB specifies contiguous centuries. If the value of the year of century is less than CC then the century is assigned the value AA, and otherwise the century is assigned the value BB. For example, the value "19/20; 50" translates to: If the year is between 00 and 49, then the century is assigned the value 20, otherwise the year is between 50 and 99, and the century is assigned the value 19.

The parameter FROM-DATE-MASK allows the user to define the format of the FROM-DATE. Specification of the mask determines the arrangement of various pieces of date information, such as year, month and day. There are five date elements: "CC" for the century, "YY" for the year of century, "MM" for the Gregorian month, "DD" for the Gregorian day, and "DDD" for the Julian day. In the mask the user must specify a filler character "-", that would correspond to leading zeroes for a numeric Cobol "MOVE", or correspond to trailing spaces for an alphanumeric Cobol "MOVE", when using less than the full eight digits. There are 52 different Gregorian and Julian formats. Consider the following examples where CENTURY-BREAK has the default value "19/20; 50":

| MASK | VALUE | DATE |
|---|---|---|
| ---YYDDD | ---22005 | January 5, 2022 |
| YYDDD--- | 58040--- | February 9, 1958 |
| --YYMMDD | --760410 | April 10, 1976 |
| YYMMDD-- | 490228-- | February 28, 2049 |
| CCYYMMDD | 19930605 | June 05, 1993 |
| DDCCYYMM | 05199306 | June 05, 1993 |

The parameters TO-DATE-MASK, OUT1-DATE-MASK, OUT2-DATE-MASK, and OUT3-DATE-MASK define the formats of TO-DATE, OUT1-DATE, OUT2-DATE, and OUT3-DATE, respectively. Their use is completely analogous to that of FROM-DATE-MASK described above.

The input parameters shown in FIG. 3 under the heading INPUT-PARAMETERS are parameters that a user passes to the system. The four-digit parameter FUNCTION-CODE specifies the task that the user wants the system to perform. This parameter contains two components, FUNCTION-TYPE and FUNCTION-NUMBER. FUNCTION-TYPE is specified by a one character code where "U" signifies a utility function, "C" signifies a calendar day function, and "P" signifies a processing day function. The FUNCTION-NUMBER is specified by a three-digit numerical value. Particular functions are described in detail below.

The parameter FROM-DATE serves two purposes. If a function requires only one date, then that date goes into a FROM-DATE field. If a function requires both a FROM-DATE and a TO-DATE, then obviously, the "from date" goes into the FROM-DATE field. The format of the FROM-DATE is defined by the FROM-DATE-MASK as discussed above. If the user enters the literal "CURRDATE" into the FROM-DATE field, then the current date will be substituted into the FROM-DATE field. This is termed an "implicit" use of the current date. The current date may be determined by reading the system clock, a file containing the current date, or an entry in a relational database.

The FROM-DATE is actually stored in two storage registers, FROM-DATE-9 and FORM-DATE-X. FROM-DATE-9 contains the FROM-DATE in a numeric field of eight characters, and FROM-DATE-X contains the FROM-DATE in an alphanumeric field of eight characters. When the FROM-DATE is initialized in either one of the registers, the system of the present invention automatically initializes the other register as well. Storing the FROM-DATE in these two formats provides additional flexibility and transportability to the system.

The parameter TO-DATE specifies the TO-DATE for functions that require such a date. The format of the TO-DATE is defined by the TO-DATE-MASK and the value of the parameter is stored in a storage register. Again, if the user enters the literal "CURRDATE" into the TO-DATE field, then the current date will be substituted into the field. Again, this is termed an "implicit" use of the current date.

The parameter IN-NUMERIC-PARM specifies a DIRECTION and DISPLACEMENT in number of days. The DIRECTION is specified by a leading sign character, S, and the displacement is specified by the subsequent eight digits. The sign is separate from the direction, rather than encoded into the direction, thereby allowing IN-NUMERIC-PARM to be transported to other programs and computers. If a user wants to know the date that is 4 days later than Mar. 15, 1997, then he or she would put a value of +4 into IN-NUMERIC-PARM. If the user wants to know the date that is 6 days before Mar. 15, 1997, then he or she would put a value of -6 into IN-NUMERIC-PARM. For function 207 (see below), the value of IN-NUMERIC-PARM must be nonzero. For odd functions in the range 801 through 836 (see below), the value of IN-NUMERIC-PARM must be greater than zero, while for even functions in the range 801 through 836 (see below), the value of IN-NUMERIC-PARM must be less than zero.

The parameter IN-ALPHA-PARM specifies the days of the week that the user wants to consider when working with function 207 (see below) and the functions 801–836 (see below). The parameter has seven fields corresponding in order to the days of the week Sunday through Saturday. The user specifies "Y" for "yes" or "N" for "no", for each day of the week to instruct the system which days of the week to include in its calculations.

The output parameters contain values that the user receives from the system. The output parameters include return codes, date data, and numeric data.

The output parameter RETURN-CODE contains information regarding the completion of the task. It contains a three-digit return number, RETURN-NUM, and an eighty-character return text, RETURN-TEXT. RETURN-NUM specifies whether the return is a good return (000) or a bad return (001–999). The calling program 110 interfaced to the calendaring program of the present invention 120 should test the value of the return number every time the system is invoked. If the return number specifies a bad return, then the other output areas have no meaning.

The 80 character RETURN-TEXT elaborates on the meaning of the value of RETURN-NUM. If RETURN-NUM has a value of is 000, then RETURN-TEXT will say "GOOD RETURN." However, if the RETURN-NUM is 001–999, then the RETURN-TEXT will contain a descriptive message.

If the function that the user has specified results in the calculation of a date, then that date will be found in four different date fields. The first of the output date fields is STDOUT-DATE. It is an eight character field representing the system standard format of "CCYYMMDD". STDOUT-DATE is provided for the user automatically. The parameters OUT1-DATE, OUT2-DATE and OUT3-DATE are the second, third and fourth output date areas. Their formats are specified by OUT1-DATE-MASK, OUT2-DATE-MASK and OUT3-DATE-MASK, as discussed above.

The parameter OUT-NUMERIC-PARM serves two purposes. Most of the time, OUT-NUMERIC-PARM specifies the answer to such questions as "How many calendar days are there from Aug. 15, 1997 to Aug. 23, 1997?" or "How many calendar days are there from Sep. 19, 1994 to Sep. 13, 1994?" In the first example the answer is +8 and in the second example the answer is -6. For inquiries of this type, the answer always specifies an eight-digit displacement and a direction by providing a plus or minus sign before an integer. In other cases OUT-NUMERIC-PARM denotes answers to specific questions posed by utility functions U002 through U007, as listed in the below:

| FUNC | TASK | OUT-NUMERIC-PARM | |
|---|---|---|---|
| U002 | Valid Date? | 0 - NO; | 1 - YES |
| U003 | Leap Year? | 0 - NO; | 1 - YES |
| U004 | Holiday? | 0 - NO; | 1 - YES |
| 005 | Processing Day? | 0 - NO; | 1 - YES |
| U006 | Day of Week | See DOW-STRING | |
| U007 | Absolute Days | 00000001 - 03652056 | |

The system provides the user with four classes of functions: utility functions, basic functions, extended functions, and advanced functions. Any date calculation utilizing these functions is based on day counting according to the flow charts shown in FIGS. 5c and 5d, and a leap-year determination method according to the flow chart shown in FIG. 4a.

Figure 4A:
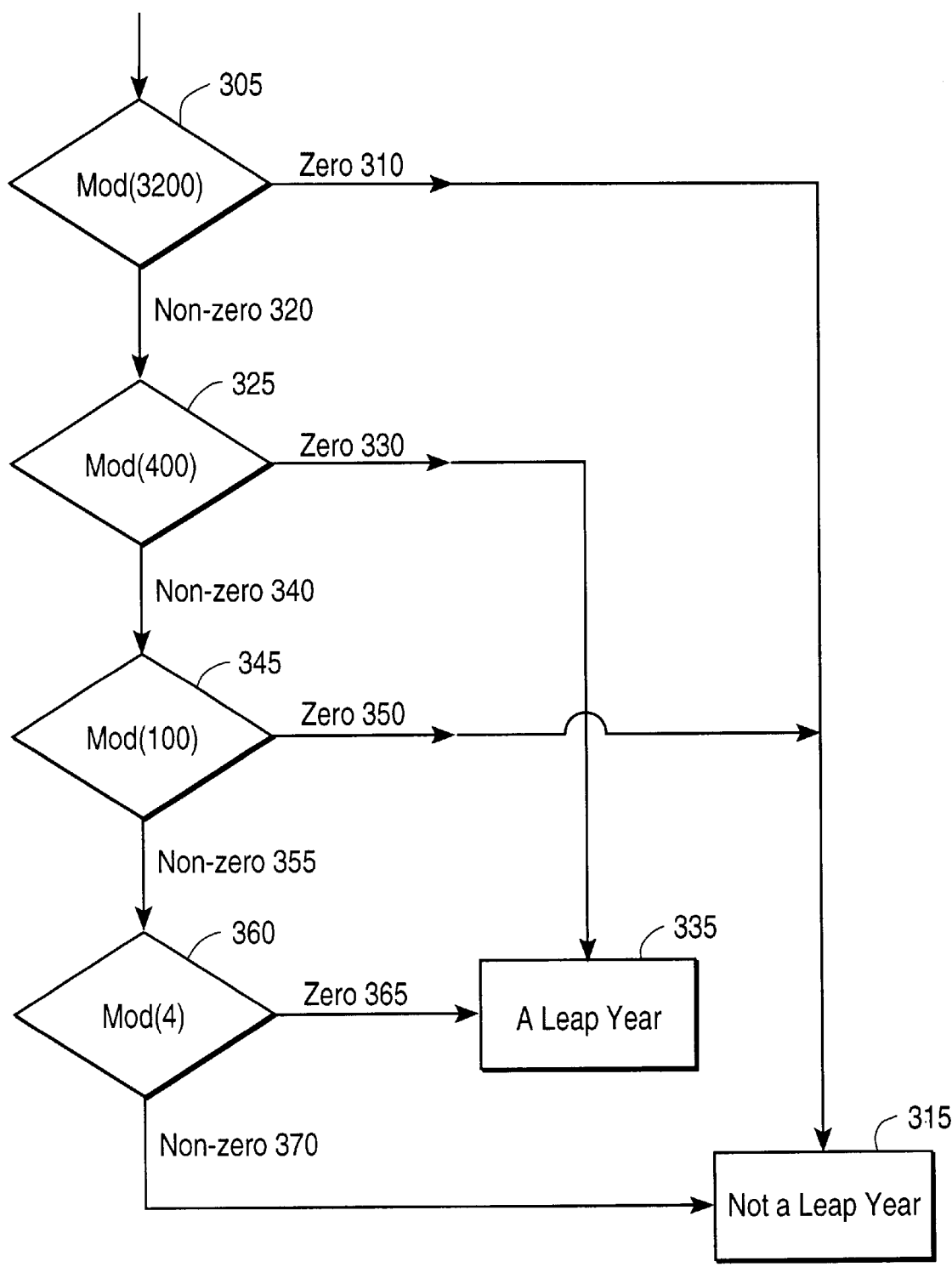
FIG. 4*a* is a flow chart for the method for determination of leap years according to the present invention.

As shown in FIG. 4a, the leap year status of a year is determined by first calculating in Mod(3200) unit 305 the remainder when the year is divided by 3200. If the remainder is zero 310 it is then concluded that the year is not a leap year 315 and this status is stored in a leap year status register (not shown). Otherwise, the nonzero remainder 320 is passed to a Mod(400) unit 325 where the remainder of the output of the Mod(3200) unit 305 when divided by 400 is determined. If the remainder is zero 330 it is then concluded that the year is a leap year 335, and this status is stored in the leap year status register. Otherwise 340, the nonzero remainder is passed to Mod(100) unit 345 where its remainder when divided by 100 is determined. If the remainder is zero 350 then it is concluded that the year is not a leap year 315, and this status is stored in the leap year status register. Otherwise 355, the nonzero remainder is passed to the Mod(4) unit 360 where its remainder when divided by 4 is determined. If the remainder is zero 365 it is concluded that the year is a leap year 335, and this status is stored in the leap year status register. Otherwise 370, there is a nonzero remainder, it is concluded that the year is not a leap year 315, and this status is stored in the leap year status register.

It should be noted that the system described by the flow chart of FIG. 4a may be extended by the inclusion of other division units above the Mod(3200) unit 305 to generate a higher degree of accuracy. Alternatively, reduced accuracy may be produced by excluding the Mod(3200) unit 305, or the Mod(3200) unit 305 and the Mod(400) unit 325, etc.

Figure 4B:
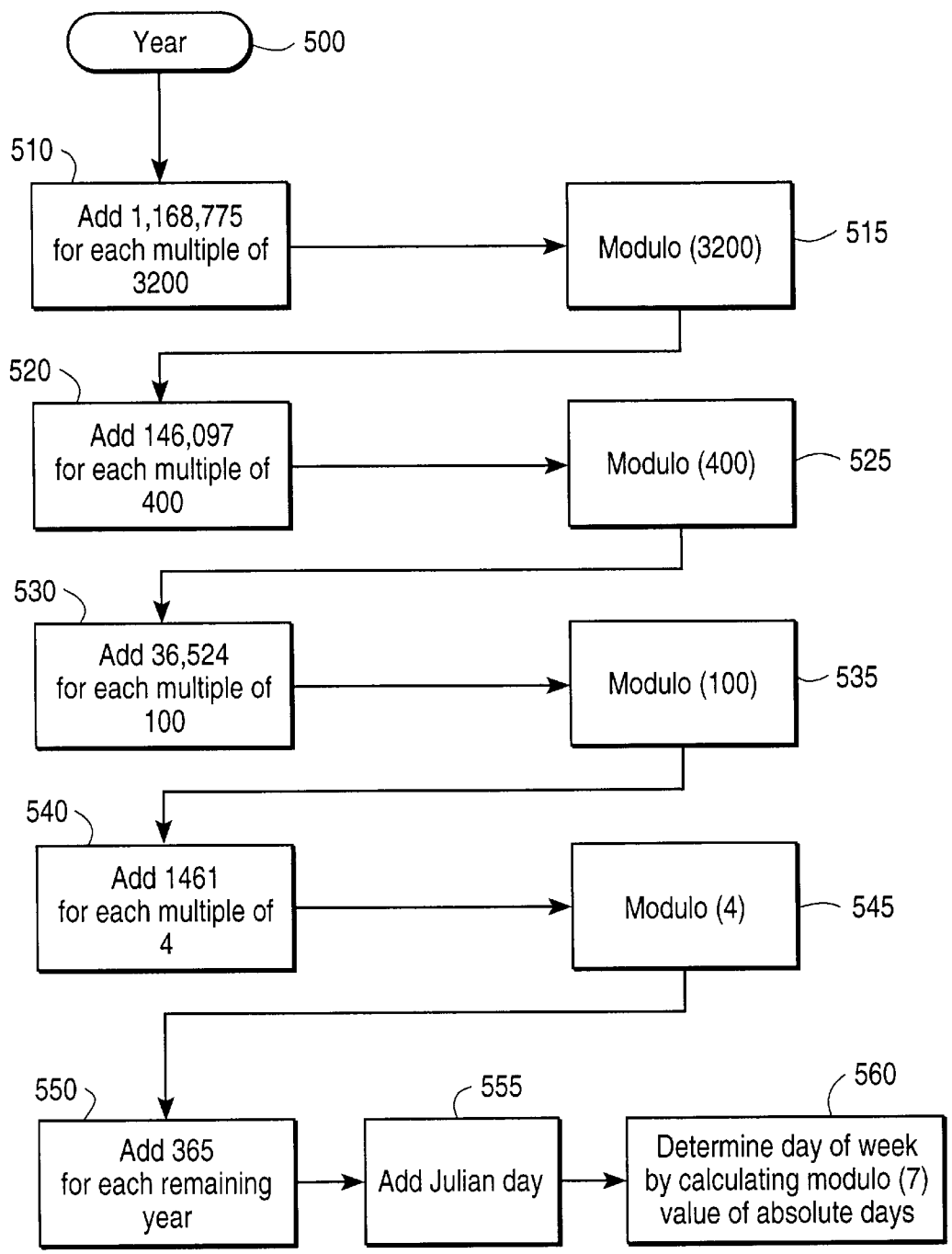
FIG. 4*b* is a flow chart for the method of calculation of the absolute days corresponding to a given date according to the method of determination of leap years shown in FIG. 4*a*.

To calculate the absolute days corresponding to a given date, the leap year rules described above and depicted in FIG. 4a are applied as shown in the flow chart of FIG. 4b. In calculating the absolute days corresponding to a date located in a year and having a Julian day value, the days in all the years prior to the year in which the date lies must be totaled, and then the Julian day value of the present year is added. Therefore the year 500 referred to in FIG. 4b is the year prior to the year containing the date. The absolute days is determined by first passing the year value 500 to a unit 510 which adds 1,168,775 to an absolute days register (not shown) for each multiple of 3200 in the year 500. Then, the value of the year 500 modulo(3200) is calculated 515, and passed to a unit 520 which adds 146,097 to the absolute days register for each multiple of 400 in the value produced by the modulo(3200) unit 515. The value generated by the modulo (3200) unit 515 is then passed to a unit 525 which calculates the modulo(400) value and passes this value to a unit 530 which adds 36,524 to the absolute days register for each multiple of 100 in this value. The value generated by the modulo(400) unit 525 is then passed to a unit 535 which calculates the modulo(100) value, and passes this value to a unit 540 which adds 1461 to the absolute days register for each multiple of 4 is the value generated by the modulo(100) unit 535. The value generated by the modulo(100) unit 535 is then passed to a modulo(4) unit 545. The value of the year 500 modulo(4) is passed to a unit 550 which adds 365 to the absolute days register for each year left, and in a final unit 555 the Julian day of the date is added to the absolute days register. For example, consider the date Jan. 15, 1993. Since $$1993-1=(4\times400)+(3\times100)+(23\times4),$$

the absolute days corresponding to Jan. 15, 1993 is (4×146,097)+(3×36,524)+(23×1461)+15=727,578. The day of week of a given date is then determined by passing the absolute days value to a unit 560 which calculates the absolute days value modulo(7). For instance, the day of week of Jan. 15, 1993 is Friday since the modulo(7) value of 727,578 is 5 and Jan. 1, 0001 was a Monday.

The system of the present invention permits the calling program 110 to reference ten different holiday tables. However, it should be understood that the present invention is not limited to having ten holiday tables, and a greater or lesser number of holiday tables is considered within the scope of the present invention. The system administrator defines all ten holiday tables, possibly under the advisement of a business analyst associated with the shop. Some or all of the holiday tables may be empty. Possible holiday tables may be based on federal holidays, state holidays, bank holidays, stock market holidays (domestic and/or foreign), or holidays of foreign countries.

Figure 5A:
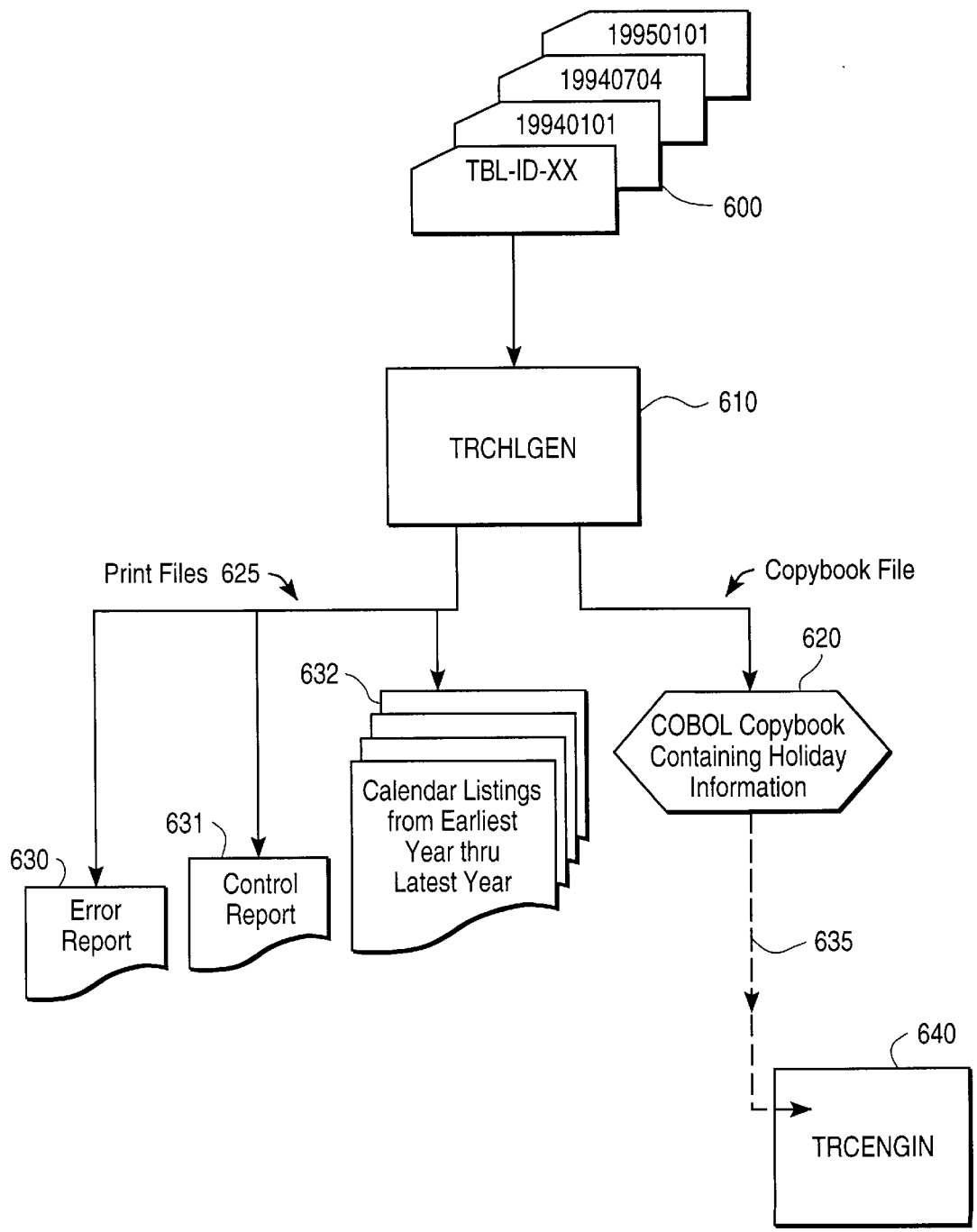
FIG. 5*a* is a diagram illustrating entry of holiday tables to the system of the present invention.

FIG. 5a shows the process required to define a holiday table. To create tables containing holidays is a two-pass operation through a holiday table generator TRCHLGEN 610. First, the system administrator enters two dates 600: January 1 of the earliest year and December 31 of the latest year for which the holiday listings are to be created.

The preprocessing program TRCHLGEN 610 creates three print files 625, namely an error report 630, a control report 631 and a calendar listing 632, to provide the system administrator with hard-copy results. (If TRCHLGEN 610 does not execute successfully at this point, then the job control language may have to be modified to tailor it to the host.) The error report 630, the control report 631, and the calendar listings 632 each contain 80 characters per line, to facilitate viewing from the remote terminal or monitor 130. These files may be stored for future reference. The error report 630 informs the system administrator of errors such as the entry of duplicate dates. The control report 631 informs the system administrator of the final status and statistics, i.e. the total number entries (in this case two) and the number of good and bad entries. The calendar listings 632 is provided if there were no errors in the input of the holiday information 600. The calendar listings 632 contains dates ranging from the earlier date to the later date. TRCHLGEN also creates a COBOL copybook 620 that contains the holiday information; in this case the two input dates are marked as holidays.

The calendar listings 632 are then used as a hardcopy "turnaround" document to identify and mark all of the holidays of interest for a second pass through TRCHLGEN 610. The holiday table information 600 is input to the system by first inputting a holiday table number with the format "TBL-ID=xx", where xx is a number in the range 01 through 10. This is followed by a sequence of "card-like" images, each containing one holiday date in columns 1–8 in the CCYYMMDD format. A card-like image with an asterisk in column one, will be treated as a comment.

Preprocessing program TRCHLGEN 610 checks each holiday date for errors and sorts all the holidays in each table in chronological order to detect duplicates. TRCHLGEN 610 creates a COBOL copybook 620 that contains the holiday information. The name of the copybook 620 is TRCHLTxx, where xx is a number in the range 01 through 10. The preprocessing program TRCHLGEN 610 again creates the three print files 625, namely an error report 630, a control report 631 and a calendar listing 632, to provide the system administrator with hard-copy results. The error report 630 informs the system administrator of errors such as the entry of duplicate holidays. The control report 631 informs the system administrator of the final status and statistics, i.e. the total number entries and the number of good and bad entries, of the program. The calendar listings 632 is provided if there were no errors in the input of the holiday information 600.

The copybook file 620 contains detailed and summary information relating to the holidays specified by the system administrator. The holidays of the copybook 620 may be transferred for storage 635 to the main component TRCENGIN 640 of the calendaring program 120 in ascending sequence in the absolute days format, possibly with the use of a COPY statement or an INCLUDE statement. Alternatively, the holidays may be held in a file or an ancillary subprogram which may be accessed 635 by the main component TRCENGIN 640. Precalculation of the absolute dates provides maximum efficiency during the execution of TRCENGIN 640.

As shown in the table of FIG. 5b, if TRCHLGEN 610 executes successfully and the input 600 is good, then there will not be an error report 630 because there were no errors. A control report 631 with a message saying "GOOD INPUT;

CALENDARS-YES, COPYBOOK-YES," and a calendar listing that ranges from January 1st of the earliest year through December 31st of the latest year with all chosen holidays marked, will be generated. Furthermore, the copybook 620 will contain all of the holiday information required by TRCENGIN 640.

However, if the input 600 is bad, then calendar listings 632 and a copybook 620 will not be generated, as is shown in the table of FIG. 5*b*. The control report will have a message saying "BAD INPUT; CALENDARS-NO, COPYBOOK-NO," and the error report 630 will be a detailed report showing all of the errors that were detected.

If all ten holiday tables are not needed, then empty tables must be created so that the total number of holiday tables is ten. To create an empty table, the program TRCHLGEN 610 is executed with only the TBL-ID=xx card 600 as input. As shown in the table of FIG. 5*b*, there will then be no error report 630 because there was no holiday input, the control report 631 will have a message saying "NO INPUT; CALENDARS-NO, COPYBOOK-YES," and the copybook 620 will have an empty holiday table.

All calendar-day calculations of a number of days between two dates are calculated by subtraction of absolute day values. If an END-PNTS-DEF of "T" or "F" is specified the number of days is simply equal to the difference between the absolute days values. However, if an END-PNTS-DEF of "N" is specified the absolute value of the difference is decreased by unity, and if an END-PNTS-DEF of "B" is specified the absolute value of the difference is increased by unity.

Figure 5C:
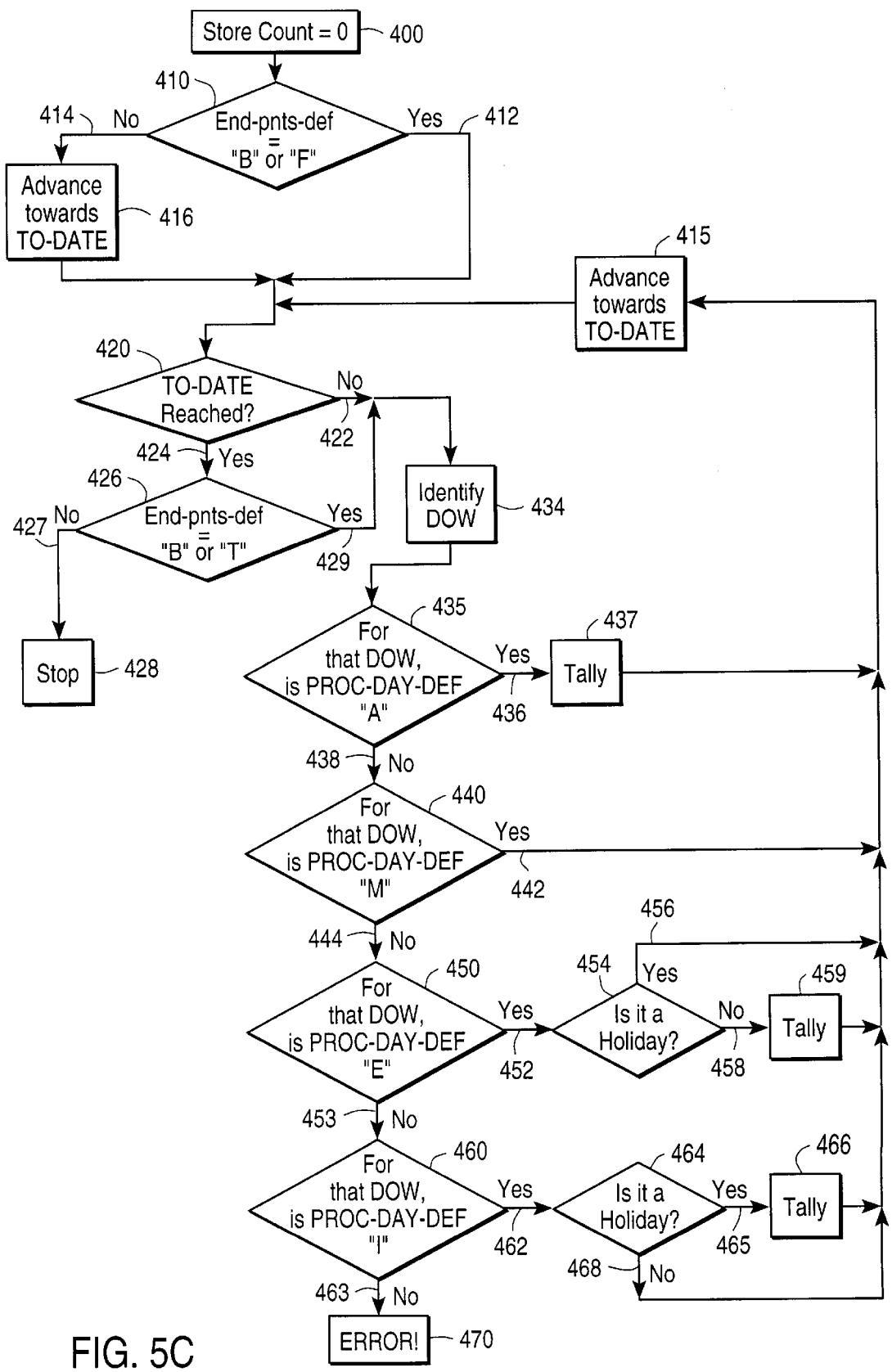
FIG. 5c is a flow chart for a method of counting days between a FROM-DATE and a TO-DATE, incorporating features such as changeable endpoints and processing day definitions, according to the present invention.

All processing-day calculations of a number of days between two dates are based on the day counting method shown in the flow chart of FIG. 5*c*. As shown in FIG. 5*c*, initially 400 a day counter register is set to a value of zero and the FROM-DATE is initialized according to the value provided by the date calculation call. Then a decision module 410 determines whether the value of END-PNTS-DEF is a "B" or an "F". If the answer is "NO" 414 the FROM-DATE is advanced towards the TO-DATE 416 since the initial FROM-DATE is not to be counted as an endpoint. Otherwise 412, the value of END-PNTS-DEF is "B" or "F" and the FROM-DATE is to be counted as an endpoint.

Then a decision module 420 tests whether the TO-DATE has been reached. If the answer is "YES" 422 then the process flow is directed to a decision module 426 which tests whether the value of END-PNTS-DEF is a "B" or a "T". If the answer is "NO" 427 END-PNTS-DEF does not have a value of "B" or "T", then the computation is complete and the day counter register holds the desired answer.

If the answer is "YES" 429 END-PNTS-DEF has a value of "B" or "T", or "NO" 422 the TO-DATE has not been reached, then the process flow is directed to a module 434 where the day of week (DOW) for the present FROM-DATE is identified. Decision module 435 then tests whether the PROC-DAY-DEF for that DOW has the value "A". If so 436 then the number in the day counter register is incremented by the tally routine 437 and the FROM-DATE is advanced towards the TO-DATE at the Advance Towards TO-DATE module 415.

If the PROC-DAY-DEF for that DOW is not "A" 438 then the process flow is directed to a decision module 440 which determines if the PROC-DAY-DEF for that DOW is an "N". If the answer is "YES" 442 then the FROM-DATE is advanced towards the TO-DATE at the Advance Towards TO-DATE module 415. If the answer is "NO" 444 then the process flow is directed to another decision module 450 which determines if the PROC-DAY-DEF for that DOW is an "E". If the answer is "YES" 452 then another decision module 454 determines if the FROM-DATE is a holiday by consulting the invoked holiday table. If the answer is "YES" 456 then the FROM-DATE is advanced towards the TO-DATE at the Advance towards TO-DATE module 415. However, if the answer is "NO" 458 then a tally routine 459 increments the day counter before advancing the FROM-DATE.

If it is determined that the PROC-DAY-DEF is not "E" 453 then the process flow is directed to another decision module 460 which determines if the PROC-DAY-DEF for that DOW is an "I". If the answer is "YES" 462 then a decision module 464 determines if the FROM-DATE is a holiday by consulting the holiday table. If the answer is "NO" 468 then the FROM-DATE is advanced towards the TO-DATE at the Advance Towards TO-DATE module 415. However, if the answer is "YES" 465 then a tally routine 466 increments the day counter before advancing the FROM-DATE at the Advance Towards TO-DATE module 415. If it is determined at decision module 460 that the PROC-DAY-DEF for that DOW is not "I" 463 then an error message is generated 470, since every DOW must be assigned one of the values "A", "N", "E", or "I" and according to the path of the process flow the DOW does not have one of these values.

After the FROM-DATE is advanced towards the TO-DATE at the Advance Towards TO-DATE module 415 the process flow is directed back to the decision module 420 that determines if the TO-DATE has been reached, and the process continues as before. The process terminates only when the stop 428 is reached.

All calendar-day calculations of a TO-DATE a target number of days from a FROM-DATE are determined by addition or subtraction of absolute day values. The absolute value of the target number is termed the "displacement" and the sign of the target number is termed the "direction". If the direction is positive the displacement is added to the absolute days value of the TO-DATE, and if the direction is negative the displacement is subtracted from the absolute days value of the TO-DATE. If the END-PNTS-DEF is "N" the TO-DATE is incremented by unity in the direction of the target number, and if the END-PNTS-DEF is "B" the TO-DATE is incremented by unity in the opposite direction of the target number.

Figure 5D:
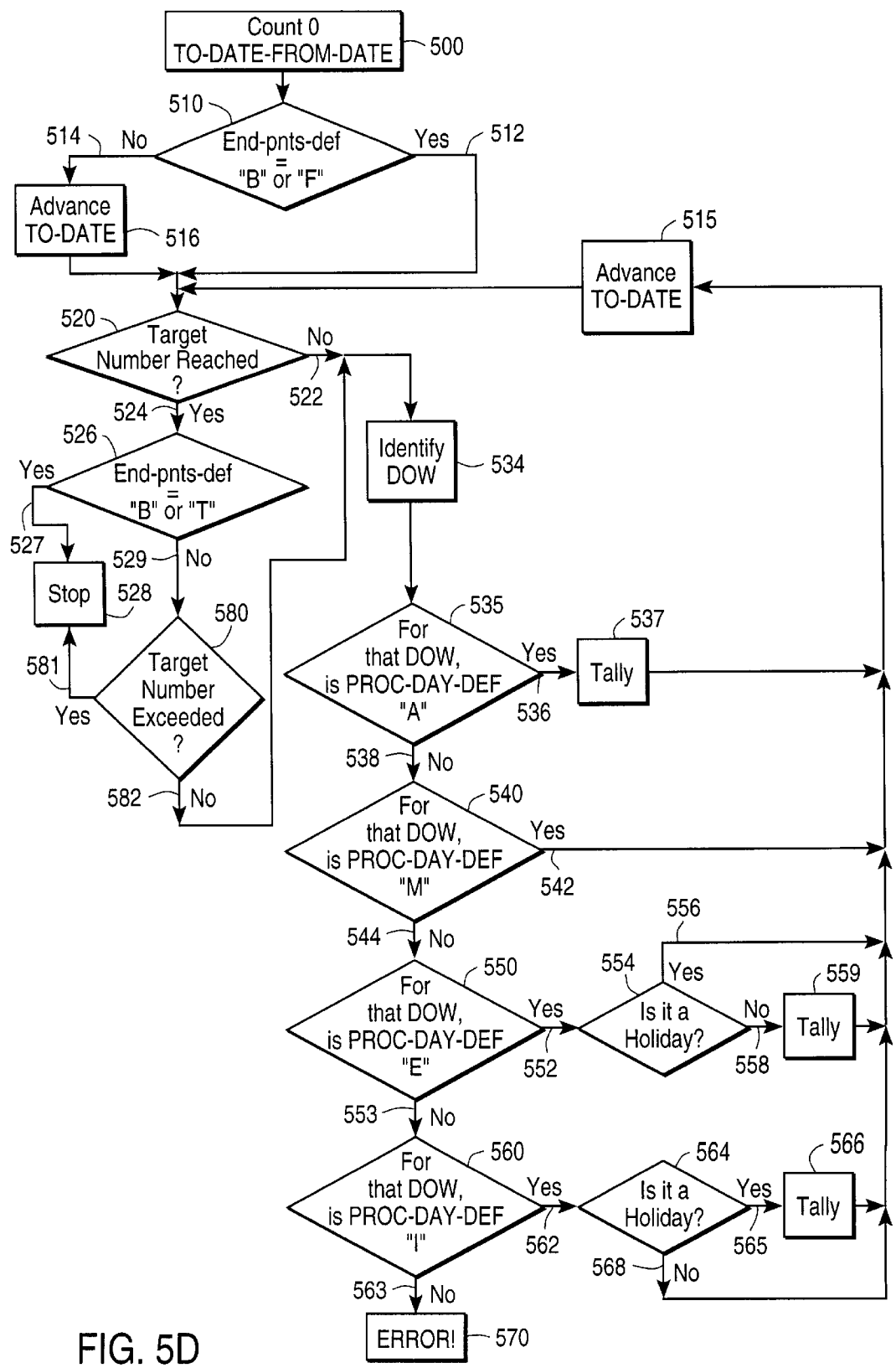
FIG. 5d is a flow chart for a method of determining a TO-DATE a specified number of days from a FROM-DATE, incorporating features such as changeable endpoints and processing day definitions, according to the present invention.

All processing-day calculations of a TO-DATE a target number of days from a FROM-DATE are based on the day counting method shown in the flow chart of FIG. 5*d*. As shown in FIG. 5*d*, initially 500 a day counter register is set to a value of zero and the TO-DATE is initialized to the value of the FROM-DATE. Then a decision module 510 determines whether the value of END-PNTS-DEF is a "B" or an "F". If the answer is "NO" 514 the TO-DATE is advanced since the initial FROM-DATE is not to be counted as an endpoint. Otherwise, the answer is "YES" 512 the value of END-PNTS-DEF is "B" or "F", and the FROM-DATE is to be counted as an endpoint, and the flow proceeds to a decision module 520.

Then a decision module 520 tests whether the target number stored in a target number register (not shown) has been reached by the counter number stored in the counter number register. If the answer is "NO" 522 then the process flow is directed to a module 534 which identifies the day of week (DOW) of the FROM-DATE. However, if the answer is "YES" 524 the target number has been reached then a decision module 526 tests whether the value of END-PNTS-DEF is a "B" or a "T". If the answer is "YES" 527 then the process flow stops 528, the computation is complete, and the TO-DATE register holds the desired answer.

If the answer is "NO" 529 the END-PNTS-DEF does not has a value of "B" or "T", then the process flow is directed to a decision module 580 which determines whether the target number has been exceeded. If the answer is "YES" 581 the target number has been exceeded, then the process ends 528 and the desired answer is stored in the TO-DATE register. Otherwise, the answer is "NO" 582 the target number has not been exceeded, and the process flow is directed to the module 534 which identifies of DOW of the FROM-DATE by the method discussed above and depicted in the flow-chart of FIG. 4b. Decision module 535 then tests whether the PROC-DAY-DEF for that DOW has the value "A". If the answer is "YES" 536 then the number in the day counter register is incremented by the tally routine 537 and the TO-DATE is advanced at the Advance Towards TO-DATE module 515.

If the PROC-DAY-DEF for that DOW is not "A" 538 then the process flow is directed to a decision module 540 which determines if the PROC-DAY-DEF for that DOW is an "N". If the answer is "YES" 542 then the TO-DATE is advanced at the Advance TO-DATE module 515. If the answer is "NO" 544 then the process flow is directed to another decision module 550 which determines if the PROC-DAY-DEF for that DOW is an "E". If the answer is "YES" 552 then another decision module 554 determines if the TO-DATE is a holiday by consulting the invoked holiday table. If the answer is "YES" 556 then the TO-DATE is advanced at the Advance TO-DATE module 515. However, if the answer is "NO" 558 then a tally routine 559 increments the day counter before advancing the TO-DATE.

If it is determined that the PROC-DAY-DEF is not "E" 553 then the process flow is directed to another decision module 560 which determines if the PROC-DAY-DEF for that DOW is an "I". If the answer is "YES" 562 then a decision module 564 determines if the TO-DATE is a holiday by consulting the holiday table. If the answer is "NO" 568 then the TO-DATE is advanced at the Advance TO-DATE module 515. However, if the answer is "YES" 565 then a tally routine 566 increments the day counter before advancing the TO-DATE at the Advance TO-DATE module 515. If it is determined at decision module 560 that the PROC-DAY-DEF for that DOW is not "I" 563 then an error message is generated 570, since every DOW must be assigned one of the values "A", "N", "E", or "I" and according to the path of the process flow the DOW does not have one of these values.

After the TO-DATE is advanced at the Advance TO-DATE module 515 the process flow is directed back to the decision module 520 that determines if the target number has been reached by the counter number, and the process continues as before. The process terminates only when the stop 528 is reached.

There are nine different utility functions, each specified by a one-character FUNCTION-TYPE, followed by a three digit FUNCTION-NUMBER. The FUNCTION-TYPE for all utility functions is the letter "U". The FUNCTION-NUMBER for utility functions ranges between 001 and 009. Below is a list of the utility function numbers and the corresponding names of the functions:

001 CURRENT DATE

002 VALID DATE?

003 LEAP YEAR?

004 HOLIDAY?

005 PROCESSING DAY?

006 IDENTIFY DAY OF WEEK

007 DATE CONVERSION TO ABSOLUTE DAYS

008 ABSOLUTE DAYS CONVERSION TO DATE

009 REFORMAT DATE

The CURRENT DATE function (U001) provides the current date. Let us assume that the current date is May 17, 1993. If, as shown in example 1 of FIG. 6, the OUT1-DATE-MASK specifies the mask CCYYMMDD, and the FUNCTION-CODE, U001, requests the current date. After the call the current date is placed in OUT1-DATE in the format specified by the mask. This is termed an "explicit" use of the current date. The current date may be determined by reading the system clock, a file containing the current date, or an entry in a relational database.

Example 2 of FIG. 6 is the same as Example 1, except that in Example 2 the OUT1-DATE-MASK specifies the mask CCYYDDMM, rather than CCYYMMDD. Therefore, in Example 2 the same date, May 17, 1993, is shown in a different format.

The function VALIDATE DATE, U002, determines whether a specified date is valid. Invalid dates include dates with nonnumeric characters and numbers which do not correspond to a date. If the date is valid, then the value returned in OUT-NUMERIC-PARM is 1, otherwise the value is 0. As shown in Example 1 of FIG. 7, FROM-DATE-MASK specifies the mask CCYYMMDD. The FUNCTION-CODE requests validation of the FROM-DATE, Feb. 17, 1993, provided in the CCYYMMDD format. That date is valid, so OUT-NUMERIC-PARM has a value of 1. Example 2 of FIG. 7, is the same as above, except that in this example the FROM-DATE is not valid since it contains the letter "W" and is not numeric. Therefore, OUT-NUMERIC-PARM has the value 0. Notice that the system has set the value of RETURN-NUM to 014 which has been defined to designate the error message "Bad From-Date".

The function LEAP YEAR determines if the specified date lies within a leap year. If it does, then the value returned in OUT-NUMERIC-PARM is 1, otherwise the value is 0. LEAP YEAR has a function code of U003. As shown in Example 1 of FIG. 8, a call to LEAP YEAR with the FROM-DATE-MASK of CCYYMMDD and the FROM-DATE of 20001225 (Dec. 25, 2000) returns OUT-NUMERIC-PARM with a value of 1 since the year 2000 is a leap year. In Example 2 the FROM-DATE is Dec. 25, 1995 and OUT-NUMERIC-PARM is 0 since 1995 is not a leap year.

The function HOLIDAY determines if the specified date is a holiday. If it is, then the value returned by OUT-NUMERIC-PARM is 1, otherwise the value is 0. HOLIDAY has a function code of U004. As shown in Example 1 of FIG. 9, the HOLIDAY-TBL field specifies Holiday Table 04, and the FROM-DATE-MASK specifies the format CCYYMMDD. The FUNCTION-CODE, U004, requests holiday status, and in this case the FROM-DATE is Jul. 4, 1996 (the Fourth of July) and is in Holiday Table 04, so OUT-NUMERIC-PARM is 1. Example 2 of FIG. 9 is the same as Example 1, except that the FROM-DATE, Feb. 3, 1994, happens not to be in Holiday Table 04. Therefore OUT-NUMERIC-PARM is 0.

The function PROCESSING DAY determines if the specified date is a processing day. If it is, then the value of OUT-NUMERIC-PARM is 1, otherwise the value is 0. PROCESSING DAY has a FUNCTION-CODE of U005. Example 1 of FIG. 10 shows that the HOLIDAY-TBL specifies table number 05, and the FROM-DATE-MASK specifies the format CCYYMMDD. Feb. 17, 1992 happens to be in Holiday Table 05, and is a Monday. The PROC-DAY-DEF, "AAAAAAA", indicates that each day of the week is to be considered a processing day. The FUNCTION-CODE U005 requests the processing day status of the FROM-DATE. Therefore, the system sets OUT-NUMERIC-PARM to the value 1. Example 2 of FIG. 10 is the same as above, except that the PROC-DAY-DEF, "NEEEEEN", means that Monday is specified as a processing day when it does not fall on a holiday. Therefore the system does not consider the FROM-DATE a processing day, and sets OUT-NUMERIC-PARM to the value 0.

The function DAY OF WEEK identifies the day of the week that corresponds to the specified date. The number value corresponding to the day of the week is determined by the value assigned to DOW-STRING, as discussed above. DAY OF WEEK has the function code U006. As shown in Example 1 of FIG. 11 the FROM-DATE-MASK specifies the format CCYYMMDD, and the DOW-STRING specifies the string of numerals "1234567". The FUNCTION-CODE, U006, requests the day of the week, and the FROM-DATE, Feb. 17, 1992 falls on a Monday, so the system sets OUT-NUMERIC-PARM to the value 2. Example 2 of FIG. 11 differs from Example 1 in that the DOW-STRING specifies the string "0123456". Since the FROM-DATE, May 19, 1993, is a Wednesday the system sets OUT-NUMERIC-PARM to the value 3.

The function DATE→ABSOLUTE DAYS (U007) converts the specified date into the absolute day count, i.e., the number of days since Jan. 01, 0001. As shown in Example 1 of FIG. 12, the FROM-DATE-MASK specifies CCYYMMDD, and the FUNCTION-CODE, U007, requests the absolute day count. The FROM-DATE, Jan. 01, 0001, has been defined as day 1, so the system sets OUT-NUMERIC-PARM to the value 1. In Example 2 the FROM-DATE, Jan. 1, 2005, corresponds to day 731947 so OUT-NUMERIC-PARM is set to this value.

The function ABSOLUTE DAYS→DATE (U008) converts the specified absolute day count into the corresponding calendar date. As shown in Example 1 of FIG. 13, the OUT1-DATE-MASK specifies the format CCYYMMDD, and the FUNCTION-CODE, U008, requests a conversion from absolute days to a calendar date. The IN-NUMERIC-PARM specifies day count 1, so the system sets OUT1-DATE to Jan. 01, 0001. In Example 2, the IN-NUMERIC-PARM specifies day count 731947, and the system sets OUT1-DATE to 20050101, i.e., Jan. 1, 2005.

The function REFORMAT DATE (U009) converts the specified FROM-DATE into the STDOUT, OUT1, OUT2, and OUT3 dates specified by the corresponding date masks as described above. As shown in Example 1 of FIG. 14, the system converts the FROM-DATE of 19920301 having the format CCYYMMDD specified by the FROM-DATE-MASK to the various output dates, whose formats are specified by the masks CCYYDDMM, YYMMDD-, and -CCYYDDD. Since 1992 is a leap year, as can be confirmed by use of the flowchart of FIG. 4a, March 1st corresponds to Julian day number 61 and the values of OUT1-DATE, OUT2-DATE and OUT3-DATE are therefore 19920103, 920301, and 01992061, respectively. In Example 2 the same date masks are used, but the year is 1993 rather than 1992. The year 1993 is not a leap year so March 1st corresponds to Julian day number 60 and the values of OUT1-DATE, OUT2-DATE, and OUT3-DATE are 19930103, 930301, and 01993060, respectively.

There are four "basic" functions. These basic functions perform the rudimentary calculations "DAYS BETWEEN" and "DATE+/−N DAYS". Each basic function is specified by a one-character FUNCTION-TYPE, followed by a three-digit FUNCTION-NUMBER. The FUNCTION-TYPE is either "C" or "P", where "C" means that the system considers all calendar days, and "P" means that the system considers only processing days. The FUNCTION-NUMBER for the basic functions is either 101 or 102, where 101 signifies "DAYS BETWEEN" and 102 signifies "DATE +/−N DAYS." The basic functions are also called the "100 series functions."

The function DAYS BETWEEN (C/P 101) counts the number of days from the FROM-DATE to the TO-DATE. If the FROM-DATE is earlier than the TO-DATE, the answer is positive. If the FROM-DATE is later than the TO-DATE, the answer is negative. In Example 1 of FIG. 15a, the function type "C" indicates that every calendar day qualifies. Since the parameter END-PNTS-DEF is assigned the value "T", the FROM-DATE corresponds to day count 0. According to the logic of FIG. 5c, the table below shows how the dates from the FROM-DATE of Sep. 3, 1993 to the TO-DATE of Sep. 7, 1993 are counted to provide the OUT-NUMERIC-PARM value of +4:

| DATE | QUALIFICATION | COUNT |
|---|---|---|
| 19930903 | N/A | +0 |
| 19930904 | YES | +1 |
| 19930905 | YES | +2 |
| 19930906 | YES | +3 |
| 19930907 | YES | +4 |

In Example 2 of FIG. 15b the function type is "P", so only processing days are counted. The processing day definition, PROC-DAY-DEF, is "NEEEEEN" so weekends are not counted, and weekdays are counted when not holidays. Sep. 6, 1993 happens to be in Holiday Table 06, and is a Monday so the table below shows how the dates are counted to provide the PARM value of +1:

| DATE | QUALIFICATION | COUNT |
|---|---|---|
| 19930903 | N/A | 0 |
| 19930904 | NO (Saturday) | 0 |
| 19930905 | NO (Sunday) | 0 |
| 19930906 | NO (Holiday) | 0 |
| 19930907 | YES | +1 |

Examples 3 and 4 of FIG. 15b, are similar to Examples 1 and 2 of FIG. 15a, except that the FROM-DATE and the TO-DATE have been reversed. The table below shows how the days are counted in Example 3 to provide the OUT-NUMERIC-PARM value of −4:

| DATE | QUALIFICATION | COUNT |
|---|---|---|
| 19930907 | N/A | 0 |
| 19930906 | YES | −1 |
| 19930905 | YES | −2 |
| 19930904 | YES | −3 |
| 19930903 | YES | −4 |

The table shows how the days are counted in Example 4 to provide the OUT-NUMERIC-PARM value of −1:

| DATE | QUALIFICATION | COUNT |
|---|---|---|
| 19930907 | N/A | 0 |
| 19930906 | NO (Holiday) | 0 |
| 19930905 | NO (Sunday) | 0 |
| 19930904 | NO (Saturday) | 0 |
| 19930903 | YES | −1 |

The function DATE +/−N DAYS (C/P 102) calculates the date that is N days later or earlier, respectively, than the specified date. Example 1 of FIG. 16a shows the calculation of the date that is +4 days from the FROM-DATE of Sep. 3, 1993. According to the end point definition, END-PNTS-DEF, of 'T' the FROM-DATE corresponds to a day count of 0. Because the FUNCTION-TYPE is 'C', every day qualifies and the days are counted as shown in the table below according to the logic of FIG. 5c to provide the OUT1-DATE value of 19930907, i.e. Sep. 7, 1993:

| DATE | QUALIFICATION | COUNT |
|---|---|---|
| 19930903 | N/A | 0 |
| 19930904 | YES | +1 |
| 19930905 | YES | +2 |
| 19930906 | YES | +3 |
| 19930907 | YES | +4 |

However, in Example 2 of FIG. 16a the FUNCTION-TYPE is a 'P' and since Sep. 6, 1993 happens to be in Holiday Table 06 the days are counted as shown in the table below to provide the OUT1-DATE value of 19930910, i.e. Sep. 10, 1993:

| DATE | QUALIFICATION | COUNT |
|---|---|---|
| 19930903 | N/A | 0 |
| 19930904 | NO (Saturday) | 0 |
| 19930905 | NO (Sunday) | 0 |
| 19930906 | NO (Holiday) | 0 |
| 19930907 | YES | +1 |
| 19930908 | YES | +2 |
| 19930909 | YES | +3 |
| 19930910 | YES | +4 |

Examples 3 and 4 of FIG. 16b, are similar to Examples 1 and 2 of FIG. 16a, except that IN-NUMERIC-PARM is negative (toward the past), rather than positive (toward the future). In Example 3 the days are counted as shown below to provide the OUT1-DATE of 19930903:

| DATE | QUALIFICATION | COUNT |
|---|---|---|
| 19930907 | N/A | 0 |
| 19930906 | YES | −1 |
| 19930905 | YES | −2 |
| 19930904 | YES | −3 |
| 19930903 | YES | −4 |

In Example 4 the days are counted as shown below to provide the OUT1-DATE of 19930903:

| DATE | QUALIFICATION | COUNT |
|---|---|---|
| 19930910 | N/A | 0 |
| 19930909 | YES | −1 |
| 19930908 | YES | −2 |

-continued

| DATE | QUALIFICATION | COUNT |
|---|---|---|
| 19930907 | YES | −3 |
| 19930906 | NO (Holiday) | −3 |
| 19930905 | NO (Sunday) | −3 |
| 19930904 | NO (Saturday) | −3 |
| 19930903 | YES | −4 |

There are fourteen extended functions. They answer common questions such as "What is the next day?" or "What date is three days before the end of the month?". Each extended function is specified by a one-character FUNCTION-TYPE, followed by a three-digit FUNCTION-NUMBER. The FUNCTION-TYPE for all extended functions is either "C" or "P", where "C" means that the system considers all calendar days, and "P" means that the system considers only processing days. The FUNCTION-NUMBER for extended functions ranges from 201 to 207 so these functions are referred to as the "200 series." The FUNCTION-NUMBERS and names are listed below:

201 NEXT DAY

202 PREVIOUS DAY

203 DAYS SINCE BEGINNING OF MONTH

204 DATE UNTIL END OF MONTH

205 BEGINNING OF MONTH+/−N DAYS

206 END OF MONTH+/−N DAYS

207 NTH DOW OCCURRENCE FORWARD/BACKWARD

The function NEXT DAY (C/P 201) provides the date that is one day later than the date provided by the user. Example 1 of FIG. 17 shows a call to C201 to determine the calendar date that is one day later than the FROM-DATE of Feb. 12, 1993 (19930212 in the format CCYYMMDD). Since END-PNTS-DEF is assigned a value of T, the FROM-DATE corresponds to day count 0. Every day qualifies and the days are counted as shown below to provide the OUT1-DATE of Feb. 13, 1993:

| DATE | QUALIFICATION | COUNT |
|---|---|---|
| 19930212 | N/A | +0 |
| 19930213 | YES | +1 |

In Example 2 of FIG. 17 the FUNCTION-TYPE is "P" so only processing days are counted. It happens that Sep. 6, 1993 is in holiday table 07 and the days are counted as shown below to provide the OUT1-DATE of Feb. 16, 1993:

| DATE | QUALIFICATION | COUNT |
|---|---|---|
| 19930212 | N/A | 0 |
| 19930213 | NO (Saturday) | 0 |
| 19930214 | NO (Sunday) | 0 |
| 19930215 | NO (Holiday) | 0 |
| 19930216 | YES | +1 |

The function PREVIOUS DAY (C/P 202) finds the date that is one day earlier than the date provided by the user. Example 1 of FIG. 18 shows a call to C202 to find the calendar date that is one day earlier than Feb. 16, 1993 (19930216 in the format CCYYMMDD). According to the value of T assigned to END-PNTS-DEF, the FROM-DATE corresponds to a day count of 0. In Example 1, every day qualifies and the days are counted as shown in the table below to provide the OUT1-DATE of Feb. 15, 1993:

| DATE | QUALIFICATION | COUNT |
|---|---|---|
| 19930216 | N/A | −0 |
| 19930215 | YES | −1 |

Since Feb. 15, 1993 happens to be in holiday table 07, the call to P202 in Example 2 is counted as shown below to provide the OUT1-DATE of Feb. 12, 1993:

| DATE | QUALIFICATION | COUNT |
|---|---|---|
| 19930216 | N/A | 0 |
| 19930215 | NO (Holiday) | 0 |
| 19930214 | NO (Sunday) | 0 |
| 19930213 | NO (Saturday) | 0 |
| 19930212 | YES | −1 |

The function DAYS SINCE THE BEGINNING OF THE MONTH (C/P 203) provides the number of days from the date specified by the user to the beginning of the month. Example 1 in FIG. 19 shows the calculation of the number of days from Jul. 06, 1994 (19940706 in the format CCYYMMDD) back to the beginning of the month. According to the value of "T" assigned to END-PNTS-DEF, the FROM-DATE corresponds to a day count of zero. Because TYPE is "C", every day qualifies and the days are counted as shown in the table to the logic of FIG. 5c to provide an OUT-NUMERIC-PARM value of −5:

| DATE | QUALIFICATION | COUNT |
|---|---|---|
| 19940706 | N/A | −0 |
| 19940705 | YES | −1 |
| 19940704 | YES | −2 |
| 19940703 | YES | −3 |
| 19940702 | YES | −4 |
| 19940701 | YES | −5 |

In Example 2 of FIG. 19 the FUNCTION-TYPE is "P" so only processing days are counted. The processing days definition 'NEEEEEN' means that Saturdays and Sundays are never processing days and weekends are processing days only when not holidays. It happens that Jul. 4, 1994 is in holiday table 05 and the days are counted as shown in the table below to provide an OUT-NUMERIC-PARM value of −2:

| DATE | QUALIFICATION | COUNT |
|---|---|---|
| 19940706 | N/A | 0 |
| 19940705 | YES | −1 |
| 19940704 | NO (Holiday) | −1 |
| 19940703 | NO (Sunday) | −1 |
| 19940702 | NO (Saturday) | −1 |
| 19940701 | YES | −2 |

The function DAYS UNTIL THE END OF THE MONTH (C/P 204) provides the number of days from the date specified by the user to the end of the month containing that date. Example 1 of FIG. 20 shows a call to this function for the calculation of the number of days from Dec. 23, 1992 (19921223 in the format CCYYMMDD) forward to the end of the month. According to the value of "T" assigned to END-PNTS-DEF, the FROM-DATE corresponds to a day count of zero. In Example 1 every day qualifies since the FUNCTION-TYPE is "C", and the days are counted as shown in the table below to provide the OUT-NUMERIC-PARM value of

| DATE | QUALIFICATION | COUNT |
|---|---|---|
| 19921223 | N/A | +0 |
| 19921224 | YES | +1 |
| 19921225 | YES | +2 |
| 19921226 | YES | +3 |
| 19921227 | YES | +4 |
| 19921228 | YES | +5 |
| 19921229 | YES | +6 |
| 19921230 | YES | +7 |
| 19921231 | YES | +8 |

In Example 2 FIG. 20 the FUNCTION-TYPE is "P" so only processing days are counted. It happens that Dec. 25, 1993, Christmas Day, is in holiday table 08 so the days are counted as shown in the table below to provide the OUT-NUMERIC-PARM value of +5:

| DATE | QUALIFICATION | COUNT |
|---|---|---|
| 19921223 | N/A | 0 |
| 19921224 | YES | +1 |
| 19921225 | NO, (Holiday) | +1 |
| 19921226 | NO, (Saturday) | +1 |
| 19921227 | NO, (Sunday) | +1 |
| 19921228 | YES | +2 |
| 19921229 | YES | +3 |
| 19921230 | YES | +4 |
| 19921231 | YES | +5 |

The function BEGINNING OF THE MONTH +/−N DAYS (C/P 205) provides the date that is N days before or after the beginning of the month specified by the input date. Example 1 of FIG. 21 shows a call to this function to determine the date that is 5 days after the beginning of the month containing Jul. 23, 1994. The FROM-DATE is now defined as the beginning of July, i.e. Jul. 01, 1994. Then, according to the value of "T" assigned to END-PNTS-DEF, the FROM-DATE corresponds to a day count of zero. In Example 1, every day qualifies since the FUNCTION-TYPE is "C" and the days are counted as shown in the table below to provide the OUT1-DATE 19940706:

| DATE | QUALIFICATION | COUNT |
|---|---|---|
| 19940701 | N/A | 0 |
| 19940702 | YES | +1 |
| 19940703 | YES | +2 |
| 19940704 | YES | +3 |
| 19940705 | YES | +4 |
| 19940706 | YES | +5 |

In Example 2 the FUNCTION-TYPE is "P" so only processing days are counted. It happens that Jul. 4, 1994, the fourth of July, is listed in holiday table 05, so the days are counted as shown in the table below to provide the OUT1-DATE of 19940711:

| DATE | QUALIFICATION | COUNT |
|---|---|---|
| 19940701 | N/A | 0 |
| 19940702 | NO (Saturday) | 0 |

| DATE | QUALIFICATION | COUNT |
|---|---|---|
| 19940703 | NO (Sunday) | 0 |
| 19940704 | NO (Holiday) | 0 |
| 19940705 | YES | +1 |
| 19940706 | YES | +2 |
| 19940707 | YES | +3 |
| 19940708 | YES | +4 |
| 19940709 | NO (Saturday) | +4 |
| 19940710 | NO (Sunday) | +4 |
| 19940711 | YES | +5 |

The function END OF THE MONTH +/−N DAYS (C/P 206) provides the date that is N days before or after the end of the month in which the FROM-DATE is located. Example 1 of FIG. 22 shows a call to this function to find the calendar date that is 4 days prior to the end of the month containing Dec. 05, 1992. The FROM-DATE is defined as the end of the month, i.e., Dec. 31, 1992. Then, according to the value of "T" assigned to END-PNTS-DEF, the FROM-DATE corresponds to day count zero. In Example 1, the FUNCTION-TYPE is "C" so every day qualifies and the days are counted as shown in the table below to provide OUT1-DATE of Dec. 27, 1992:

| DATE | QUALIFICATION | COUNT |
|---|---|---|
| 19921231 | N/A | 0 |
| 19921230 | YES | −1 |
| 19921229 | YES | −2 |
| 19921228 | YES | −3 |
| 19921227 | YES | −4 |

Example 2 is the same as Example 2 except that the FROM-DATE is Dec. 18, 1992 and the function type is "P" so only processing days are calculated. The FROM-DATE is again Dec. 31, 1992, and the days are counted as shown below to provide the OUT1-DATE of Dec. 24, 1992:

| DATE | QUALIFICATION | COUNT |
|---|---|---|
| 19921231 | N/A | 0 |
| 19921230 | YES | −1 |
| 19921229 | YES | −2 |
| 19921228 | YES | −3 |
| 19921227 | NO, (Sunday) | −3 |
| 19921226 | NO, (Saturday) | −3 |
| 19921225 | NO, (Holiday) | −3 |
| 19921224 | YES | −4 |

The function Nth DOW OCCURRENCE FORWARD/BACKWARD (C/P 207) provides the date that is the Nth of a specified day of week forward or backward from a reference date. In this function an END-PNTS-DEF value of T is implicitly utilized. Example 1 of FIG. 23 shows a call to this function to find the calendar date that is the second Friday prior to the date that is specified as the FROM-DATE of Dec. 28, 1992. IN-ALPHA-PARM has the value 'NNNNNYN', thereby specifying Friday as the day to be counted, and the second occurrence is specified by the IN-NUMERIC-PARM value of −2. Since the FUNCTION-TYPE is "C", Fridays are counted as shown in the table below to provide the OUT1-DATE of Dec. 18, 1992:

| DATE | QUALIFICATION | COUNT |
|---|---|---|
| 19921228 | N/A | −0 |
| 19921225 | YES | −1 |
| 19921218 | YES | −2 |

In Example 2 is the same as Example 1 except that the FUNCTION-TYPE is "P" so only processing days are counted. The days are counted in the table below to provide the OUT1-DATE Dec. 11, 1992:

| DATE | QUALIFICATION | COUNT |
|---|---|---|
| 19921228 | N/A | 0 |
| 19921225 | NO (Holiday) | 0 |
| 19921218 | YES | −1 |
| 19921211 | YES | −2 |

Additionally, there are 288 advanced functions. These functions address questions such as "What date is three days prior to the end of the previous fiscal quarter?" The FUNCTION-TYPE for advanced functions is either "C" or "P", where "C" means that the system considers all calendar days, and "P" means that the system considers only processing days. The FUNCTION-NUMBER for advanced functions has a format "Fxx", where F ranges from 5 through 8, and the last two digits, "xx", range from 01 to 36. The F values of 5, 6, 7 and 8 correspond to functions termed the 500, 600, 700 and 800 series, respectively. The F digit identifies the type of calculation, and the last two digits of the FUNCTION-NUMBER identify the time period of interest.

FIGS. 24a–d graphically depict the calculations of the 500, 600, 700, and 800 series, respectively. In these figures 'START' indicates the starting date; a curved arrow labelled with a '1' indicates the determination of a second date at the beginning or end of a calendar or fiscal year, month or quarter; a curved arrow labelled with a '2' indicates the determination of a date that is a specified number of days from the origin of the arrow; a curved arrow labelled with a '3' indicates the determination of a date that is a specified number of a specified day of week from the origin of the arrow; and a straight arrow indicates the determination of the number of days from the origin of the arrow to the tip of the arrow.

Figure 24A:
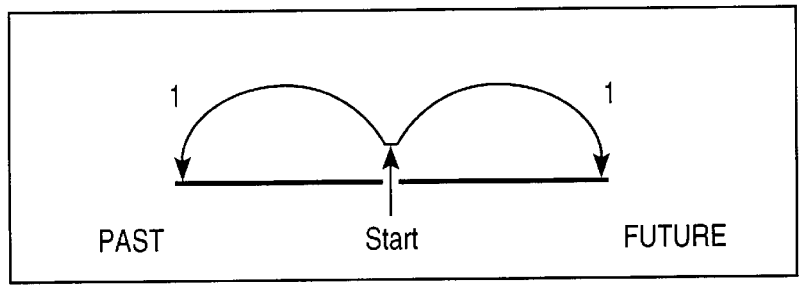

As shown in FIG. 24a, the 500 series functions identify a date which is the beginning or end of a fiscal or calendar year, month or quarter. The 500 series functions are termed "DATE IDENTIFICATION" functions.

Figure 24B:
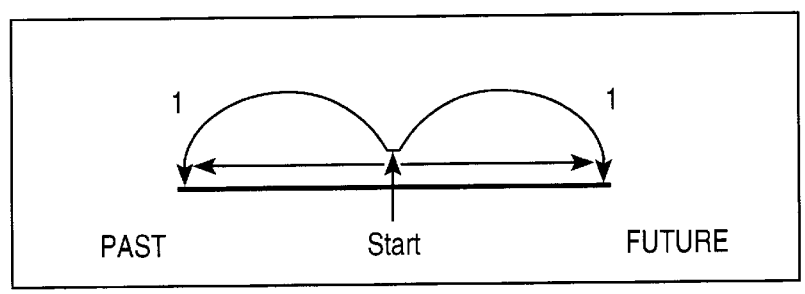

As shown in FIG. 24b, the 600 series identify a date which is a beginning or end of a calendar or fiscal year, month, or quarter, and determine the number of days to that date. The 600 series functions are termed "DAYS SINCE/UNTIL" functions.

Figure 24C:
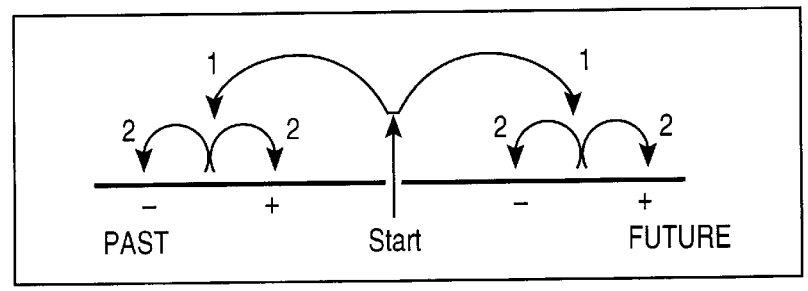
Figure 24D:
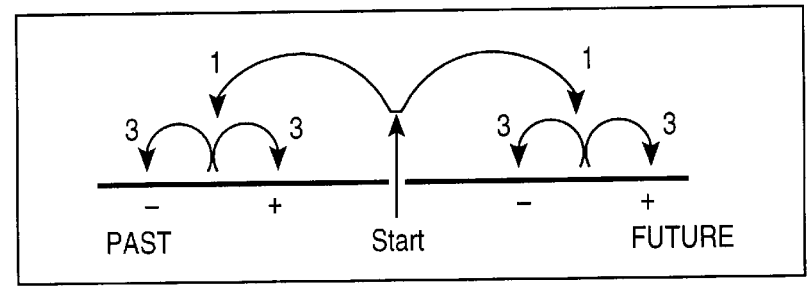

The 700 series identify a date which is a beginning or end of a calendar or fiscal year, month or quarter, and calculate a TO-DATE a specified number of days from to that date, as shown in FIG. 24c. The 700 series functions are termed "DATE RELATIVE TO" functions.

The 800 series functions identify a date at the beginning or end of a calendar or fiscal year, month or quarter, and calculate the Nth occurrence of a specified day of week (DOW) from that date. The 800 series functions are therefore termed "Nth DOW WITHIN A PERIOD" functions. In the 800 series functions the END-PNTS-DEF value of "B" is implicitly utilized in counting the DOWs.

The last two digits of the FUNCTION-NUMBER identify the time period of interest. Below is a listing of the time periods corresponding to the numbers 1 through 36:

| TIME-PERIOD | | | FUNCTION-NUMBER |
|---|---|---|---|
| Calendar Year | Previous | Beginning | F01 |
| | Previous | End | F02 |
| | Current | Beginning | F03 |
| | Current | End | F04 |
| | Next | Beginning | F05 |
| | Next | End | F06 |
| Fiscal Year | Previous | Beginning | F07 |
| | Previous | End | F08 |
| | Current | Beginning | F09 |
| | Current | End | F10 |
| | Next | Beginning | F11 |
| | Next | End | F12 |
| Calendar Quarter | Previous | Beginning | F13 |
| | Previous | End | F14 |
| | Current | Beginning | F15 |
| | Current | End | F16 |
| | Next | Beginning | F17 |
| | Next | End | F18 |
| Fiscal Quarter | Previous | Beginning | F19 |
| | Previous | End | F20 |
| | Current | Beginning | F21 |
| | Current | End | F22 |
| | Next | Beginning | F23 |
| | Next | End | F24 |
| Calendar Month | Previous | Beginning | F25 |
| | Previous | End | F26 |
| | Current | Beginning | F27 |
| | Current | End | F28 |
| | Next | Beginning | F29 |
| | Next | End | F30 |
| Fiscal Month | Previous | Beginning | F31 |
| | Previous | End | F32 |
| | Current | Beginning | F33 |
| | Current | End | F34 |
| | Next | Beginning | F35 |
| | Next | End | F36 |

The 500 series DATE IDENTIFICATION functions provide a date of particular interest. As shown in Example C51 of FIG. 25a, the "C" of the FUNCTION-TYPE C519 specifies the identification of the calendar beginning of a period. The last two digits of the FUNCTION-NUMBER specifies that the time period is the previous fiscal quarter from the FROM-DATE. The FROM-DATE is specified to be the current date, which in this case we assume to be May 17, 1993. Since FISCYR-START has a value of 04, the fiscal year is defined as starting April 1st. Since the current date lies in the first fiscal quarter, the beginning of the previous fiscal quarter is therefore Jan. 01, 1993, and OUT1-DATE has a value of 19930101.

Example P51 is the same as Example C51, except that the processing beginning of the previous fiscal quarter is requested. Since Friday, Jan. 01, 1993 happens to be a holiday in holiday table 08, and the processing day definition assigns Friday an "E", Jan. 01, 1993 is not considered a processing day. Therefore, a forward adjustment is performed by searching toward the future until a processing day is encountered. Saturday and Sunday are never processed according to the processing day definition, so the next processing day is Jan. 04, 1993, and the OUT1-DATE is assigned a value of 19930104.

In Example C52 of FIG. 25b, the function code C504 calls for the identification of the calendar end of the calendar year containing the FROM-DATE of Nov. 29, 1993. The calendar end of 1993 is Dec. 31, 1993, so the value of OUT1-DATE is 19931231. Example P52 is the same as Example C52, except that the processing end of the calendar year containing Nov. 29, 1993 is requested. Since it happens that Dec. 31, 1993, New Years Eve, is a holiday according to holiday table 08 and it is a Friday, it is not considered a processing day since PROC-DAY-DEF assigns Fridays an "E" value. Therefore, a backward adjustment is performed by searching toward the past until a processing day is encountered. Dec. 30, 1993 qualifies, and this is the answer returned by OUT1-DATE.

The 600 series DAYS SINCE/UNTIL functions provide a number that specifies the direction and displacement from the FROM-DATE to the specified date of interest. In Example C61 of FIG. 26a, the function C619 calls for a determination of the direction and displacement in calendar days from the current date to the calendar beginning of the previous fiscal quarter. Since the value 04 of FISCYR-START indicates that the fiscal year starts April 1st, the current date, which we assume to be May 17, 1993, lies in the first quarter. The beginning of the previous fiscal quarter is Jan. 01, 1993. Jan. 01, 1993 is therefore the effective TO-DATE and the system determines the direction and displacement in calendar days from May 17, 1993 to Jan. 01, 1993. The answer is −136 calendar days.

Example P61 of FIG. 26a is the same as Example C61, except that the direction and displacement in processing days from the current date to the processing beginning of the previous fiscal quarter is requested. Since Jan. 01, 1993 is a holiday according to holiday table 08 and is a Friday, it is not considered a processing day according to the PROC-DAY-DEF assignment of an "E" to Fridays. Therefore a forward adjustment is performed by searching toward the future until a processing day is encountered. Saturday and Sunday are not processing days, so a processing day does not occur until Jan. 04, 1993. That date becomes the effective TO-DATE and the system determines the direction and displacement in processing days from May 17, 1993 to Jan. 04, 1993. The answer is −95 processing days.

In Example C62 of FIG. 26b, the FUNCTION-CODE C604 calls for the identification of the direction and displacement in calendar days from Nov. 29, 1993 to the calendar end of the calendar year containing Nov. 29, 1993. The calendar end of 1993 is Dec. 31, 1993, which becomes the effective TO-DATE. The system then determines the direction and displacement in calendar days from Nov. 29, 1993 to Dec. 31, 1993. The answer is +32 calendar days.

Example P62 of FIG. 26b is the same as Example C62, except that the direction and displacement in processing days from Nov. 29, 1993 to the processing end of the calendar year containing Nov. 29, 1993 is requested. Since Friday Dec. 31, 1993 happens to be in holiday table 08, it is not considered a processing day. Therefore, a backward adjustment is performed by searching toward the past until a processing day is encountered. Dec. 30, 1993 qualifies, so it becomes the effective TO-DATE. The system then determines the direction and displacement, in processing days, from Nov. 29, 1993 to Dec. 30, 1993. The answer is +22 processing days.

The 700 series DATE RELATIVE TO functions provide a date that is determined by starting at a calendar date of particular interest, and advancing forward or backward a specified number of days. In Example C71 of FIG. 27a, the FUNCTION CODE C719 calls for the determination of the date that is +5 calendar days from the calendar beginning of the previous fiscal quarter. Since the fiscal year starts April 1st as indicated by the FISCYR-START value of 04, the current date which we assume to be May 17, 1993, lies in the first fiscal quarter. The beginning of the previous fiscal quarter is Jan. 01, 1993 so that date becomes the effective FROM-DATE. The system calculates the date +5 calendar days from the FROM-DATE, and the answer is Jan. 06, 1993.

Example P71 of FIG. 27a is the same as the Example C71, except that the date requested is +5 processing days from the processing beginning of the previous fiscal quarter. Since Jan. 01, 1993 is a Friday and is a holiday according to holiday table 08, it is not considered a processing day. Therefore a forward adjustment is performed by searching toward the future until a processing day is encountered. Saturday and Sunday are never processed according to the PROC-DAY-DEF value of NEEEEEN, so a processing day does not occur until Jan. 04, 1993. The system then calculates the date that is +5 processing days from the new FROM-DATE of Jan. 04, 1993 and the answer is Jan. 11, 1993.

In Example C72 of FIG. 27b, the FUNCTION-CODE C704 calls for the identification of the date that is −6 calendar days from the calendar end of the calendar year containing the FROM-DATE of Nov. 29, 1993. The calendar end of 1993, Dec. 31, 1993, becomes the effective FROM-DATE, and the system then calculates the date that is −6 calendar days from Dec. 31, 1993. The answer is Dec. 25, 1993. Example P72 is the same as Example C72, except that since the FUNCTION-TYPE is a P the date requested is −6 processing days from the processing end of the calendar year containing Nov. 29, 1993. Since Dec. 31, 1993 is a holiday and it's a Friday, it is not considered a processing day. Therefore, a backward adjustment is performed by searching toward the past until a processing day is encountered. Dec. 30, 1993 qualifies according holiday table 08, so it becomes the effective FROM-DATE. The system then calculates the date that is −6 processing days from the FROM-DATE yielding the answer Dec. 21, 1993.

The series 800 Nth DOW OCCURRENCE WITHIN A PERIOD functions are executed in three stages: (1) the desired period beginning or end specified by the last two digits of the FUNCTION-NUMBER is determined relative to the FROM-DATE; (2) the system counts forward from the beginning of the period or backward from the end of the period the number of days specified by IN-NUMERIC-PARM, tallying only the days of week specified by PROC-DAY-DEF, END-PNTS-DEF, and IN-ALPHA-PARM; and (3) the system checks that the answer is still within the period specified in the first stage.

In Example C81 of FIG. 28a, the FUNCTION-CODE C827 calls for the determination of a date relative to the calendar beginning of the current calendar month since the last two digits of the FUNCTION-NUMBER are 27, and the FUNCTION-TYPE is C. Since IN-NUMERIC-PARM is +4 and the value of IN-ALPHA-PARM is 'NNNNNYN', the requested date is the 4th calendar Friday after the calendar beginning of the calendar month containing the FROM-DATE of Dec. 15, 1992. The calendar beginning of the calendar month containing Dec. 15, 1992 is Dec. 01, 1992. The system counts forward 4 calendar Fridays until it reaches Dec. 25, 1992, which becomes the answer.

Example P81 is the same as Example C81, except that since the FUNCTION-TYPE is P, the date that is the 4th processing Friday after they processing beginning of the calendar month containing Dec. 15, 1992 is requested. The analysis starts out, as before, with Dec. 01, 1992. However this time, when the system counts ahead 4 processing Fridays, it must skip Friday, Dec. 25, 1992 (Christmas) since it happens to be listed in holiday table 08, and therefore not a processing day. The actual answer, therefore lies in January, which results in an error message, because the desired answer is beyond the end of the specified period.

Figure 28B:
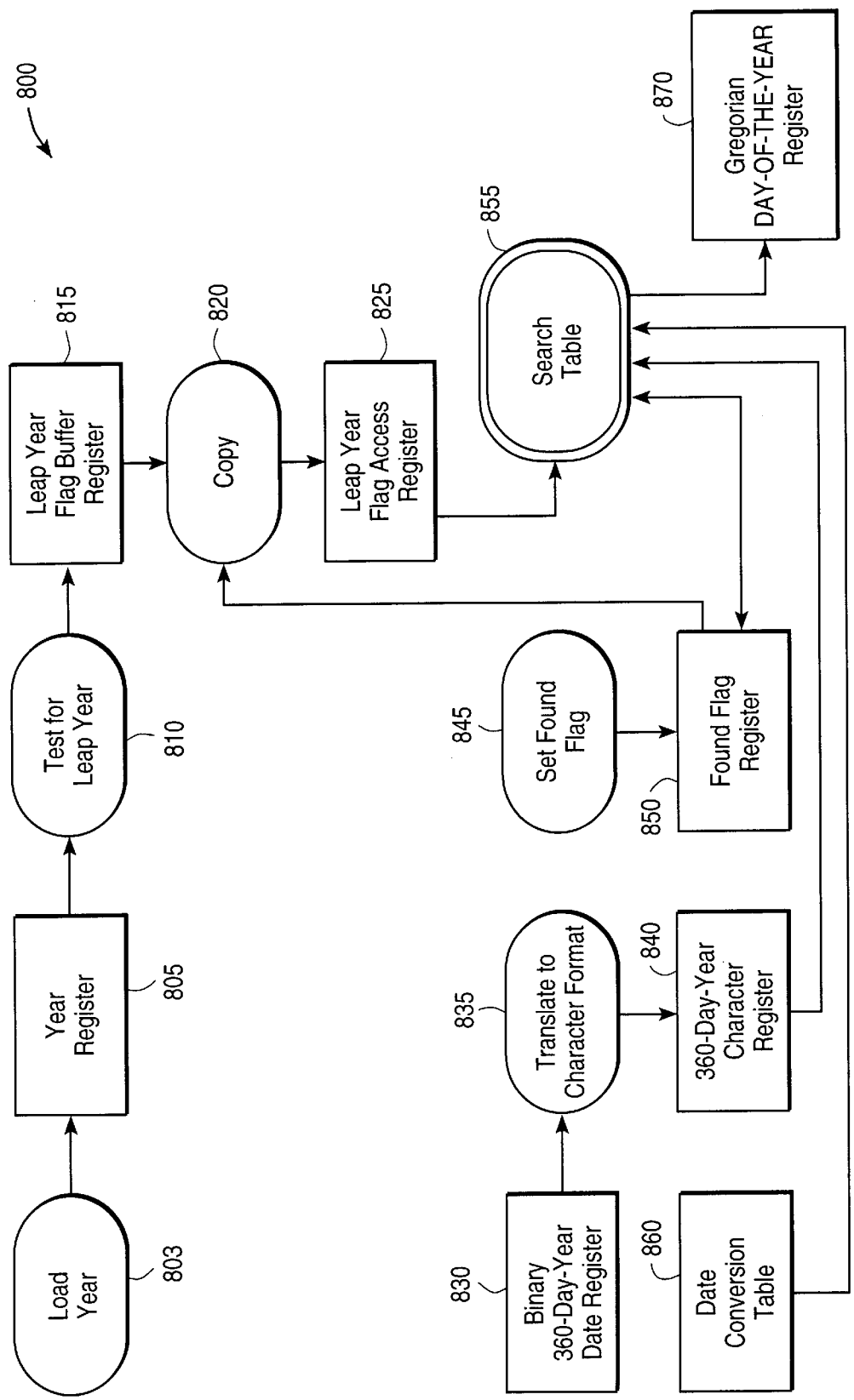

Example C82 of FIG. 28b is the same as Example C81 of FIG. 28a except that the FUNCTION-CODE C828 calls for the determination of a date relative to the calendar end of the current calendar month, and the value of IN-NUMERIC-PARM is −4 rather than +4. Since IN-ALPHA-PARM is 'NNNNNYN' and the FROM-DATE is Dec. 15, 1992, the requested date is the 4th calendar Friday prior to the calendar end of the calendar month containing Dec. 15, 1992. The calendar end of the calendar month containing Dec. 15, 1992 is Dec. 31, 1992. The system then counts backward four calendar Fridays until it reaches Dec. 04, 1992, which is therefore the answer.

Example P82 of FIG. 28b is the same as Example C82, except that since the FUNCTION-CODE is P, the date requested is the 4th processing Friday prior to the processing end of the calendar month in which the FROM-DATE of Dec. 15, 1992 occurs. The analysis starts out, as before, with Dec. 31, 1992. However this time, when the system counts backwards 4 processing Fridays, it must again skip Friday, Dec. 25, 1992 because it is not a processing day. The answer, therefore lies in November. This results in an error message because the desired answer is earlier than the beginning of the specified period.

360-Day-Year Calendaring Functions

The 360-day-year calendar was developed for financial calculations because of the simplicity of a year where each month has 30 days. For instance, the day-of-the-year which is 46% of a year past March 1 is easily determined by noting that 169.2 is 46% of 360, and since it is easily determined that 169 equals 5×30 plus 19, an increment of 169 days in a 360-day-year is an increment of five months and nineteen days. Therefore, August 20 is 46% of a year past March 1 according to a 360-day-year calculation. Also, many fractional year increments are equal to an integer number of months: one twelfth of a year is one month, one sixth of a year is two months, one fourth of a year is three months, one third of a year is four months, and one half of a year is sixth months. Although this type of simplification is not of as much use in the current age of microelectronics, many financial institutions still use 360-day-year methods for ongoing calculations which were started using a 360-day-year method. Also, 360-day-year methods are implemented in business or legal situations where such methods remain a standard.

Generally, the prior art systems use an algebraic formula for conversion of Gregorian or Julian dates to 360-day-year dates and conversion of 360-day-year dates to Julian or Gregorian dates, but generate dates which do not actually exist or gaps between existing dates. For instance, a pseudocode implementation of an algorithm for conversion of a Gregorian date to a 360-day-year date is:

If (GREGORIAN-DAY-OF-MONTH<30),

Set 360-DAY=GREGORIAN-DAY-OF-MONTH,

Else

Set 360-DAY=30;

Set 360-DAY=360-DAY+[30×(GREGORIAN-MONTH−1)];

For the year 1996, which is a leap year, this pseudocode generates the conversions from Gregorian dates to 360-day-year dates shown in Table 1 below.

TABLE 1

| Gregorian Date | 360-day-year Date |
|---|---|
| 02/27/1996 | 1996/057 |
| 02/28/1996 | 1996/058 |
| 02/29/1996 | 1996/059 |
| 03/01/1996 | 1996/061 |
| 03/02/1996 | 1996/062 |

It should be noted that according to this conversion, in a leap year there is no 60th day-of-the-year of the 360-day-year. For the year 1994, which is not a leap year, this pseudocode generates the conversions from Gregorian dates to 360-day-year dates shown in Table 2 below.

TABLE 2

| Gregorian Date | 360-day-year Date |
|---|---|
| 02/27/1994 | 1994/057 |
| 02/28/1994 | 1994/058 |
| 03/01/1994 | 1994/061 |
| 03/02/1994 | 1994/062 |

It should be noted that according to this conversion, in a non-leap year there is no 59th day-of-the-year and no 60th day-of-the-year of the 360-day-year.

A pseudocode implementation of an algorithm for conversion of a Julian date to a 360-day-year date is:

If JULIAN-YEAR is a leap year

Set 360-DAY=Integer(JULIAN-DAY*360/366);

If JULIAN-YEAR is not a leap year

Set 360-DAY=Integer(JULIAN-DAY*360/365);

where the function Integer outputs the largest integer less than or equal to the value of the argument. For the year 1996, which is a leap year, this pseudocode generates the conversions from Julian dates to 360-day-year dates shown in Table 3 below.

TABLE 3

| Julian Date | 360-day-year Date |
|---|---|
| 057/1996 | 056/1996 |
| 058/1996 | 057/1996 |
| 059/1996 | 058/1996 |
| 060/1996 | 059/1996 |
| 061/1996 | 060/1996 |
| 062/1996 | 060/1996 |
| 063/1996 | 061/1996 |

It should be noted that according to this conversion, in a leap year there are two 60th days-of-the-year of the 360-day-year. For the year 1994, which is not a leap year, this pseudocode generates the conversions from Julian dates to 360-day-year dates shown in Table 4 below.

TABLE 4

| Julian Date | 360-day-year Date |
|---|---|
| 057/1994 | 056/1994 |
| 058/1994 | 057/1994 |
| 059/1994 | 058/1994 |
| 060/1994 | 059/1994 |

TABLE 4-continued

| Julian Date | 360-day-year Date |
|---|---|
| 061/1994 | 060/1994 |
| 062/1994 | 061/1994 |
| 063/1994 | 062/1994 |

A pseudocode implementation of an algorithm for conversion of a 360-day-year date to a Gregorian date is:

Set GREGORIAN-MONTH=Integer(360-DAY/30)

TEMP=GREGORIAN-MONTH×30;

GREGORIAN-DAY-OF-MONTH=360-DAY−TEMP;

Set GREGORIAN-MONTH=GREGORIAN-MONTH+1;

If GREGORIAN-DAY-OF-MONTH=0

Then Set GREGORIAN-DAY-OF-MONTH=30

And Set GREGORIAN-MONTH=GREGORIAN-MONTH−1;

Set GREGORIAN-YEAR=360-DAY-YEAR;

where again the function Integer outputs the largest integer less than or equal to the value of the argument. For the year 1996, which is a leap year, this pseudocode generates the conversions from 360-day-year dates to Gregorian dates shown in Table 5 below.

TABLE 5

| 360-day-year Date | Gregorian Date |
|---|---|
| 057/1996 | 2/27/1996 |
| 058/1996 | 2/28/1996 |
| 059/1996 | 2/29/1996 |
| 060/1996 | 2/30/1996 |
| 061/1996 | 3/01/1996 |
| 062/1996 | 3/02/1996 |

It should be noted that according to this conversion, February has thirty days. For the year 1994, which is not a leap year, this pseudocode generates the conversions from Gregorian dates to 360-day-year dates shown in Table 6 below.

TABLE 6

| 360-day-year Date | Gregorian Date |
|---|---|
| 057/1994 | 2/27/1994 |
| 058/1994 | 2/28/1994 |
| 059/1994 | 2/29/1994 |
| 060/1994 | 2/30/1994 |
| 061/1994 | 3/01/1994 |
| 062/1994 | 3/02/1994 |

Again, according to this conversion February has thirty days.

A pseudocode implementation of an algorithm for conversion of a 360-day-year date to a Julian date is:

If 360-YEAR is a leap year

Set JULIAN-DAY=Integer(360-DAY*366/360);

If 360-YEAR is not a leap year

Set JULIAN-DAY=Integer(360-DAY*365/360);

where the function Integer outputs the largest integer less than or equal to the value of the argument. For the year 1996, which is a leap year, this pseudocode generates the conversions from 360-day-year dates to Julian dates shown in Table 7 below.

TABLE 7

| 360-day-year Date | Julian Date |
|---|---|
| 057/1996 | 057/1996 |
| 058/1996 | 058/1996 |
| 059/1996 | 059/1996 |
| 060/1996 | 061/1996 |
| 061/1996 | 062/1996 |
| 062/1996 | 063/1996 |

It should be noted that according to this conversion, in a leap year there is no 60th day-of-the-year of the Julian year. For the year 1994, which is not a leap year, this pseudocode generates the conversions from 360-day-year dates to Julian dates shown in Table 8 below.

TABLE 8

| 360-day-year Date | Julian Date |
|---|---|
| 057/1996 | 057/1996 |
| 058/1996 | 058/1996 |
| 059/1996 | 059/1996 |
| 060/1996 | 060/1996 |
| 061/1996 | 061/1996 |
| 062/1996 | 062/1996 |

These algebraic methods for conversions between calendars present some problems. For instance, converting the 60th day-of-the-year of the 360-day-year calendar during a leap year such as 1996 to the Gregorian calendar (see Table 5) produces the date Feb. 30, 1996. This date does not exist, and inadequate error screening would cause a system failure or a faulty calculation. Similarly, converting the 59th and 60th days-of-the-year of the 360-day-year calendar for 1994, a year which is not a leap year, to the Gregorian calendar (see Table 6) produces the dates Feb. 29, 1994 and Feb. 30, 1994. Neither of these dates exist, and again inadequate error screening would cause a system failure or a faulty calculation.

It should also be noted that in a conversion from a Gregorian day-of-the-year to a 360-day-year day-of-the-year, the 60th day-of-the-year of the 360-day-year does not exist for leap years (see Table 1), and the 59th and 60th days-of-the-year of the 360-day-year do not exist for non-leap years (see Table 2). Since the Gregorian year has 365 days, it is to be expected that the mapping of Gregorian day-of-the-year to 360-day-year days-of-the-year is a many-to-one mapping, and every day-of-the-year of the 360-day-year should be used. Therefore, a mapping of Gregorian days-of-the-year to 360-day-year days-of-the-year which does not use all of the available days in the 360-day-year is clearly not optimal.

Another problem with the algebraic conversion methods is that in converting an initial day-of-the-year from the Julian calendar to the 360-day-year calendar, and then back to the Julian calendar does not necessarily produce the initial day-of-the-year. For instance, the 58th and 63rd days-of-the-year of the Julian calendar of 1996, a year which is a leap year, are converted to the 57th and 61st days-of-the-year of the 360-day-year calendar of 1996 (see Table 3), respectively. However, converting the 57th and 61st days-of-the-year of the 360-day-year calendar of 1996 back to the Julian calendar produces the 57th and 62nd days-of-the-year (see Table 7), respectively. Similarly, the 58th and 63rd days-of-the-year of the Julian calendar of 1994, a year which is not a leap year, are converted to the 57th and 62st days-of-the-year of the 360-day-year calendar of 1994 (see Table 3), respectively. However, converting the 57th and 62st days-of-the-year of the 360-day-year calendar of 1994 to the Julian calendar produces the 57th and 62nd days-of-the-year (see Table 7), respectively. Also, the same sort of problem results in converting a day-of-the-year from the 360-day-year calendar to the Julian calendar, and then back to the 360-day-year calendar.

Figure 29A:
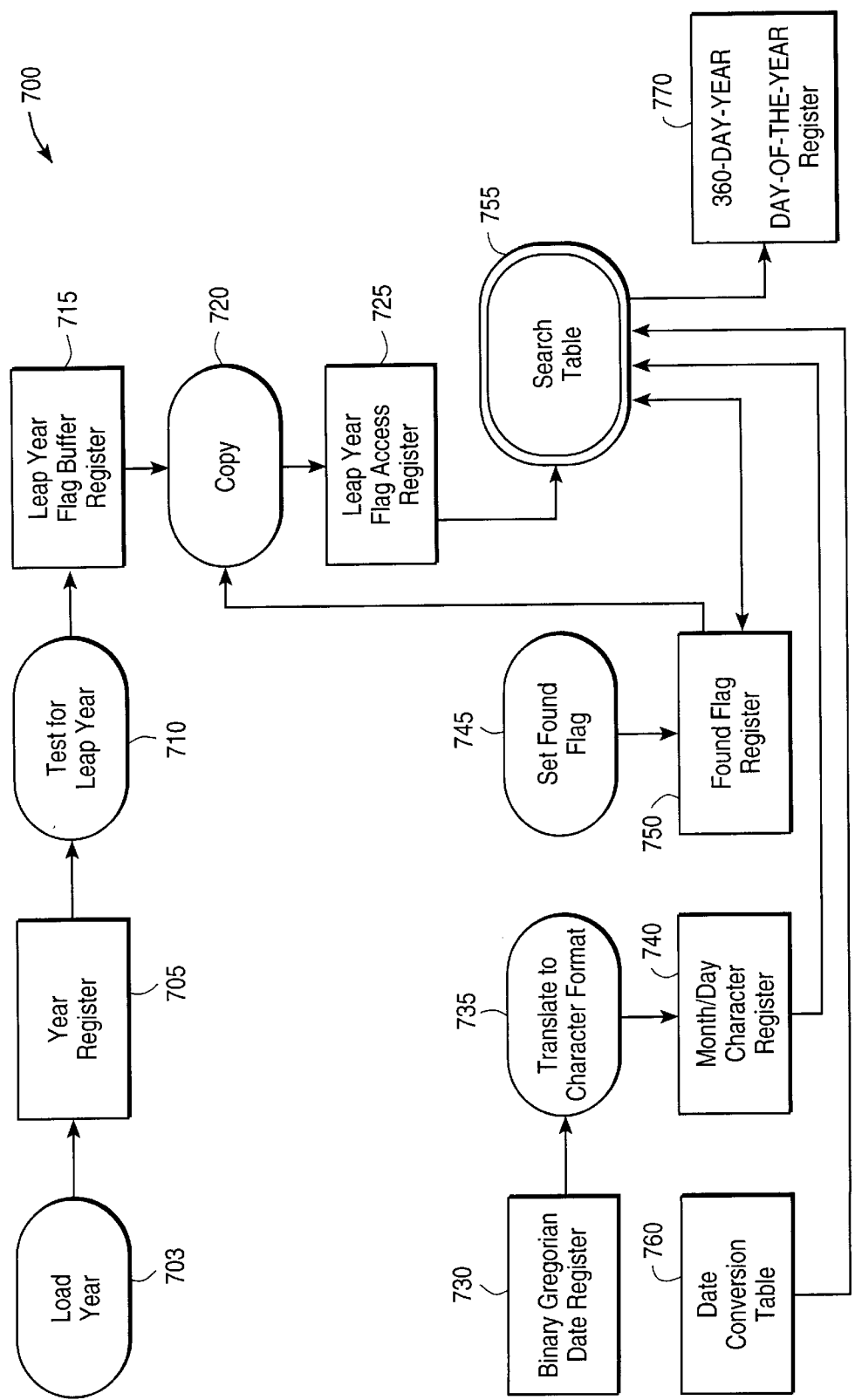
FIG. 29A shows an apparatus for conversion from a Gregorian day-of-the-year to a 360-day-year day-of-the-year.

The system 700 of the present invention for conversion of a Gregorian day-of-the-year to a 360-day-year day-of-the-year is shown in FIG. 29A. (Conversions between the 360-day-year and the Julian calendar are implemented by combining a conversion between the 360-day-year calendar and the Gregorian calendar according to the present invention, with an additional conversion between the Gregorian and Julian calendars according to methods well-known in the art.) The system 700 includes a plurality of storage registers 705, 715, 725, 730, 740, 750, and 770 (shown as rectangular blocks), a plurality of processing units 703, 710, 720, 735, 745, 755 and 765 (shown as oval blocks), and a look-up table 760 (shown as a rectangular block). In the preferred embodiment of the present invention the processing units 703, 710, 720, 735, 745, 755 and 765 are implemented as COBOL computer code. Alternatively, the processing units 703, 710, 720, 735, 745, 755 and 765 may be dedicated hardwired processors. A Search Table unit 755 requires data from a Leap Year Flag Access Register 725, a Month/Day Character Register 740, and a Found Flag Register 750, so these registers 725, 740 and 750 must be loaded with the appropriate values prior to the search performed by the Search Table unit 755. Therefore, the flow chains beginning with a Load Year unit 703, a Binary Gregorian Date Register 730, and a Set Found Flag unit 745 must be completed prior to the operation of the Search Table unit 755. The Search Table unit 755 outputs data to the 360-Day-Year Day-of-the-year Register 770, and back to the Found Flag Register 750. Since the Search Complete unit 765 utilizes the flag value in the Found Flag Register 750, the Search Complete unit 765 operates after the Search Table unit 755 has terminated. (For clarity, the control apparatus for initiating the flow chains is not shown in FIG. 29A.)

To set the flag in the Leap Year Flag Access Register 725 a year is loaded by a Load Year unit 703 into a Year Register 705. This year in the Year Register 705 is accessed by a Test For Leap Year unit 710 which sets a flag in a Leap Year Flag Buffer Register 715 if the year is indeed a leap year. In the preferred embodiment of the present invention, it is determined whether a year is a leap year by calculating the remainders R(4), R(100), R(400) and R(3200) when the year is divided by 4, 100, 400, and 3200, respectively. If R(4) is not zero, the year is not a leap year. If the R(4) is zero, but R(100) is not, the year is a leap year. If R(100) is zero, but R(400) is not, the year is not a leap year. If R(400) is zero, but R(3200) is not, the year is a leap year. And, if R(3200) is zero, the year is not a leap year. The flag in the Leap Year Flag Buffer Register 715 is then copied by a Copy unit 720 to a Leap Year Flag Access Register 725. The Copy unit 720 also functions to prevent the flag in the Leap Year Flag Access Register 725 from changing value if the flag in the Found Flag Register 750 has the "No" value. The flag in the Found Flag Register 750 is set to a "No" value by a Set Found Flag unit 745 at the beginning of the date conversion process, and remains at that value until the date conversion is accomplished.

The Gregorian day-of-the-year is stored in binary form in a Binary Gregorian Date Register 730. Because the Gregorian and 360-day-year days-of-the-year in the Date Conversion Table 760 are stored in character form to facilitate inspection and alterations of the entries in the Date Conversion Table 760, a Translate to Character Format unit 735 is required to convert the Gregorian day-of-the-year to a character format for storage in a Month/Day Character Register 740.

Figure 29B:
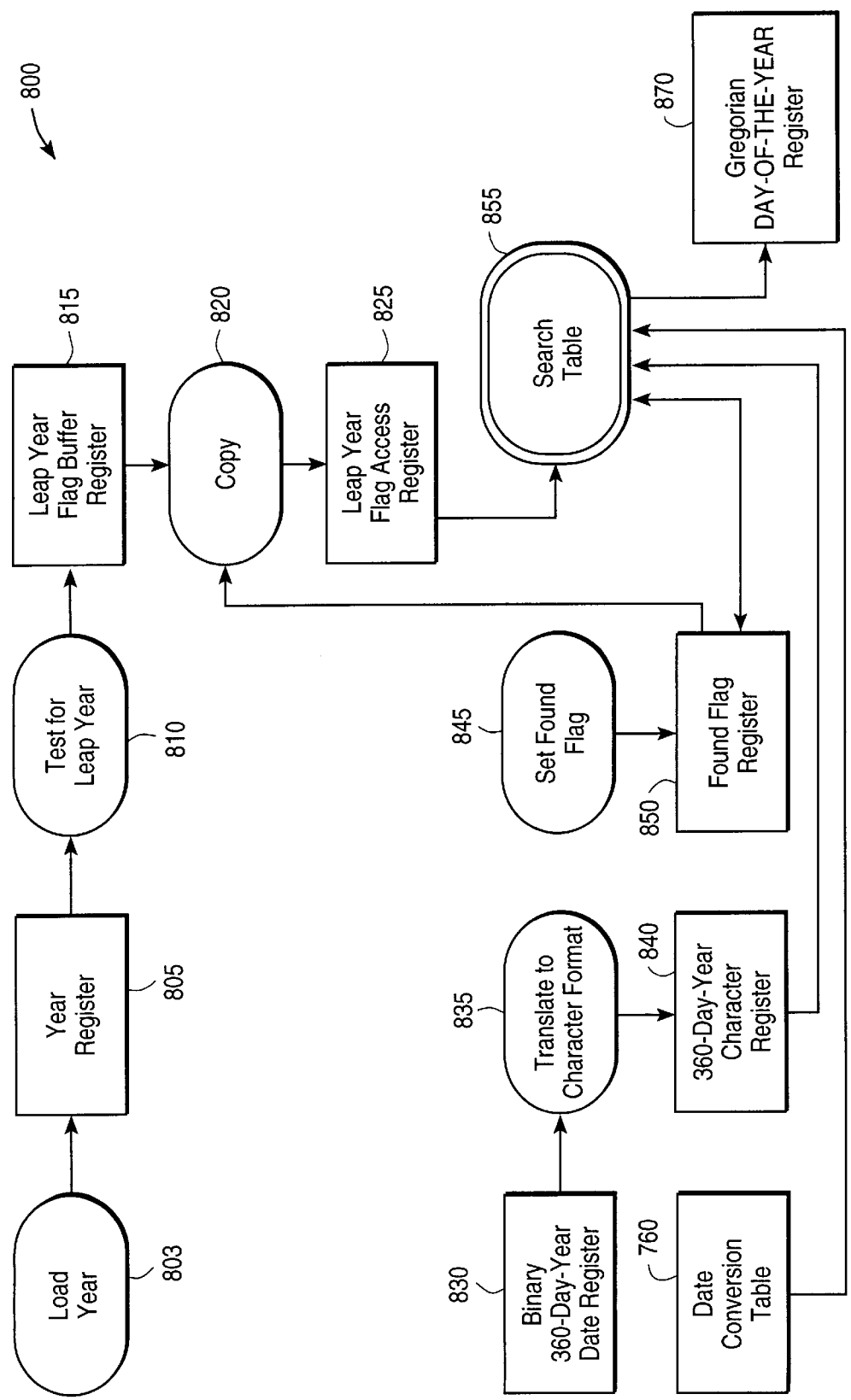
FIG. 29B shows an apparatus for conversion from a 360-day-year day-of-the-year to a Gregorian day-of-the-year.
Figure 29C:
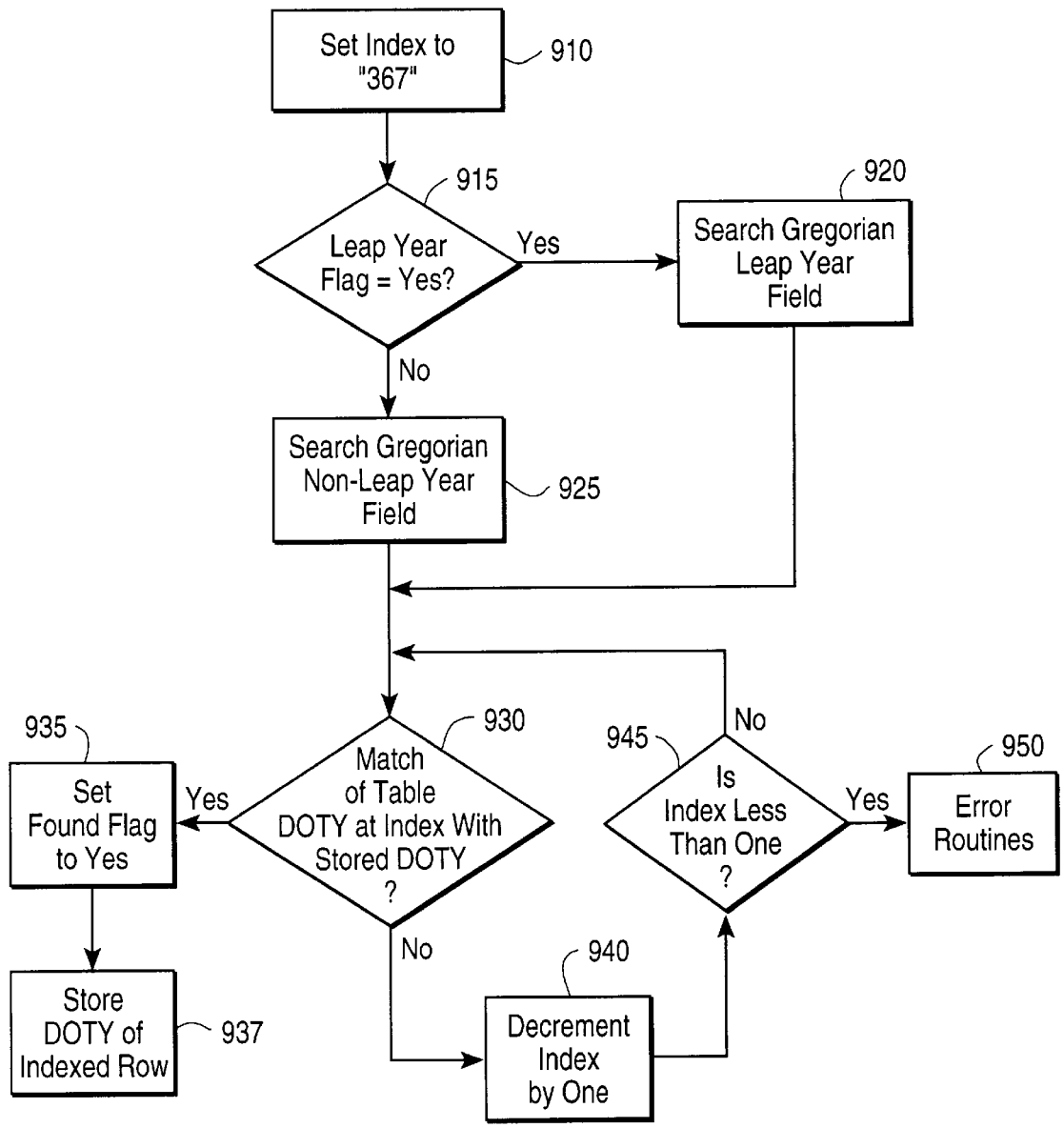
FIG. 29C shows a flow chart for the Search Table unit of FIG. 29A.

A search of days-of-the-year in a Date Conversion Table 760 is performed by the Search Table unit 755 according to the flow chart shown in FIG. 29C. First the index variable is set to an initial value of three hundred and sixty seven 910. Then, the value of the leap year flag in the Leap Year Flag Access Register 725 is evaluated 915. Each row of the Date Conversion Table has three fields: a Gregorian leap year field, a Gregorian non-leap year field, and a 360-day-year field. If the leap year flag has the "Yes" value, then it is determined 920 that the Gregorian leap year field of the Date Conversion Table 760 is to be compared to the Gregorian day-of-the-year in the Month/Day Character Register 740. If the leap year flag has the "No" value, then it is determined 925 that the Gregorian non-leap year field of the Date Conversion Table 760 is to be compared to the Gregorian day-of-the-year in the Month/Day Character Register 740. A comparison is then made 930 between the stored Gregorian day-of-the-year (DOTY) in the Month/Day Character Register 740 and the day-of-the-year (DOTY) at the indexed row of the Date Conversion Table 760 in the appropriate field.

If a match is not found between the stored Gregorian day-of-the-year (DOTY) in the Month/Day Character Register 740 and the DOTY at the indexed row of the Date Conversion Table 760 in the appropriate field, then the index is decremented by one 940. The value of the index is tested 945, and if it is less than one, then the day-of-the-year (DOTY) in the Month/Day Character Register 740 was not found in the Date Conversion Table 760, and error routines 950 are initiated. If the index value is not less than one then another comparison is made 930 between the stored Gregorian day-of-the-year (DOTY) in the Month/Day Character Register 740 and the DOTY at the indexed row of the Date Conversion Table 760 in the appropriate field.

If a match is found during a comparison 930, then the Search Table unit 755 sets the flag in the Found Flag Register 750 to the "Yes" value 935 (enabling the Copy unit 720 to alter the contents of the Leap Year Flag Access Register 725 until another date conversion is begun), and the day-of-the-year (DOTY) at the indexed row in the 360-day-year field is stored 937 in the 360-Day-Year Day-of-the-year Register 770.

The system 800 of the present invention for conversion of a 360-day-year day-of-the-year to a Gregorian day-of-the-year is shown in FIG. 29B. The system 800 includes a plurality of storage registers 805, 815, 825, 840, 850 and 870 (shown as rectangular blocks), a plurality of processing units 803, 810, 820, 830, 835, 845, 855, and 865 (shown as oval blocks), and the look-up table 760 (shown as a rectangular block). In the preferred embodiment of the present invention the processing units 803, 810, 820, 835, 845, 855 and 865 are implemented as COBOL computer code. Alternatively, the processing units 803, 810, 820, 835, 845, 855 and 865 may be dedicated hardwired processors. The Search Table unit 855 requires data from a Leap Year Flag Access Register 825, a 360-day-year Character Register 840, and a Found Flag Register 850, so these registers 825, 840 and 850 must be loaded with the appropriate values prior to the search performed by the Search Table unit 855. Therefore, the flow chains beginning with a Load Year unit 803, a Binary 360-day-year Date Register 830, and a Set Found Flag unit 845 must be completed prior to the operation of the Search Table unit 855. The Search Table unit 855 outputs data to the Gregorian Day-of-the-year Register 870 and back to the Found Flag Register 850. Since the Search Complete unit 865 utilizes the flag value in the Found Flag Register 850, the Search Complete unit 865 operates after the Search Table unit 855 has terminated. (For clarity, the control apparatus for initiating the flow chains is not shown in FIG. 29B.)

To set the flag in the Leap Year Flag Access Register 825 a year is loaded by a Load Year unit 803 into a Year Register 805. This year in the Year Register 805 is accessed by a Test For Leap Year unit 810 which sets a flag in a Leap Year Flag Buffer Register 815 to a "Yes" value if the year is indeed a leap year, and a "No" value otherwise. The flag in the Leap Year Flag Buffer Register 815 is then copied by a Copy unit 820 to a Leap Year Flag Access Register 825. The Copy unit 820 also functions to prevent the flag in the Leap Year Flag Access Register 825 from changing value if the flag in the Found Flag Register 850 has the "No" value. The flag in the Found Flag Register 850 is set to a "No" value by a Set Found Flag unit 845 at the beginning of the date conversion process, and remains at that value until the date conversion is accomplished.

The 360-day-year day-of-the-year is stored in binary form in a Binary 360-Day-Year Date Register 830. The Gregorian and 360-day-year days-of-the-year in the Date Conversion Table 760 are stored in character form to facilitate inspection and alterations of the entries in the Date Conversion Table 760, so a Translate to Character Format unit 835 is required to convert the 360-day-year day-of-the-year to a character format for storage in a 360-Day-Year Character Register 840.

Figure 29D:
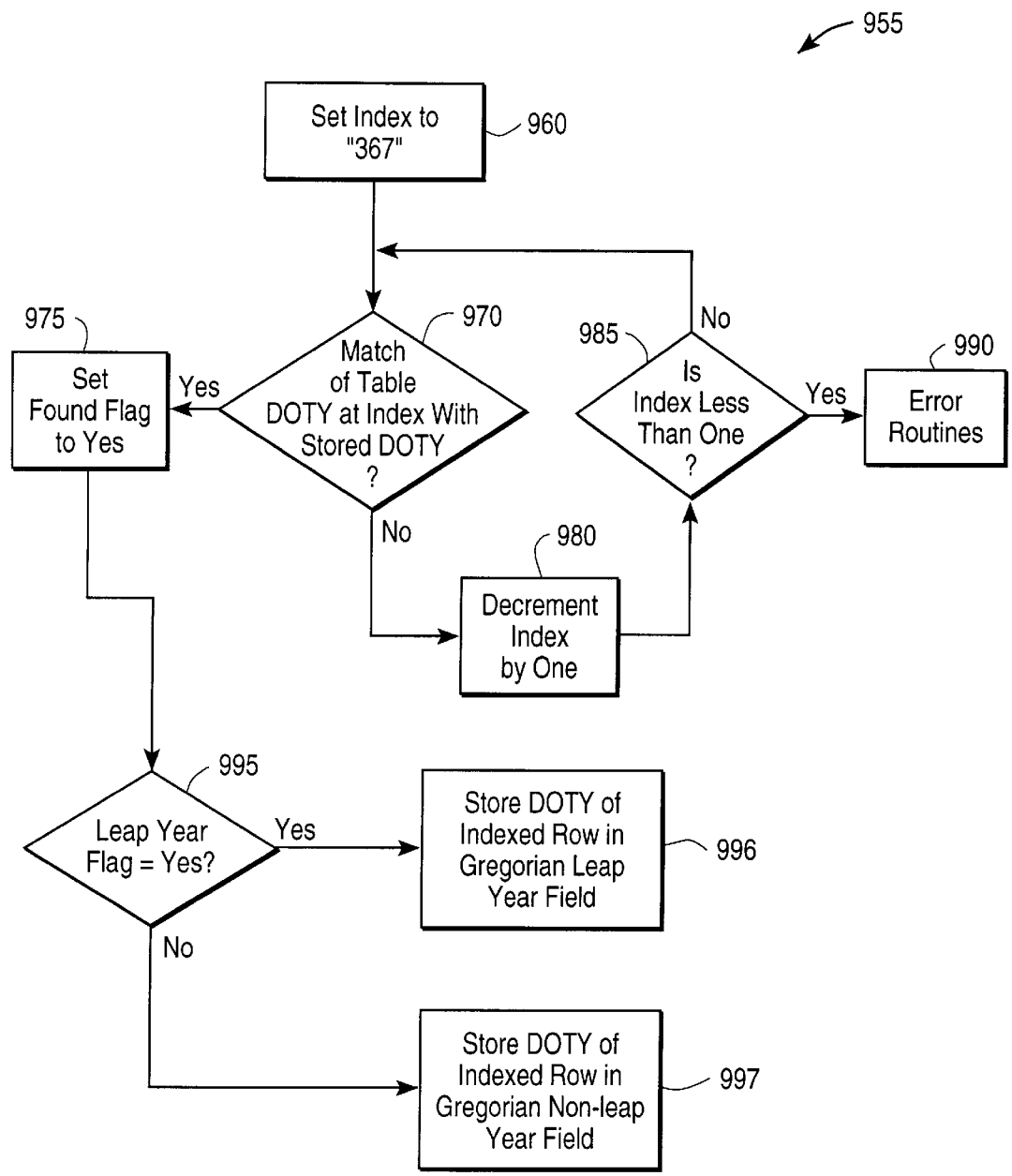
FIG. 29D shows a flow chart for the Search Table unit of FIG. 29B.

A search of days-of-the-year in a Date Conversion Table 760 is performed by the Search Table unit 855 according to the flow chart shown in FIG. 29D. First the index variable is set to an initial value of three hundred and sixty seven 960. A comparison 970 is then made between the stored 360-day-year day-of-the-year (DOTY) in the 360-Day-Year Character Register 840 and the 360-day-year day-of-the-year (DOTY) at the indexed row of the Date Conversion Table 760 in the 360-day-year field.

If a match is not found between the stored 360-day-year day-of-the-year (DOTY) in the 360-Day-Year Character Register 840 and the DOTY at the indexed row of the Date Conversion Table 760 in the 360-day-year field, then the index is decremented by one 980. The value of the index is then tested 985, and if it is less than one, then the day-of-the-year in the 360-Day-Year Character Register 840 was not found in the Date Conversion Table 760, and error routines 990 are initiated. If the index value is not less than one then another comparison is made 970 between the stored 360-day-year day-of-the-year (DOTY) in the 360-Day-Year Character Register 840 and the DOTY at the indexed row of the Date Conversion Table 760.

If a match is found during a comparison 970, then the Search Table unit 855 sets the flag in the Found Flag Register 850 to the "Yes" value 975 (enabling the Copy unit 820 to alter the contents of the Leap Year Flag Access Register 825 until another date conversion is begun). Then it is determined 995 whether the flag in the Leap Year Flag Access Register 825 has the "Yes" value, and if it does then the day-of-the-year (DOTY) at the indexed row in the Gregorian leap year field of the Date Conversion Table 760 is stored 996 in the Gregorian Day-of-the-year Register 870. However, if the flag in the Leap Year Flag Access Register 825 has the "No" value, then the day-of-the-year (DOTY) at the indexed row in the Gregorian non-leap year field of the Date Conversion Table 760 is stored 997 in the Gregorian Day-of-the-year Register 870.

Although the processing units and storage registers in FIG. 29A have different reference numerals than the processing units and storage registers in FIG. 29B, a number of the processing units and storage registers used in the conversion from a 360-day-year day-of-the-year to a Gregorian day-of-the-year diagramed in FIG. 29A could also be used in the conversion from a Gregorian day-of-the-year to a 360-day-year day-of-the-year diagramed in FIG. 29B. In particular, the Load Year unit 703, the Year Register 705, the Test For Leap Year unit 710, the Leap Year Flag Buffer Register 715, the Copy unit 720, the Leap Year Flag Access Register 725, the Set Found Flag unit 745, and the Found Flag Register 750 of FIG. 29A could be used for the Load Year unit 803, the Year Register 805, the Test For Leap Year unit 810, the Leap Year Flag Buffer Register 815, the Copy unit 820, the Leap Year Flag Access Register 825, the Set Found Flag unit 845, and the Found Flag Register 850 of FIG. 29B, respectively. Although the Binary Gregorian Date Register 730, the Month/Day Character Register 740 and the 360-Day-Year Day-of-the-year Register 770 of FIG. 29A could also be used for the Binary 360-Day-Year Date Register 830, the 360-Day-Year Character Register 840, and the Gregorian Day-of-the-year Register 870 of FIG. 29B, respectively, it is preferable to use a different set of registers since the format of the data differs for the different directions of the date conversion. The Translate To Character Format unit 735 and the Search Table unit 755 of FIG. 29A use a different set of processes than the Translate To Character Format unit 835 and the Search Table unit .855 of FIG. 29B, so the same units cannot be used for both directions of the date conversion.

It should be noted that the same date conversion table 760 is used in both the Gregorian to 360-day-year conversions of FIG. 29A and the 360-day-year to Gregorian conversions of FIG. 29B. The fact that a single table with a Gregorian non-leap year field, a Gregorian leap year field and a 360-day-year field (rather than separate two-field tables for the Gregorian leap year to 360-day-year conversion, the Gregorian non-leap year to 360-day-year conversion, the 360-day-year to Gregorian leap year conversion, and the 360-day-year to Gregorian non-leap year conversion) can be used for both directions of date conversion is an important and advantageous innovation of the present invention.

FIGS. 30A–30E provide COBOL computer code for the calendar conversion table of the present invention. The first line of the COBOL computer code describing the table is assigned a level of 01 (as indicated by the "01" at the beginning of the line) and indicates that the name of the table is TCR-CAL-TO-KAL-TABLE. The second line of the COBOL computer code describing the table is assigned a level of 05, and indicates that the entries in the table are assigned to a variable called TRC-CAL-TO-KAL-TABLE-1-DEF. The next three hundred and sixty seven lines of COBOL computer code are at level 10. Each of these three hundred and sixty seven lines specifies an entry of a row of the table TCR-CAL-TO-KAL-TABLE. The second column of each of the table entries contains the dummy name "FILLER." The third and fourth columns of each table entry contains the code "PIC X(17)" to indicate that the entry in each row is seventeen alphanumeric characters long. The fifth column contains the code "VALUE" to indicate that the next column, i.e., the sixth column provides the value of the table entry. The table entries in the sixth column are enclosed in quotes.

After the three hundred and sixty seven table entries of level 10, the next pair of COBOL computer code lines, which are at level 05, equate TRC-CAL-TO-KAL-TABLE-2-DEF to TRC-CAL-TO-KAL-TABLE-1-DEF to facilitate the breakdown of the seventeen characters in each row of the table into fields, as described below. The following line of COBOL computer code at level 10 confirms that the dummy name FILLER occurs three hundred and sixty seven times and assigns the index of the table the character name TRC-CAL-TO-KAL-IDX.

The following nine lines of COBOL computer code at level 15 assign variable names to the fields in the sixth column of the table entries. The first two characters in the table entry are numeric characters, as indicated by the code "PIC 9(02)" at the end of the line, and are assigned the variable name TRC-CAL-TO-KAL-TBL-G-MO-LEAP since these characters represent a Gregorian leap year month. The next character is an alphanumeric filler character, as indicated by the code "PIC X(01)." In the table a slash is used for this filler character. The values of the filler characters in the table do not affect the date conversion process, so characters other than those shown may be used. The next two characters in the table entry are numeric characters and are assigned the variable name TRC-CAL-TO-KAL-TBL-G-DA-LEAP since these characters represent a Gregorian leap year day-of-the-month. The variables TRC-CAL-TO-KAL-TBL-G-MO-LEAP and TRC-CAL-TO-KAL-TBL-G-DA-LEAP are considered to comprise the Gregorian leap year field of the table. The next character is another alphanumeric filler character—in the table a semi-colon is used for this filler character. The next two characters in the table entry are numeric characters and are assigned the variable name TRC-CAL-TO-KAL-TBL-G-MO-N-LEAP since these characters represent a Gregorian non-leap year month. The next character is another alphanumeric filler character—another slash is used for this filler character. The next two characters in the table entry are numeric characters and are assigned the variable name TRC-CAL-TO-KAL-TBL-G-DA-N-LEAP since these characters represent a Gregorian non-leap year day-of-the-month. The variables TRC-CAL-TO-KAL-TBL-G-MO-N-LEAP and TRC-CAL-TO-KAL-TBL-G-DA-N-LEAP are considered to comprise the Gregorian non-leap year field of the table. The next three characters are alphanumeric filler characters[\M]a semicolon and two spaces are used for these filler characters. The next three characters in the table entry are numeric characters and are assigned the variable name TRC-CAL-TO-KAL-TBL-K360-DAY since these characters represent a 360-day-year day-of-the-year. The variable TRC-CAL-TO-KAL-TBL-K360-DAY is considered to comprise the 360-day-year field of the table. For convenience of discussion, the Gregorian leap year and non-leap year fields will be referred to as the sixth column, and the 360-day-year field will be referred to as the seventh column. Also for convenience of discussion, the Gregorian leap year field be referred to as the left-hand half of the sixth column, and the Gregorian non-leap year field will be referred to as the right-hand half of the sixth column.

The day-of-the-year 02/29 is listed in the left-hand half of the column, but not the right-hand half, since the left-hand day-of-the-year of the pair in the sixth column of FIGS. 30A–30E is for leap years. It may be noted that some days-of-the-year are repeated in both the left-hand and right-hand halves of the sixth column. In particular, 02/29 is repeated twice in the left-hand half, and 03/01 is repeated three times in the right-hand half. It may be noted that some numbers in the seventh column of the table of FIGS. 30A–30E (namely 030, 90, 210, 840, 300 and 360) are also repeated.

It should be noted that an important advantage of the system of the present invention is the economy of the table of FIGS. 30A–30E. According to the present invention four different types of calendar conversions (namely 360-day-year to Gregorian leap year, 360-day-year to Gregorian non-leap year, Gregorian leap year to 360-day-year, and Gregorian non-leap year to 360-day-year) are accomplished using a table with rows having only three fields.

Figure 31:
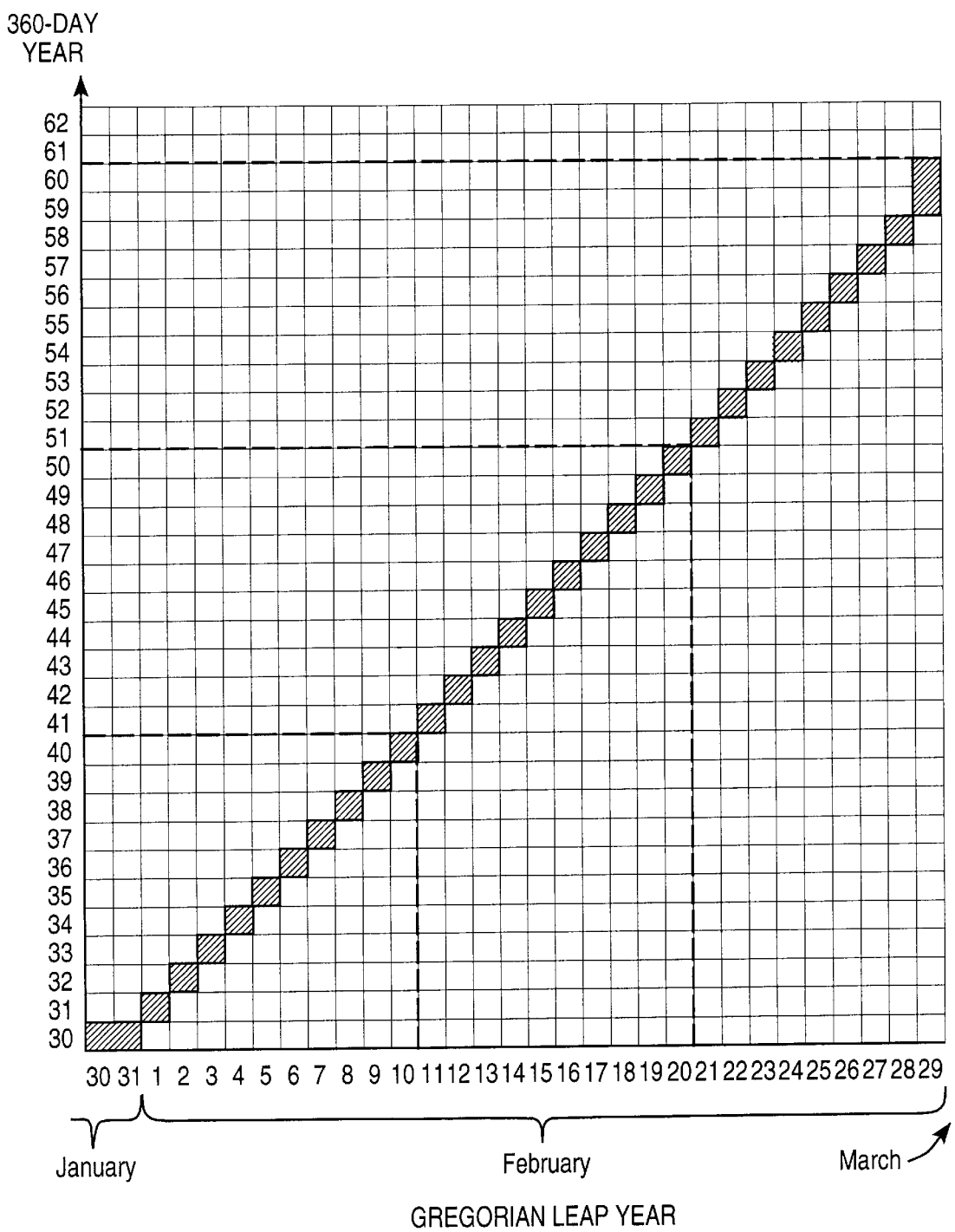
FIG. 31 provides a graphical representation of date conversion entries of the table of FIG. 30 for a leap year.

The mapping between the Gregorian leap year days-of-the-year in the left-hand half of the sixth column and the 360-day-year days-of-the-year in the seventh column of FIGS. 30A–30E is represented graphically in FIG. 31 for a period which includes all of February, the last two days of January, and the first day of March. Clearly, most of the points lie along a diagonal line with a slope of unity. There is a horizontal section of the graph at January 30 to January 31, and a vertical section of the graph with a length of two 360-day-year days at February 29. Inspection of the table of FIGS. 30A–30E shows that a graph of the entire year would have additional horizontal sections from March 30 to March 31, July 30 to July 31, August 30 to August 31, October 30 to October 31, and December 30 to December 31. However, the vertical section that occurs at the end of February is the only vertical section of a graph of the entire year.

Similarly, the mapping between the Gregorian non-leap year days-of-the-year in the right-hand half of the sixth column and the 360-day-year days-of-the-year in the seventh column of FIGS. 30A–30E is represented graphically in FIG. 31 for a period which includes all of February, the last two days of January, and the first two days of March. Clearly, most of the points lie along a diagonal line with a slope of unity. There is a horizontal section of the graph at January 30 to January 31, and a vertical section of the graph with a length of three 360-day-year days at March 1. Inspection of the table of FIGS. 30A–30E shows that a graph of the entire year would have additional horizontal sections from March 30 to March 31, Jul. 30 to July 31, August 30 to August 31, October 30 to October 31, and December 30 to December 31. However, the vertical section that occurs at the beginning of March is the only vertical section of a graph of the entire year.

Figure 32:
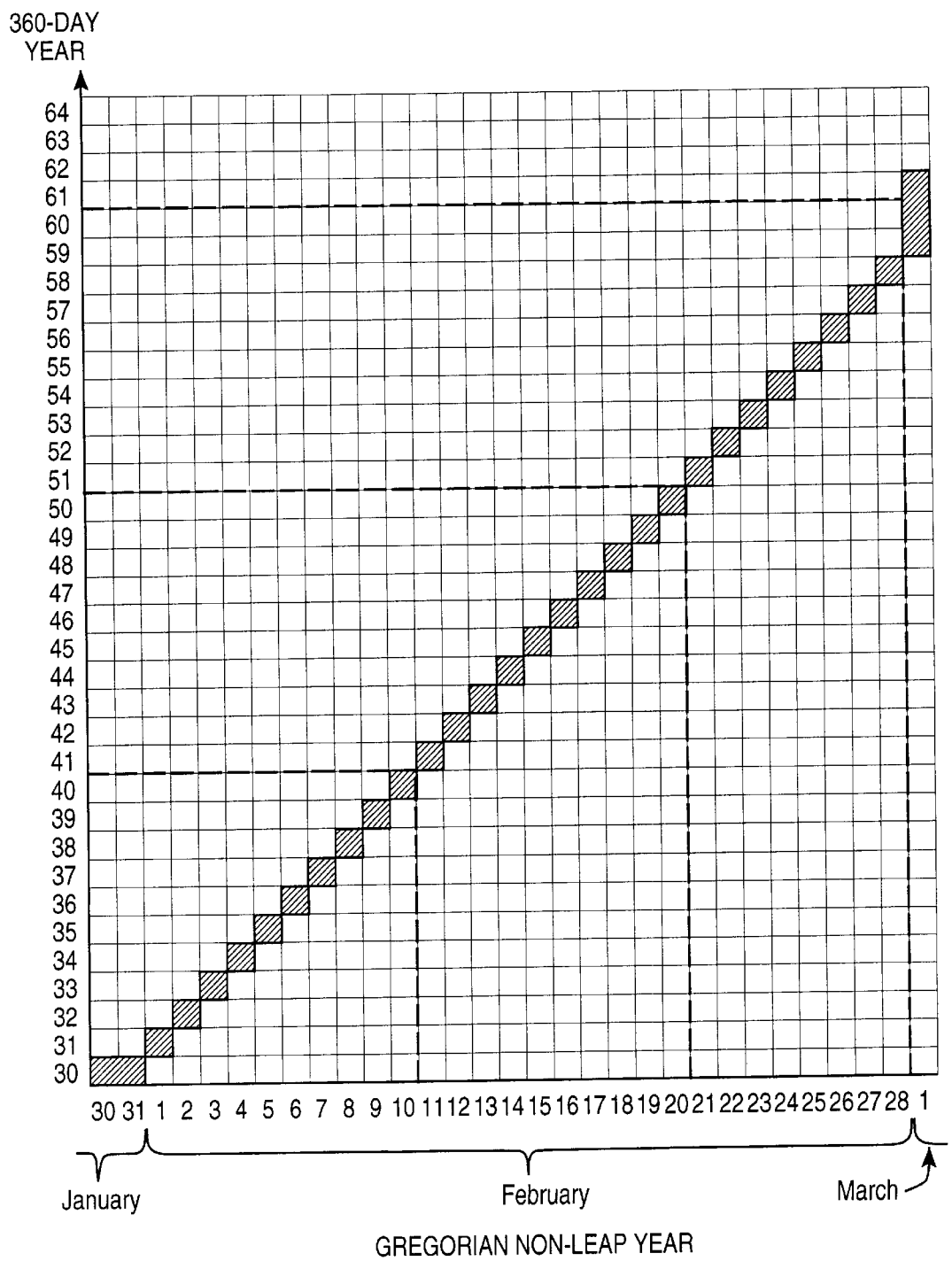
FIG. 32 provides a graphical representation of date conversion entries of the table of FIG. 30 for a non-leap year.

It is important to note that no single function could generate a mapping such as that shown in FIGS. 31 or 32 since these graphs have both vertical and horizontal sections. A function of the abscissa could generate a graph with horizontal sections, or a function of the ordinate could generate a graph with vertical sections.

As discussed above, a conversion from a Gregorian day-of-the-year to a 360-day-year day-of-the-year is performed by searching upwards through the table of FIGS. 30A–30E for a match. For instance, the conversion of the Gregorian day-of-the-year 8/20 in a leap year to a 360-day-year day-of-the-year is performed by searching from upwards in the left-hand half of the sixth column from the day-of-the-year 12/31 in FIG. 30E. The entry "8/20" is reached in FIG. 30C, and the corresponding entry in the seventh column is "230," so 230 is the 360-day-year day-of-the-year corresponding to 8/20 in a leap year. Similarly, the conversion of the Gregorian day-of-the-year 8/20 in a non-leap year to a 360-day-year day-of-the-year is performed by searching from upwards in the right-hand half of column sixth from the day-of-the-year of 12/31 in FIG. 30E. The entry "8/20" is reached in FIG. 30C, and again the corresponding entry in the seventh column is "230," so 230 is also the 360-day-year day-of-the-year corresponding to 8/20 in a non-leap year.

The importance of searching from the last day-of-the-year at the bottom of the table of FIGS. 30A–30E toward the first day-of-the-year at the top of the table is illustrated by the conversion of the Gregorian day-of-the-year 2/29 in a leap year to a 360-day-year day-of-the-year. In searching upwards in the left-hand half of the sixth column from the day-of-the-year of 12/31 in FIG. 30E, a first entry "2/29" is reached when the corresponding entry in the seventh column is "60," so 60 is the 360-day-year day-of-the-year corresponding to 2/29 in a leap year. It should be noted that although there is a second "2/29" entry just above this one with a corresponding 360-day-year day-of-the-year of "59," this entry is not reached according to the logic of FIG. 29C since when a match is found 930–935 no further entries of the Date Conversion Table 760 are examined. Similarly, the conversion of the Gregorian day-of-the-year 3/01 in a non-leap year to a 360-day-year day-of-the-year, is performed by searching upwards in the right-hand half of the sixth column. When a first entry "3/01" is reached the corresponding entry in the seventh column is "61," so 61 is the 360-day-year day-of-the-year corresponding to 3/01 in a non-leap year. In this case it should be noted that although there are second and third "3/01" entries just above this one with corresponding 360-day-year days-of-the-year of "60," and "59," these entries are not reached according to the logic of FIG. 29C since when a match is found 930–935 no further entries of the Date Conversion Table 760 are examined.

As discussed above in conjunction with FIG. 29D, the same search method is used in conversions of 360-day-year days-of-the-year to Gregorian days-of-the-year. For instance, the conversion of the 360-day-year day-of-the-year "66" in a leap year to a Gregorian day-of-the-year is performed by searching from upwards in the seventh column from the entry of "360" in FIG. 30E. The entry "66" is reached in FIG. 30A, and the corresponding entry in the left-hand half of the sixth column is "3/06," so March 6 is the Gregorian day-of-the-year corresponding to the 360-day-year day-of-the-year of "66" in a leap year. Similarly, the conversion of the 360-day-year day-of-the-year "66" in a non-leap year is performed by searching from upwards in the seventh column until the entry "66" is reached in FIG. 30A. The corresponding entry in the right-hand half of the sixth column is again "3/06," so March 6 is the corresponding Gregorian day-of-the-year in a non-leap year.

The importance of searching from the last day-of-the-year at the bottom of the table of FIGS. 30A–30E toward the first day-of-the-year at the top of the table is illustrated by the conversion of the 360-day-year day-of-the-year "90" to a Gregorian leap year day-of-the-year. In searching upwards in the seventh column from the day-of-the-year of "360" in FIG. 30E, a first entry of "90" is reached when the corresponding entry in the left-hand half of the sixth column is "3/31," so March 31 is the Gregorian day-of-the-year corresponding to the 360-day-year day-of-the-year of "90" in a leap year. It should be noted that although there is a second "90" entry just above this one with a corresponding Gregorian day-of-the-year of March 30, this entry is not reached according to the logic of FIG. 29D since when a match is found 970–975 no further entries of the Date Conversion Table 760 are examined. Similarly, the conversion of the 360-day-year day-of-the-year "90" to a Gregorian non-leap year day-of-the-year is performed by searching upwards in the seventh column from the day-of-the-year of "360" in FIG. 30E. When a first entry of "90" is reached, the corresponding entry in the right-hand half of the sixth column is again "3/31," or March 31. Again it is noted that although there is a second "90" entry just above this one with a corresponding Gregorian day-of-the-year of March 30, this entry is not reached according to the logic of FIG. 29D.

For a graph such as that shown in FIGS. 31 and 32, but for the entire year, the graphical equivalent of the search from the last day-of-the-year to the first day-of-the-year in the table of FIGS. 30A–30E is a descent from the top right-hand point in the graph, downwards and to the left (each point on the graph has a neighboring point that is either directly to the left, or directly below, or directly diagonal to the bottom-left) until the appropriate Gregorian day-of-the-year or 360-day-year day-of-the-year is reached. For instance, the conversion of March 1 to a 360-day-year day-of-the-year in a non-leap year is begun at the point in the upper right-hand corner (corresponding to the 360-day-year day-of-the-year of 360, not shown in FIG. 312), and continues downwards and to the left until the point corresponding to the abscissa value of March 1 and the ordinate value of 61 is reached, as shown in FIG. 312. Therefore, the 61st day-of-the-year of the 360-day-year corresponds to March 1 of a non-leap year. It should be noted that although ordinate values of 60 and 59 also correspond to the abscissa value of March 1, these ordinate values are not reached according to the logic of FIG. 29C.

Similarly, the conversion of the 30th day-of-the-year of the 360-day-year in a leap year is begun at the point in the upper right-hand corner (corresponding to the 360-day-year day-of-the-year of 360, not shown in FIG. 31), and continues downwards and to the left until the point corresponding to the ordinate value of 30 and the abscissa value of January 31 is reached, as shown in FIG. 31. Therefore, the 30th day-of-the-year of the 360-day-year corresponds to January 31 of a leap year. It should be noted that although an abscissa value of January 30 also correspond to the ordinate value of 30, this ordinate value is not reached according to the logic of FIG. 29D since when a match is found 970–975 no further entries of the Date Conversion Table 760 are examined.

Date Logic Generator

The date logic generator of the present invention may run under ISPF (i.e., the interactive structured programming facility) or MVS (i.e., the mainframe virtual system), or on an IBM-compatible personal computer. The date logic generator is invoked by a PF key (i.e., one of the function keys, labeled F1 through F12, generally available across the top of the standard computer keyboard), whereupon the programmer is guided through a series of screens which allow the selection of a calendaring function, and the specification of the values of the parameters of the calendaring function. The programmer is given the option of testing the selected calendaring function, by entering input data and comparing the output from the calendaring function with an expected output. If the outputs do not agree, the calendaring function and/or its parameter values may be modified, and testing may again be performed. Once the programmer is satisfied with the results of the testing, the date logic generator may then generate the source code in the original program for a "CALL" statement for the calendaring function with the specified parameter values.

Figure 33:
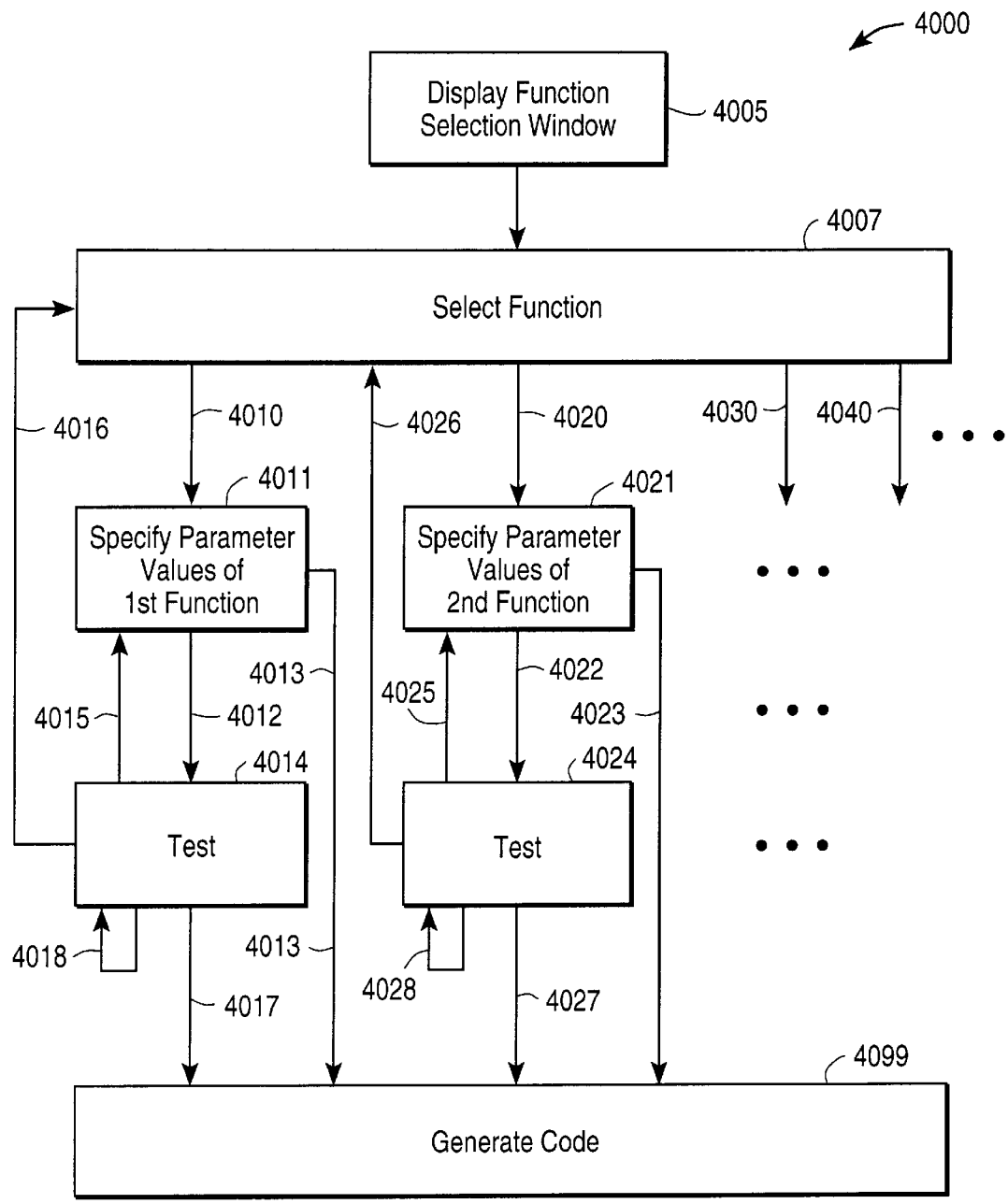
FIG. 33 shows a flowchart for the selection of a calendaring function, the specification of the parameter values, testing of the function, and generation of the source code.

A flowchart depicting the selection of a calendaring function, the specification of the parameter values of the function, the testing of the operation of the function, and the generation of code for the function and the specified parameter values, according to the present invention, is shown in FIG. 33. It is important to note that although the present invention is depicted as a method in FIG. 33, each method step may be mapped to an apparatus which functions as a means for implementing the method step. Initially, a function selection window 4005 is displayed on a display screen, and a calendaring function is selected by the programmer 4007. If a first calendaring function is selected 4010, the selection of parameter values for the first calendaring function is then made 4011. If the programmer is confident after the selection of the parameter values 4011, that the correct function and parameter values have been selected, then the programmer may proceed 4013 directly to the generation of source code 4099 for the chosen function and parameter values. However, it is much more prudent for the programmer to then test 4014 the function and its parameter values by supplying input data values and observing the output, to confirm that the selected function and its parameter values are correctly specified.

If the output from the test 4014 of the function is as expected, it may be prudent for the programmer to return 4018 for at least one more test 4014 to insure that the function with its parameter values have indeed been correctly specified. If this additional test 4014 does provide the expected result, then the programmer may wish to generate the source code 4099 for the function and its parameter values. However, if any of these tests 4014 do not generate the expected output then either the programmer has made a mistake in calculating the expected output, the selected calendaring function is incorrect, or one or more parameter values of the function are incorrect. If the programmer determines that one or more incorrect parameter values were selected, a return is made 4015 to the step of selecting the parameter values 4011 for the function, and the process proceeds as described above. Or, if the programmer determines that an incorrect function was selected, a return is made 4016 to the function selection step 4007, another function is selected, and the process proceeds as described above.

As shown in FIG. 33, the process of selecting the second function 4020, specifying its parameter values 4021, testing it 4024, and generating the source code 4099 for the second function and its parameter values is the same as that described above for the first function. In particular, if the programmer is confident after the selection of the parameter values 4021, that the correct function and parameter values have been selected, then the programmer may proceed 4023 directly to the generation 4099 of source code for the function and parameter values. Or, the programmer may test 4024 and retest 4028 the second function and its parameter values to confirm that the function and its parameter values are correctly specified. If the programmer determines that one or more incorrect parameter values were selected, a return is made 4025 to the step of selecting the parameter values for the second function 4021. Or, if the programmer determines that an incorrect function was selected, a return is made 4026 to the function selection step 4007, and another function is selected. Similar, processes are also followed for the selection of any other functions 4030, 4040, etc.

Figure 34:
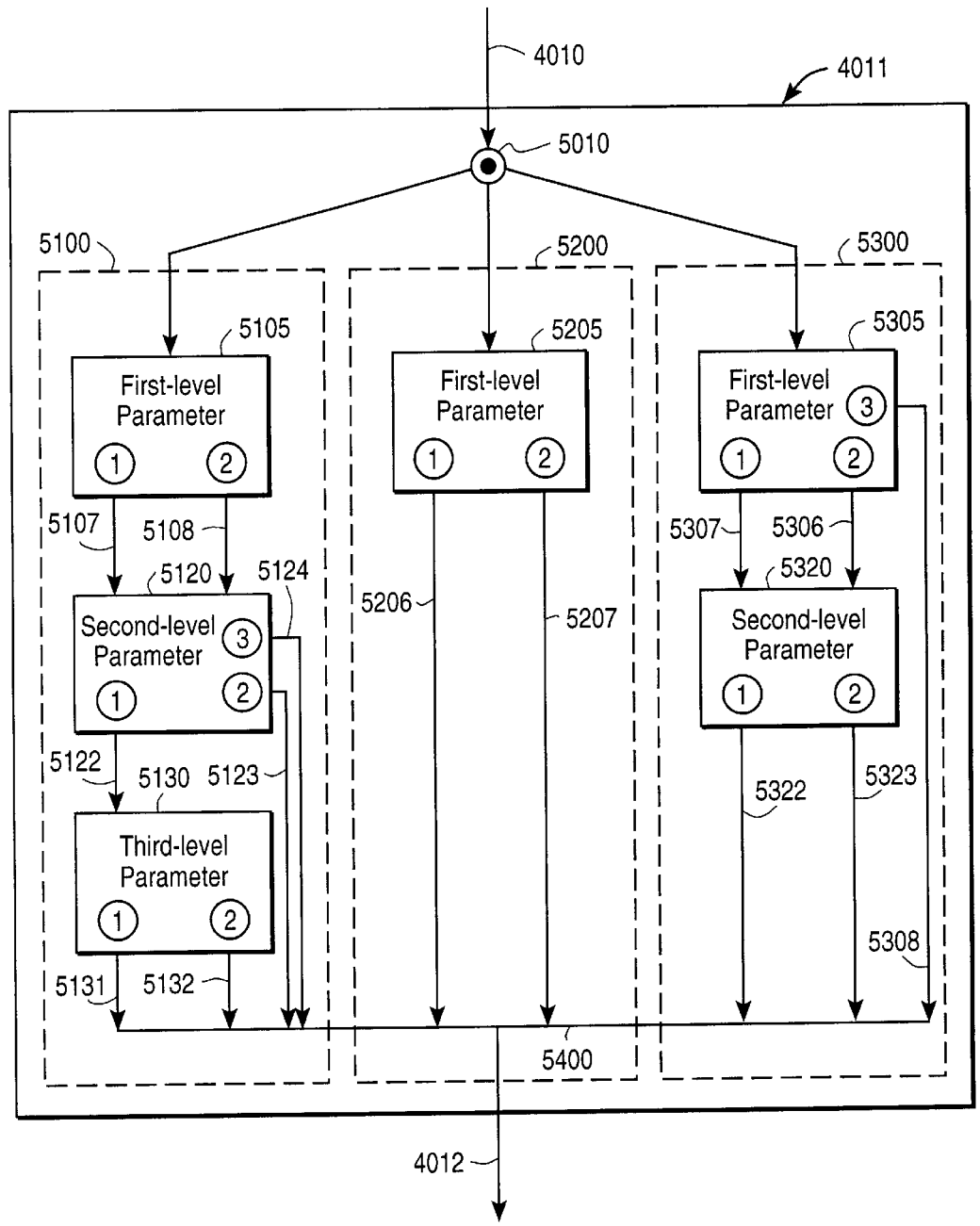
FIG. 34 shows a flowchart for the specification of the values of parameters from a plurality of levels.

An exemplary flowchart for the parameter value specification step 4011 for the first function 4010 is shown in FIG. 34. The flowcharts for the parameter value specification steps of any of the other functions would look similar. Again, it is important to understand that although the specification of parameter values for a function is depicted as a method in FIG. 34, each method step may be mapped to an apparatus which operates as a means for implementing the method step. Upon entering 4010 the parameter selection step 4011, the flow bifurcates at bifurcation point 5010 into three separate branches 5100, 5200, and 5300, each of which are to be completed prior to exiting 4012 from the parameter value specification step 4011. Corresponding to the three branches 5100, 5200 and 5300 of this exemplary parameter specification step 4011 there would initially be three parameter titles and specification fields displayed on the computer screen (not shown). In the first branch 5100 a first-level parameter is to be specified 5105. There are two possible values 5107 and 5108 for this first parameter 5105 (for instance, "on" and "off"), and upon specification of the state 5107 or 5108, a second-level parameter title and specification field is displayed on the computer screen for a three-value parameter. Therefore, both values 5107 and 5108 for the first-level parameter 5105 are termed "non-terminal" values.

If the second or third values 5123 or 5124 of the second-level are specified, that branch 5100 of the parameter specification flow is complete, so these values 5123 and 5124 are termed "terminal" values. However, if the programmer specifies the first parameter value 5122, then a third-level parameter title and specification field is displayed on the computer screen (not shown) for a two-value third-level parameter 5130, so this value 5122 is a non-terminal value. Upon specification of either the first or second values 5131 or 5132 for this third-level parameter 5130, this branch 5100 of the parameter specification flow is complete, so both values 5131 and 5132 are terminal values.

In the second branch 5200 of the parameter specification step 4011 there is a two-value first-level parameter 5205. Upon specification of either the first value 5206 or the second value 5207 this branch is completed, so both values 5206 and 5207 are terminal values.

The first-level parameter 5305 in the third branch 5300 of the parameter specification step 4011 is a three-value parameter. The third value 5308 is a terminal value, and upon specification of that value 5308 that branch 5300 of the parameter specification flow is complete. However, if the first or second values 5307 or 5306 are specified, then a second-level parameter title and specification field is displayed for a two-value second-level parameter 5320. Upon specification of either the first or second values 5322 or 5323 for this second-level parameter 5320, this branch 5300 of the parameter specification flow is complete, so both values 5322 and 5323 are terminal values.

Figure 35:
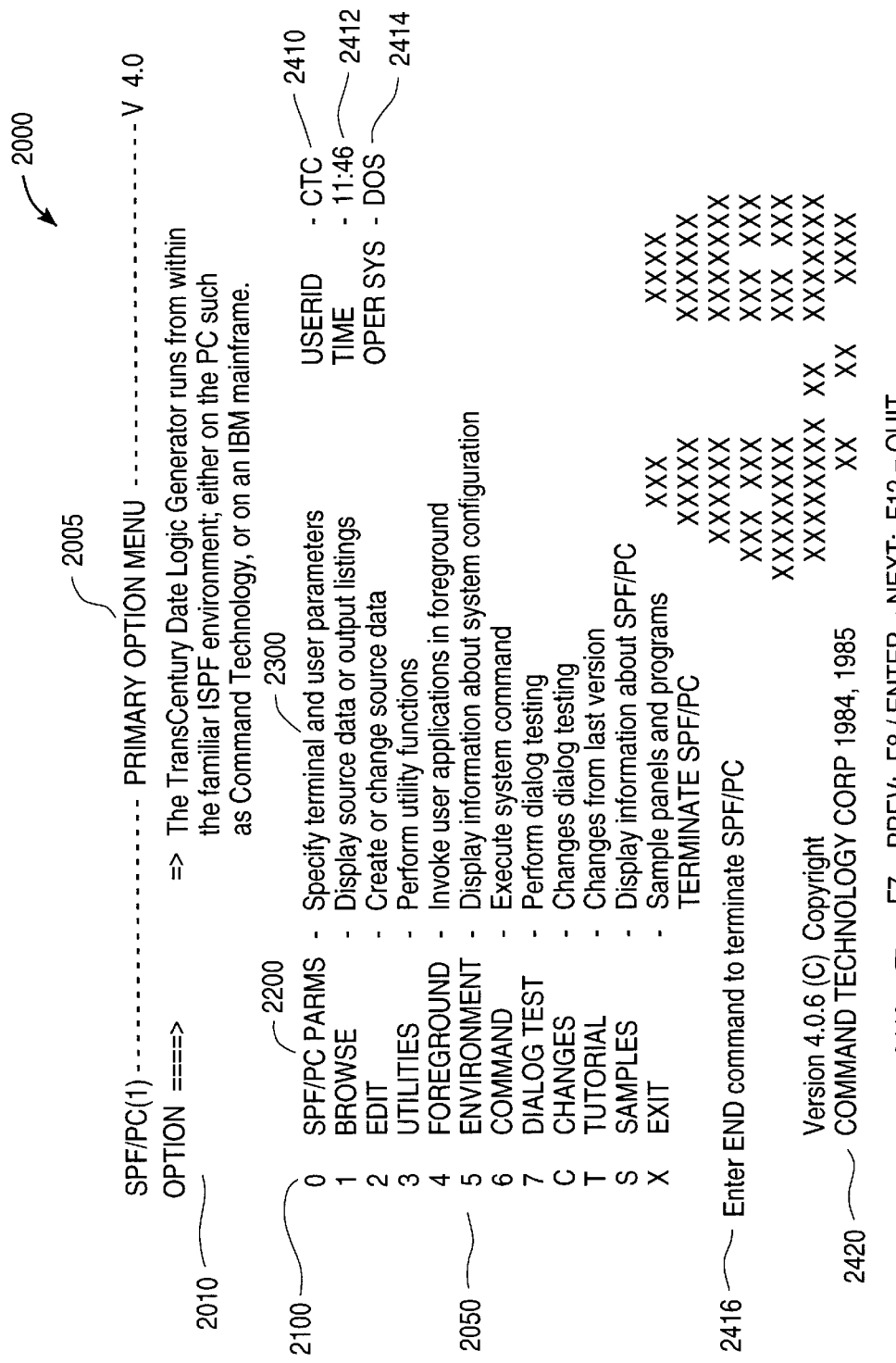
FIG. 35 shows the primary option menu screen.

A screen 2000 presenting the primary option menu for the ISPF environment is shown in FIG. 35. The screen 2000 has a heading line 2005 which identifies the system environment as that of SPF or PC, and indicates that the "PRIMARY OPTION MENU" is displayed. Below the heading line 2005 is text 2010 that explains that, for instance, the date logic generator of the present invention, produced by TransCentury, Inc. of San Francisco, Calif., runs on a PC or an IBM mainframe. Below this text 2010 is the options field 2050 which consists of a single-character command column 2100, a command title column 2200, and a command explanation column 2300. The screen 2000 also specifies the user identification as "CTC" on the USERID line 2410, the time as 11:46 on the TIME line 2412, the operating system as DOS on the OPER SYS line 2414. The version is specified as 4.0.6 and the source as Command Technology Corporation on the version/source lines 2420. The screen 2000 states that SPF/PC may be terminated by an END command on command line 2416, and command line 2418 states that the previous screen (not depicted in this specification) may be viewed by hitting the F7 key, the next screen (see below) may be viewed by hitting the F8 key or the Enter key, and that SPF/PC may be terminated by hitting the F12 key. As provided by the options field 2050, to edit a program (in the case of the present invention, for the purpose of creating or modifying calendaring functions) a "2" is entered. A prompt (not shown) is then given, at which point the name of the program to be editing is entered. The source code of the program is then displayed, and the programmer at this point either locates calendaring code which is to be replaced, or locates a point in the code where new calendaring code is to be generated.

Figure 36:
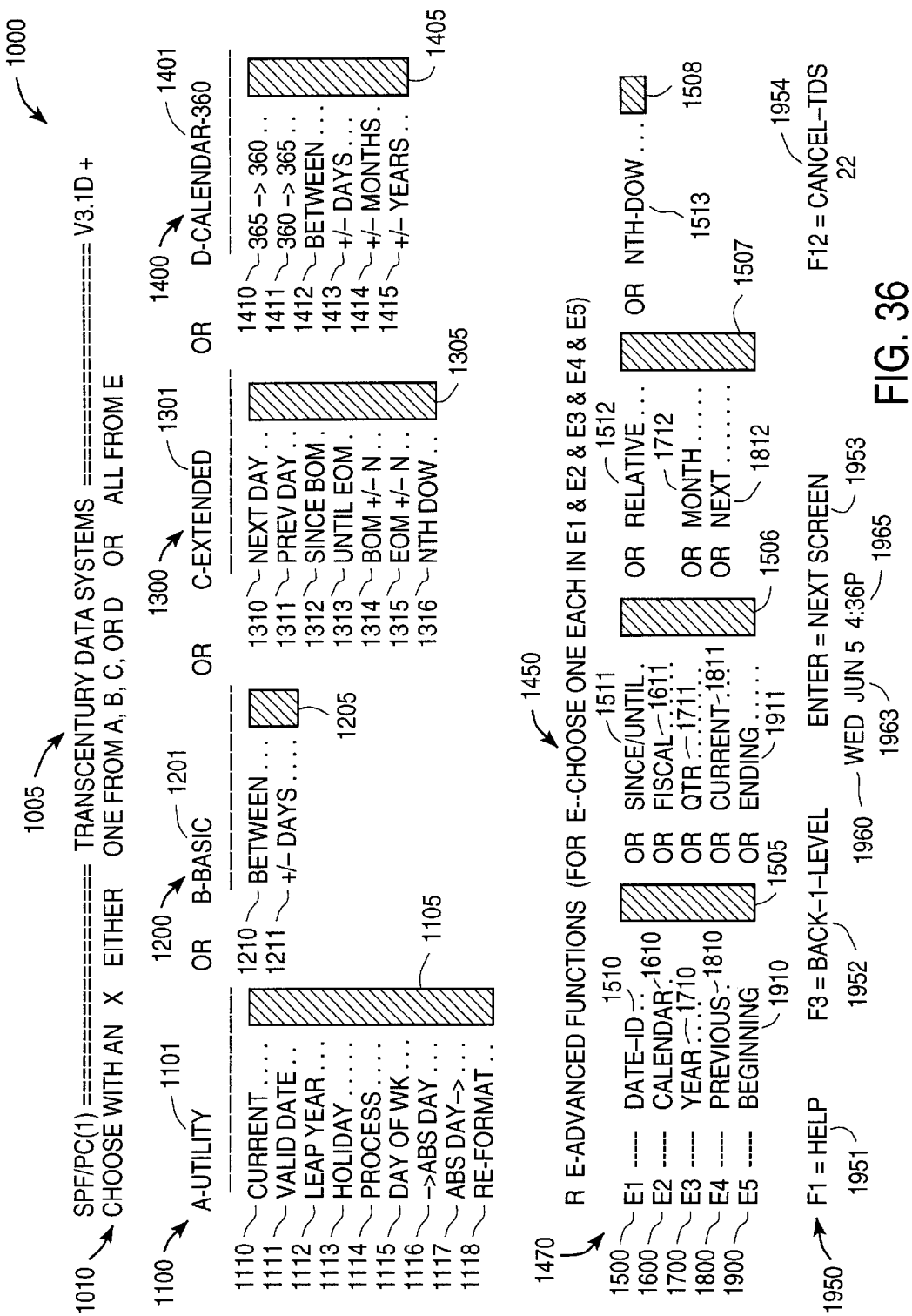
FIG. 36 shows the function selection screen.

The first date logic generation window 1000 is shown in FIG. 36. A heading 1005 for the window 1000 identifies the system environment as either SPF or PC, the software developer as TransCentury Data Systems (for instance), and the version number as 3.1D+. The next line of text in the window 1000 is the general instruction line 1010. The general instruction line 1010 instructs the programmer on how to use the window 1000 to select a particular type of date logic, as discussed in more detail below. The remainder of the window 1000 provides a utility functions column 1100, a basic functions column 1200, an extended functions column 1300, a 360-day-year calendar functions column 1400, an advanced functions area 1450, a commands line 1950, and a time/date line 1960. Each column 1100, 1200, 1300 and 1400 above the advanced functions area 1450 has a corresponding selection field 1105, 1205, 1305 and 1405, respectively, and each entry (as listed in detail below) in each row 1500, 1600, 1700, 1800 and 1900 in the advanced functions area 1450 has a corresponding selection field 1505, 1506, 1507 and 1508. The general instruction line 1010 indicates that the programmer is to: (i) place a single "X" in either the selection field 1105 of the utility functions column 1100, the selection field 1205 of the basic functions column 1200, the selection field 1305 of the extended functions column 1300, or selection field 1405 of the 360-day-year calendar functions column 1400, or (ii) place one "X" in the selection fields 1505, 1605, 1705 and 1805 in each row 1400, 1500, 1600, 1700, 1800 and 1900 of the advanced functions area 1450.

The utility functions column 1100 has a header line A-UTILITY 1101, and beneath the header line 1101 is the selection field 1105 and the items: CURRENT 1110, VALID DATE 1111, LEAP YEAR 1112, HOLIDAY 1113, PROCESS 1114, DAY OF WK 1115, →ABS DAY 1116, ABS DAY→1117, and RE-FORMAT 1118. Placing an "X" in the selection field 1105 opposite CURRENT 1110, VALID DATE 1111, LEAP YEAR 1112, HOLIDAY 1113, PROCESS 1114, DAY OF WK 1115, →ABS DAY 1116, ABS DAY→1117, RE-FORMAT 1118, or AGE BETWEEN 1119 instructs the date logic program to implement the CURRENT DATE function U001, VALIDATE DATE function U002, LEAP YEAR function U003, HOLIDAY function U004, PROCESSING DAY function u005, DAY OF WEEK function U006, DATE→ABSOLUTE DAYS function U007, ABSOLUTE DAYS→DATE function U008, or REFORMAT DATE function U009, examples of which are shown in FIGS. 6, 7 8, 9, 10, 11, 12, 13, and 14, respectively.

The basic functions column 1200 has a header line B-BASIC 1201, and beneath the header line 1201 is the selection field 1205 and the items: BETWEEN 1210, and +/−DAYS 1211. Placing an "X" in the selection field 1205 opposite BETWEEN 1210 or +/−DAYS 1211 instructs the date logic program to implement the DAYS BETWEEN (C/P 101) or DATE+/−DAYS (C/P 102), examples of which are shown in FIGS. 15*a* and 15*b* and FIGS. 16*a* and 16*b*, respectively.

The extended functions column 1300 has a header line C-EXTENDED 1301, and beneath the header line 1301 is the selection field 1305 and the items: NEXT DAY 1310, PREV DAY 1311, SINCE BOM 1312, UNTIL EOM 1313, BOM+/−N 1314, EOM+/−N 1315, and NTH DOW 1316. Placing an "X" in the selection field 1305 opposite NEXT DAY 1310, PREV DAY 1311, SINCE BOM 1312, UNTIL EOM 1313, BOM+/–N 1314, EOM+/–N 1315, or NTH DOW 1316 instructs the date logic program to implement the NEXT DAY function (C/P 201), PREVIOUS DAY function (C/P 202), DAYS SINCE THE BEGINNING OF THE MONTH function (C/P 203), DAYS UNTIL THE END OF THE MONTH function (C/P 204), BEGINNING OF THE MONTH+/–N DAYS function (C/P 205), END OF THE MONTH +/–N DAYS function (C/P 206), or Nth DOW OCCURRENCE FORWARD/BACKWARD function (C/P 207), examples of which are shown in FIGS. 17, 18, 19, 20, 21, 22 and 23, respectively.

The calendar-360 functions column 1400 has a header line D-CALENDAR-360 1401, and beneath the header line 1401 is the selection field 1405 and the items: 365→360 1410, 360→365 1411, BETWEEN 1412, +/–DAYS 1413, +/–MONTHS 1414 and +/–YEARS 1415. Placing an "X" in the selection field 1405 opposite 365→360 1410, 360→365 1411, BETWEEN 1412, +/–DAYS 1413, +/–MONTHS 1414 or +/–YEARS 1415 instructs the date logic program to perform: a 365-day-year to 360-day-year date conversion function, a 360-day-year to 365-day-year date conversion function, a computation of the number of days between two calendar dates, a computation of the date incremented or decremented by a specified number of days, a computation of the date incremented or decremented by a specified number of months, or a computation of the date incremented or decremented by a specified number of years, respectively, as per the 360-day year calculation techniques discussed above.

The advanced functions area 1450 has an instruction line "E-ADVANCED FUNCTIONS (FOR E—CHOOSE ONE EACH IN E1 & E2 & E3 & E4 & E5)" 1470, and five rows E1 1500, E2 1600, E3 1700, E4 1800 and E5 1900 of function title components. In the first row E1 1500 the titles are DATE-ID 1510, SINCE/UNTIL 1511, RELATIVE 1512 and NTH-DOW 1513, and these titles 1510, 1511, 1512 and 1513 have corresponding selection fields 1505, 1506, 1507 and 1508. As the instruction line 1470 states, to specify an advanced function one of these titles 1510, 1511, 1512 and 1513 must be selected. Inserting an "X" into the selection field 1505, 1506, 1507 or 1508 of DATE-ID 1510, SINCE/UNTIL 1511, RELATIVE 1512 or NTH-DOW 1513 means that SINCE/UNTIL functions, 700-series DATE RELATIVE TO functions, or 800-series Nth DOW WITHIN A PERIOD functions are selected, respectively. The function within the particular series is completely specified by choosing: (i) a calendar or fiscal period by selecting CALENDAR 1610 or FISCAL 1611 from row E2 1600; (ii) a period of a year, quarter or month by selecting YEAR 1710, QTR 1711 or MONTH 1712 from row E3 1700; (iii) the previous, current or next time period by selecting PREVIOUS 1810, CURRENT 1811 or NEXT 1812 from row E4 1800; and (iv) the beginning or end of the time period by selecting BEGINNING 1910 or ENDING 1911 from row E5 1900. For example, according to the chart of advanced function enumeration provided above, choosing DATE-ID 1510, FISCAL 1611, YEAR 1710, CURRENT 1811 and ENDING 1911 provides the 510 function, the output of which is the date of the end of the current fiscal year. Similarly, choosing SINCE/UNTIL 1511, CALENDAR 1610, QTR 1711, NEXT 1812 and BEGINNING 1910 provides the 617 function, the output of which is the number of days since or until the beginning of the next calendar quarter.

The command line 1950 below the advanced functions area 1450 informs that help with the utility may be obtained by hitting the F1 key 1951, the previous screen will be displayed if the F3 kit is hit 1952, the next screen will be displayed (once one of the function has been selected) when the ENTER key is hit 1953, and the utility will be exited if the F12 key is hit 1954. Below this, the date is display 1963 as Wednesday, June 5, and the time is displayed 1965 as 4:36 p.m.

Figure 37:
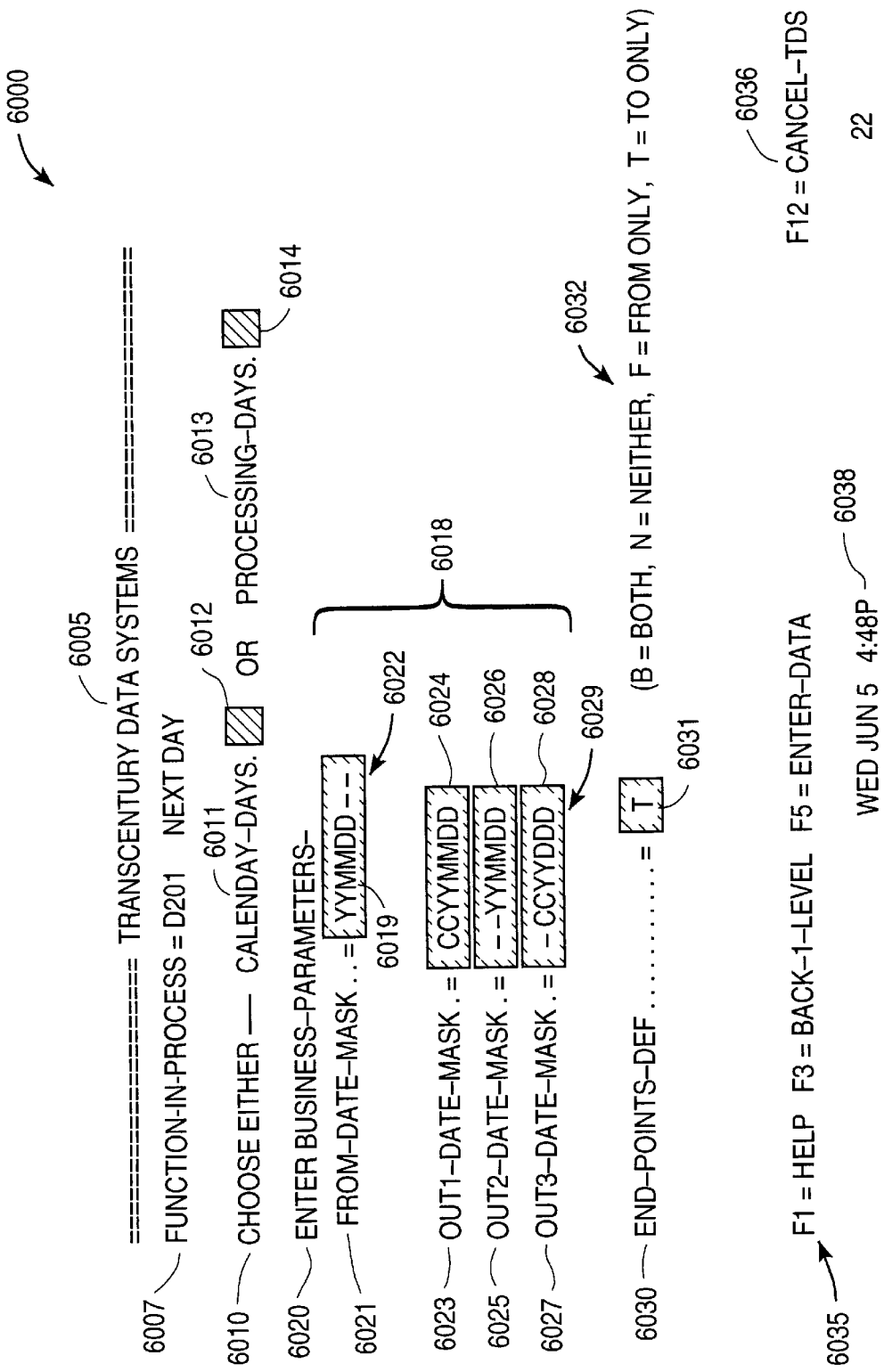
FIG. 37 shows a parameter specification screen for a NEXT DAY function.

If, for instance, the first function title NEXT DAY 1310 in the extended function column 1300 is chosen by inserting an 'X' at the top of the selection field 1305, the screen 6000 of FIG. 37 for the NEXT DAY function (C/P 201) is displayed. The screen 6000 includes a first header line 6005 which identifies the software developer as TransCentury Data Systems, for instance, and a second header line 6007 which identifies the function-in-process as the NEXT DAY function. The identification number is given as "D201" since it has not yet been specified whether calendar days or processing days are to be counted (in which case the identification number would be C201 or P201, respectively). The instruction line 6010 instructs the programmer to specify whether calendar days or processing days are to be counted. If the selection field 6012 next to the first first-level parameter value CALENDAR-DAYS 6011 is marked, all calendar days are counted, and if the selection field 6014 next to the second first-level parameter value PROCESSING-DAYS 6013 is marked, only processing days are counted. This is followed by the instruction line, ENTER BUSINESS-PARAMETERS 6020 located above a date mask area 6018, and end points parameter END-POINTS-DEF 6030 and the corresponding selection field 6031. The date mask area 6018 includes first-level parameter titles for date masks FROM-DATE MASK 6021, OUT1-DATE-MASK 6023, OUT2-DATE-MASK 6025 and OUT3-DATE-MASK 6027. The parameter value "YYMMDD—" 6019 is displayed in selection field 6022 for the parameter FROM-DATE-MASK. Similarly, the parameter values "CCYYMMDD" 6024, "—YYMMDD" 6026, "—CCYYDDD" 6028 are displayed in selection field 6029 for parameters OUT1-DATE-MASK 6023, OUT2-DATE-MASK 6025 and OUT3-DATE-MASK 6027, respectively. These are the default mask values which appear when the screen 6000 is first displayed, and may be altered by the programmer.

Below the date mask titles 6021, 6023, 6025 and 6027 and their selection fields 6022 and 6029 is first-level parameter title END-POINTS-DEF 6030 and corresponding selection field 6031. As indicated by the comment line 6032, this is a four-value parameter since the values "B", "N", "F" or "T" may be assigned. As shown in FIG. 37, a 'T' has been entered in the selection field 6031, thereby specifying that the "to" endpoint but not the "from" endpoint is counted.

Below this the command line 6035 informs that help with the utility may be obtained by hitting the F1 key, the previous screen will be displayed if the F3 kit is hit, the next screen will be displayed (once the first-level parameters have been specified) when the ENTER key is hit, and the utility will be exited if the F12 key is hit Below this, the date and time are displayed 6038.

Figure 38:
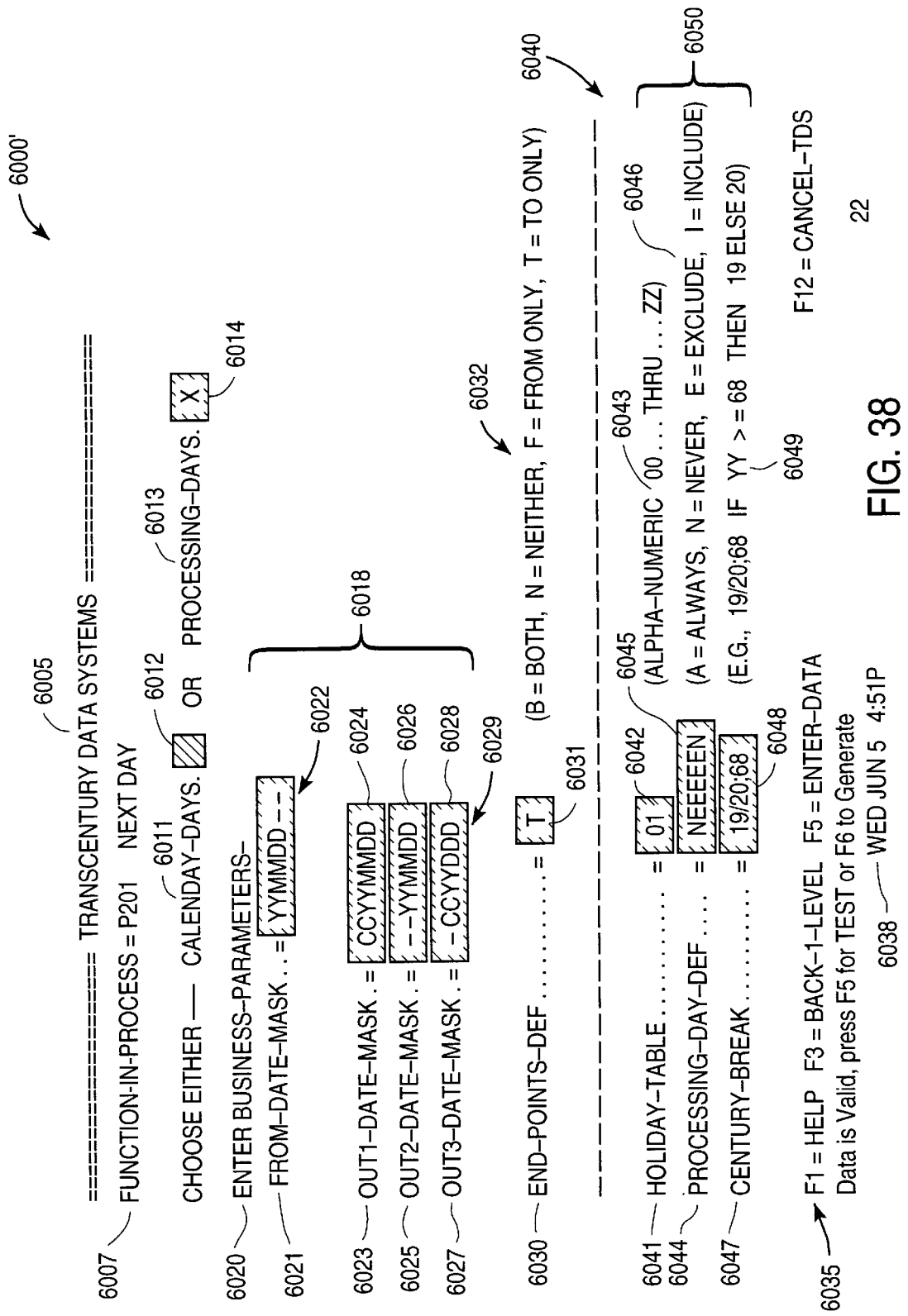
FIG. 38 shows another parameter specification screen for a NEXT DAY function with a sub-window displayed for second-level parameters.

If, as shown in FIG. 38, the value PROCESSING-DAYS 6013 is chosen by entering an 'X' into the corresponding selection field 6014, second-level parameters must be specified since PROCESSING-DAYS 6013 is a "non-terminal" value. The second-level parameters are displayed in the sub-window 6050 below the dashed line 6040. The second-level parameters displayed due to the selection of PROCESSING-DAYS 6013 have the titles HOLIDAY-TABLE 6041 and PROCESSING-DAY-DEF 6044, selection fields 6042 and 6045 with default entries "01" and "NEEEEEN", and comment lines 6043 and 604, respectively. As explained by the comments 6043 and 6046, and described in detail above, the default entries specify that the first holiday table is selected, and that weekends are never processing days and that weekdays are processing days unless they are holidays. If, as shown in FIG. 38, "YYMMDD—" is the selected value for the mask FROM-DATE-MASK 6021, since it does not include a century specification it is a non-terminal value. Therefore, second-level parameter title CENTURY-BREAK 6047, selection field 6048 with default value "19/20;68", and comment line 6049 are displayed in the sub-window 6050. As explained by the comment 6049, and described in detail above, the default value specifies that two-digit-specified years greater than "68" are assigned a century value of "19".

As in the previous screen 6000 shown in FIG. 37 where PROCESSING-DAYS had not been selected, the screen 6000' of FIG. 38 includes a first header line 6005 identifying the software developer as TransCentury Data Systems, for instance, and a second header line 6007 which identifies the function-in-process as the NEXT DAY function. Now, however, the identification number is given as "P201" since it has been specified in the selection field 6014 that processing days are to be counted. This is followed by the instruction line, ENTER BUSINESS-PARAMETERS 6020, and the date mask area 6018 which includes the first-level parameter titles FROM-DATE MASK 6021, OUT1-DATE-MASK 6023, OUT2-DATE-MASK 6025 and OUT3-DATE-MASK 6027, and the corresponding selection fields 6022 and 6029 with default values "YYMMDD—" 6019, "CCYYMMDD" 6024, "—YYMMDD" 6026, "—CCYYDDD" 6028, respectively. Below the date mask titles 6021, 6023, 6025 and 6027 and their selection fields 6022 and 6029 is first-level parameter title END-POINTS-DEF 6030 and corresponding selection field 6031 with parameter value "T". Below this the command line 6035, and a date and time line 6038, as described above.

Figure 39:
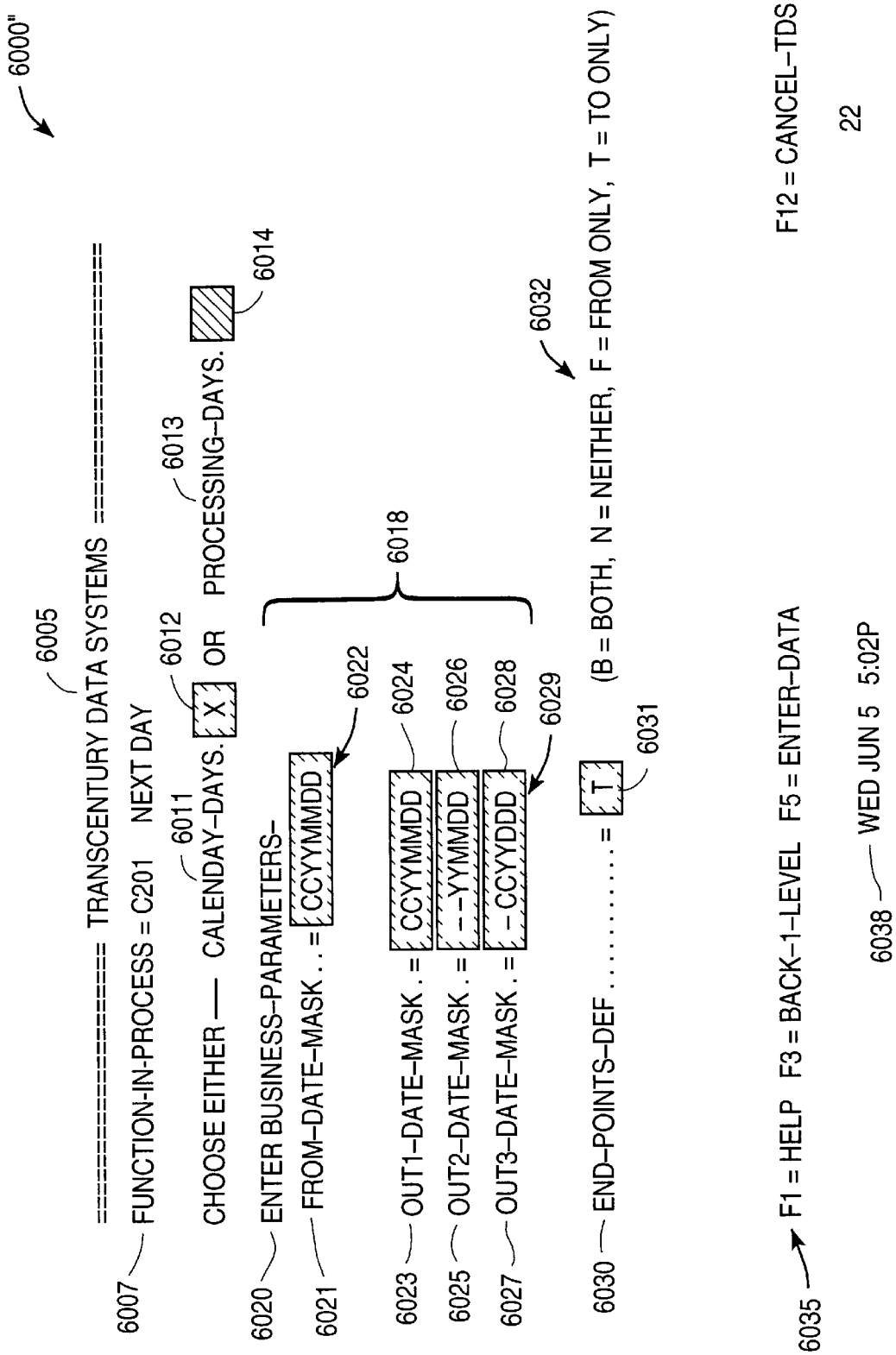
FIG. 39 shows another parameter specification screen for a NEXT DAY function.

However, if the value CALENDAR-DAYS 6011 is chosen for the function NEXT DAY by entering an 'X' into the corresponding selection field 6012, as shown in the screen 6000" of FIG. 39, no second-level parameters are to be specified since the CALENDAR-DAYS value 6011 is a terminal value. Also, since the selected mask value, "CCYYMMDD", for FROM-DATE-MASK 6021 does include a century specification it is a terminal value. As in the previous screen 6000' shown in FIG. 38 where PROCESSING-DAYS had been selected, the screen 6000" of FIG. 39 includes a first header line 6005 identifying the software developer as TransCentury Data Systems, for instance, and a second header line 6007 which identifies the function-in-process as the NEXT DAY function. In this case, the identification number is given as "C201" since it has been specified in the selection field 6014 that calendar days are to be counted. This is again followed by the instruction line, ENTER BUSINESS-PARAMETERS 6020, and the date mask area 6018 which includes the parameter titles for the date mask FROM-DATE-MASK 6021, OUT1-DATE-MASK 6023, OUT2-DATE-MASK 6025 and OUT3-DATE-MASK 6027, and the corresponding selection fields 6022 and 6029 with default masks "CCYYMMDD", "CCYYMMDD" 6024, "—YYMMDD" 6026, "—CCYYDDD" 6028, respectively. Because OUT1-DATE-MASK 6023, OUT2-DATE-MASK 6025 and OUT3-DATE-MASK 6027 are output masks, all values for these masks 6023, 6025 and 6027 are terminal regardless of whether the century is explicitly specified. Below the date mask titles 6021, 6023, 6025 and 6027 and their selection fields 6022 and 6029 is first-level parameter title END-POINTS-DEF 6030 and corresponding selection field 6031 with parameter value 'T', the command line 6035, and a date and time line 6038.

When the programmer believes a calendaring function is correctly chosen and its parameter values correctly specified, the operation of the function may be tested by striking the user-defined testing invocation key. Testing does not require compilation of the computer code, thereby reducing debugging time and improving the reliability of the program. For instance, if RE-FORMAT 1118 is selected from the A-UTILITY column 1100 of screen, and the testing function is invoked, the screen 9000 of FIG. 9000 with testing sub-window 9060 is displayed. The screen 9000 includes a first header line 9005 identifying the software developer as TransCentury Data Systems, for instance, and a second header line 6007 which identifies the function-in-process as the REFORMAT DATE utility function U009. This is followed by the instruction line, ENTER BUSINESS-PARAMETERS 9020, and the date mask area 6018 which includes the parameter titles for the date mask FROM-DATE-MASK 9021, OUT1-DATE-MASK 9023, OUT2-DATE-MASK 9025 and OUT3-DATE-MASK 9027, and the corresponding selection fields 6022 and 6029 with default masks "YYMMDD—", "CCYYMMDD" 9024, "—YYMMDD" 9026, "—CCYYDDD" 9028. Since the default value "YYMMDD—" for the mask FROM-DATE-MASK 9021 does not include a century specification it is a non-terminal value. Therefore, second-level parameter title CENTURY-BREAK 9047, selection field 9048 with default value "19/20;68", and comment line 9049 are displayed in the sub-window 9050 below the dashed line 9040. Because OUT1-DATE-MASK 9023, OUT2-DATE-MASK 9025 and OUT3-DATE-MASK 9027 are output masks, all values for these masks 9023, 9025 and 9027 are terminal regardless of whether the century is explicitly specified.

Figure 43:
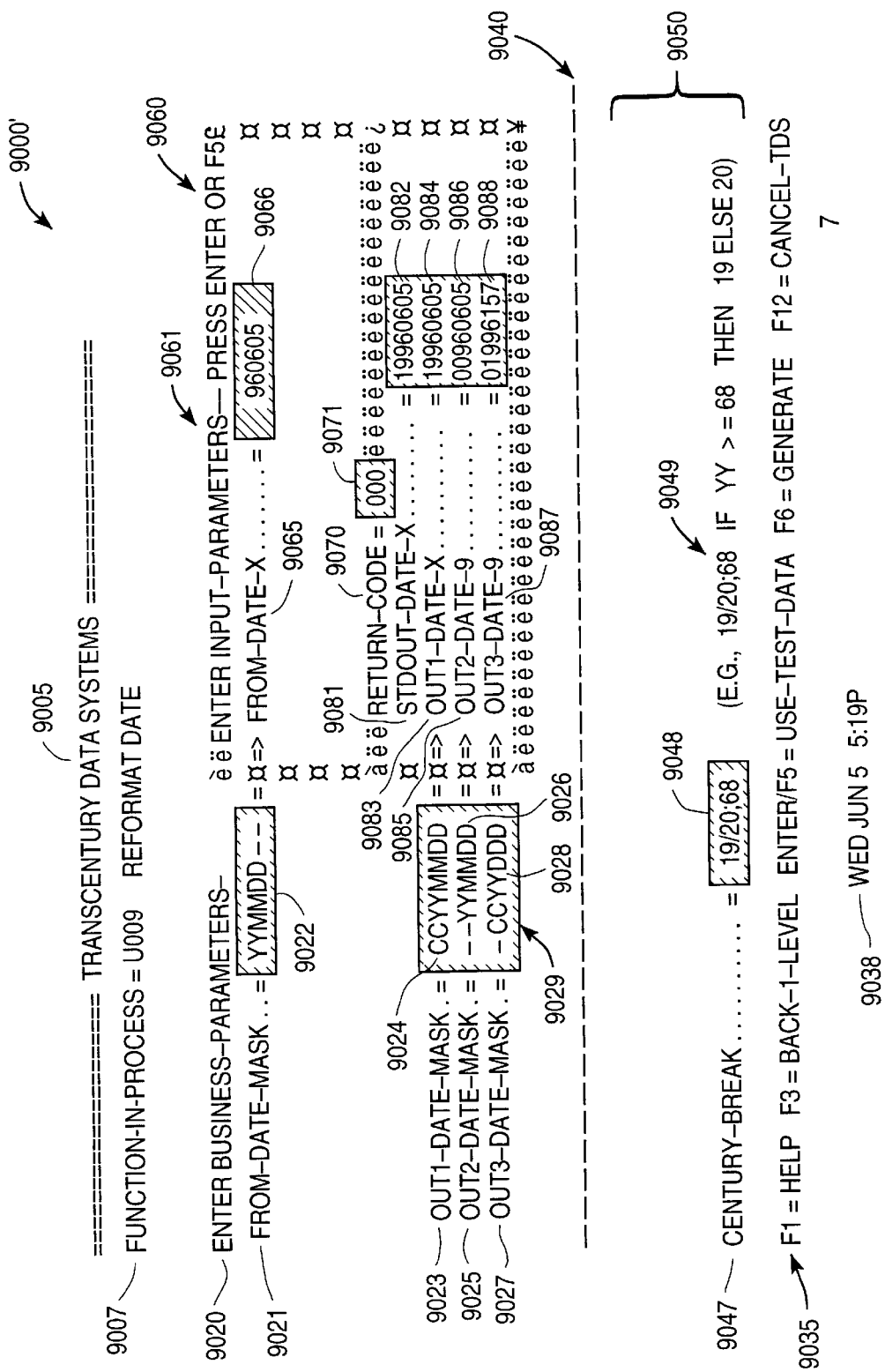
FIG. 43 shows a parameter specification screen for a REFORMAT DATE function with a test input entered in the testing sub-window.

By entering a value for FROM-DATE-X 9065 into data field 9066, such as the value "960605" as shown in screen 9000' of FIG. 43, for the date Jun. 5, 1996, the programmer can compare the testing utility output with an expected output. As shown, the value of RETURN-CODE 9070 is "000", indicating that the function REFORMAT DATE ran without a run-time error. The output dates for STDOUT-DATE-X 9081, OUT1-DATE-X 9083, OUT2-DATE-9 9085 and OUT3-DATE-9 9087 are shown to be "19960605" 9082, "19960605" 9084, "00960605" 9086, "01996157" 9088, respectively. If the testing utility outputs 9082, 9084, 9086 and 9088 and the expected output differ the programmer can modify the function or the function parameter values, in this case the date masks values 9022, 9024, 9026 and 9028 for parameters FROM-DATE-MASK 9021, OUT1-DATE-MASK 9023, OUT2-DATE-MASK 9025 and OUT3-DATE-MASK 9027, as appropriate. Further runs of the testing utility and modifications of the parameters of the calendaring function can be performed as needed.

Figure 40:
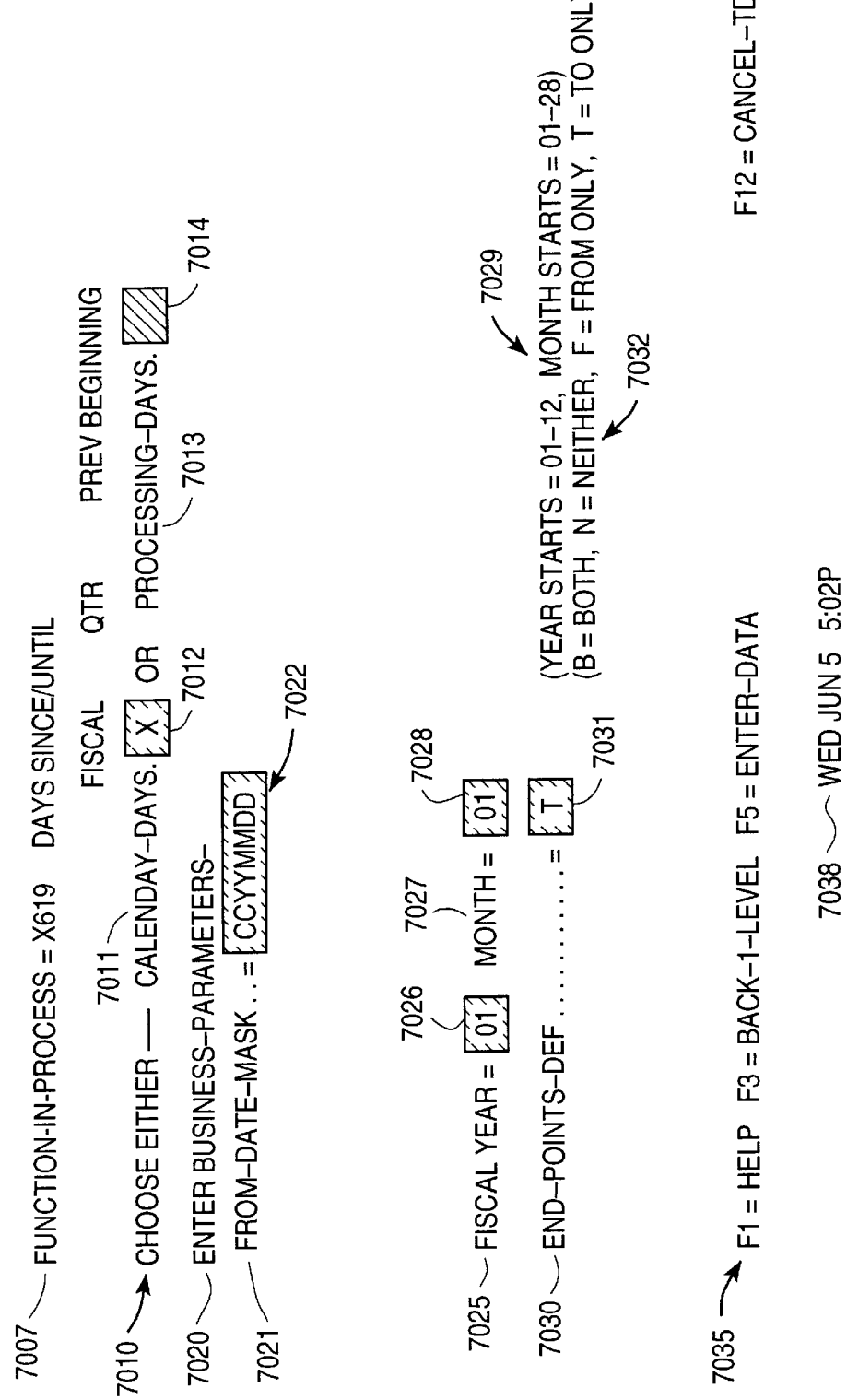
FIG. 40 shows a parameter specification screen for a DAYS SINCE/UNTIL function.
Figure 42:
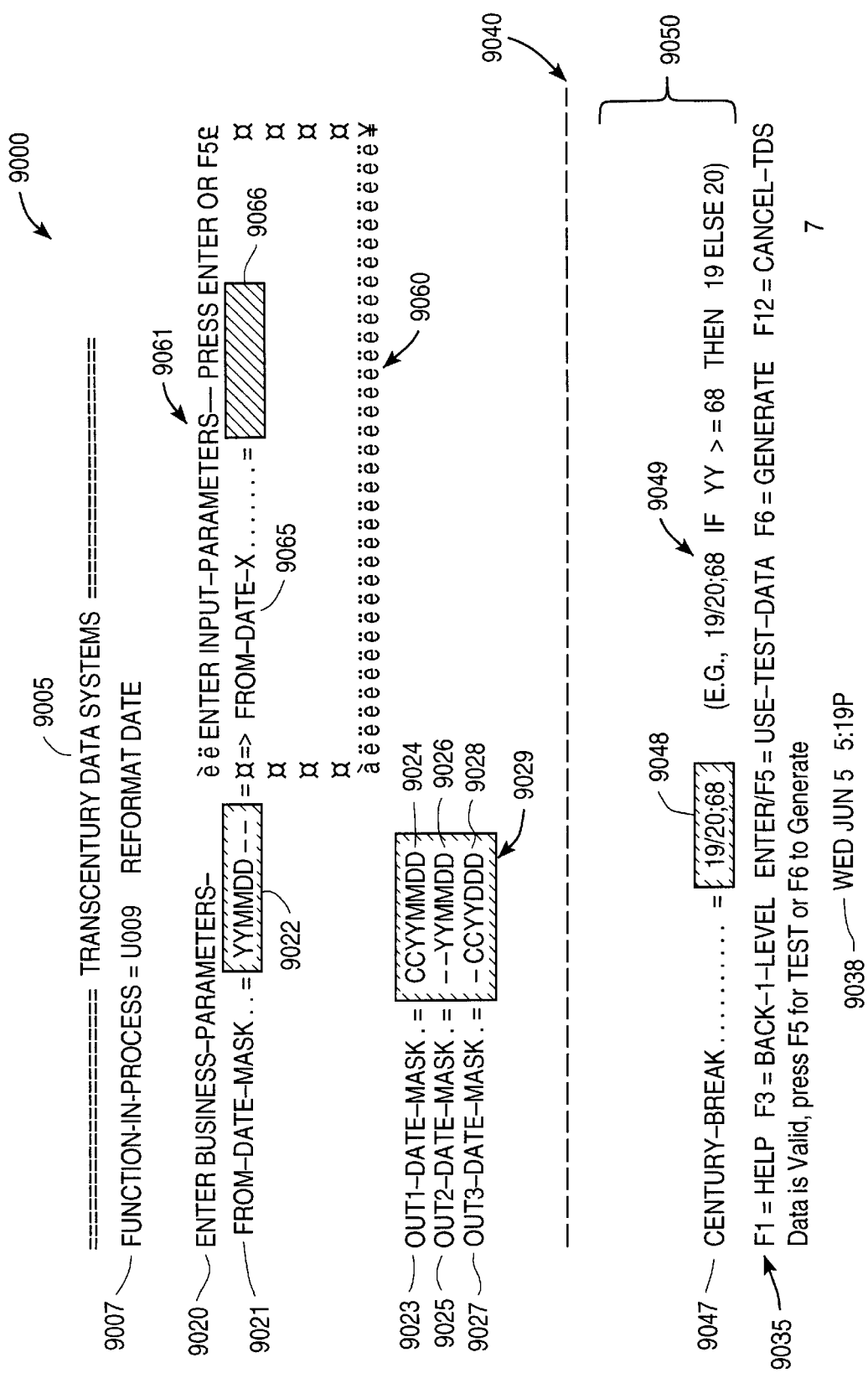
FIG. 42 shows a parameter specification screen for a REFORMAT DATE function with the testing sub-window displayed.

If function 619 is selected by selecting SINCE/UNTIL 1511 from line E1 1500, FISCAL 1611 from line E2 1600, QTR 1711 from line E3 1700, PREVIOUS 1810 from line E4 1800, and BEGINNING 1910 from line E5 1900 of the screen 1000 of FIG. 36, the screen 7000 of FIG. 40 is displayed. This screen 7000 has a header line 7007 which identifies the function-in-process as function X619, the DAYS SINCE/UNTIL (the) PREV(IOUS) BEGINNING (of the) FISCAL QTR (i.e., QUARTER) function. The instruction line 7010 instructs the programmer to specify whether calendar days or processing days are to be counted. As shown in FIG. 40, the selection field 7012 next to value CALENDAR-DAYS 7011 is marked (rather than the selection field 7014 next to value PROCESSING-DAYS 7013), so calendar days, rather than processing days, are counted. This is followed by the instruction line, ENTER BUSINESS-PARAMETERS 7020, located above a date mask title FROM-DATE MASK 7021 with the mask value "CCYYMMDD" in selection field 7022. (The default mask value, "YYMMDD—", for FROM-DATE MASK 7021 has already been altered by the programmer and is not shown.) As discussed above in reference to FIG. 39, since the century is included in the mask value "CCYYMMDD", this is a terminal value. Below this the parameter titles FISCAL YEAR 7025 and MONTH 7027, and their respective selection fields 7026 and 7028 with the default values "01" and "01" are shown. As the comment line 7029 explains, these default values mean that the fiscal year begins on January 1. Below this is the four-value first-level parameter title END-POINTS-DEF 7030 and corresponding selection field 7031 with value 'T', the command line 7035, and the date and time line 7038.

Upon striking the F5 function key, the data from the screen 7000 for the DAYS SINCE/UNTIL function is entered and the utility of the present invention generates the source code for the calendaring function and the specified parameters as shown in FIG. 41. Line 8520 on the code is a comment that confirms that this is the code for the C619 function, i.e., the DAYS SINCE/UNTIL (the) PREV(IOUS) BEGINNING (of the) FISCAL QTR (i.e., QUARTER) function. The first alpha-numeric digit of the function code, "C", indicates that the CALENDAR-DAYS 7011 value was selected by placing an "X" in the selection field 7012. Line 8530 therefore moves the function code "C619" to the TRC-CONVR-FUNCTION-CODE location. As per the value in specification field 7026 for FISCAL YEAR 7025, line 8540 moves the "01" default value for the FISCAL YEAR 7025 parameter to the TRC-CONVR-FISCYR-START location. As per the value in specification field 7028 for FISCAL MONTH 7027, line 8550 moves the "01" default value for the FISCAL MONTH 7027 parameter to the TRC-CONVR-FISCMO-START location. As per the value in specification field 7031 for END-POINTS-DEF 7030, line 8560 moves the "T" value for the END-POINTS-DEF 7030 parameter to the TRC-CONVR-FISCMO-START location. As per the value in specification field 7022 for FROM-DATE-MASK 7021, line 8570 moves the "CCYYMMDD" value for the FROM-DATE-MASK 7021 parameter to the TRC-CONVR-FROM-DATE-MASK location.

The variables in the source code of FIG. 41 which begin with a question mark are to be supplied by the programmer. Therefore, the programmer substitutes the appropriate variable for ?-USER-FROM-DATE on line 8580, and so the code of lines 8580–8590 uses the variable as the input from-date TRC-CONVR-FROM-DATE-X. Then in lines 8591–8593 a link to the calendaring program is executed via the conversational area TRC-CONVERSATIONAL on length 1000 words, as per line 8592. The return code TRC-CONVR-RETURN-GOOD is tested in line 8594, and if it is good the output TRC-CONVR-OUT-NUMERIC-PARM is moved to whatever variable the programmer substitutes for ?-USER-OUT-NUMERIC, as per lines 8595–8596. However, if the return code TRC-CONVR-RETURN-GOOD is not good 8597, a call is made to the error routine whose name is substituted for ?-USER-ERROR-ROUTINE in line 8598.

Although the above description contains many specificities, these should not be construed as limiting the scope of the invention, but as merely providing illustrations of some of the preferred embodiments of this invention. Many variations are possible and are to be considered within the scope of the present invention. For instance: other calendaring functions may be included; not all of the calendaring functions need be included; parameter titles for parameters values which are not immediately required may be displayed; the utility need not include the testing functions; types of date logic other than business date logic may be generated; types of logic other than date logic may be generated; the utility of the present invention could be used for any methodical substitution of computer code; the utility could operate under other types of computer system environments; other types of leap year rules may be implemented; other types of 360-day year conversions may be implemented; other types of source code may be generated; etc. Many other variations are also to be considered within the scope of the present invention. Thus the scope of the invention should be determined not by the examples given herein, but rather by the appended claims and their legal equivalents.

What is claimed is:

1. A utility for generating computer code for a calendaring function at a selected location in a computer program edited on a computer system, comprising:

means for presenting a choice of calendaring functions on a display screen of said computer system;

means for selecting said calendaring function from said choice of calendaring functions;

means for presenting a choice of first-level parameter values associated with said calendaring function wherein said first-level parameter values possibly includes both terminal parameter values and non-terminal parameter values;

means for selecting a first-level parameter value from said choice of first-level parameter values;

means for generating said computer code for said calendaring function with said first-level parameter value at said selected location in said computer program;

means for presenting a choice of second-level parameter values if said first-level parameter value is one of said non-terminal parameters; and means for selecting a second-level parameter value from said choice of second-level parameter values if said first-level parameter value is one of said non-terminal parameter values, and wherein said means for generating generates computer code for said calendaring function with said second-level parameter value, if said first-level parameter value is one of said non-terminal parameter values.

2. A utility for generating computer code for a calendaring function at a selected location in a computer program edited on a computer system, comprising:

means for presenting a choice of calendaring functions on a display screen of said computer system;

means for selecting said calendaring function from said choice of calendaring functions;

means for presenting a choice of first-level parameter values associated with said calendaring function;

means for selecting a first-level parameter value from said choice of first-level parameter values;

means for generating said computer code for said calendaring function with said first-level parameter value at said selected location in said computer program;

means for providing a test value for said first-level parameter value of said calendaring function; and means for obtaining an output, prior to compilation of said computer code, from said calendaring function with said first-level parameter value equal to said test value.

3. The utility of claim 2 further including:

means for making a second selection of a second calendaring function from said choice of calendaring functions;

means for specifying a second value for a second first-level parameter value associated with said second calendaring function; and means for generating modified computer code for said second calendaring function with said second first-level parameter value at said selected location in said computer program.

* * * * *